US012623152B2

(12) United States Patent
Tsurumoto et al.

(10) Patent No.: US 12,623,152 B2
(45) Date of Patent: May 12, 2026

(54) NON-TRANSITORY STORAGE MEDIUM STORING COMPUTER PROGRAM FOR GAME, AND GAME SYSTEM AND CONTROL METHOD FOR SAME

(71) Applicant: KONAMI DIGITAL ENTERTAINMENT CO., LTD., Tokyo (JP)

(72) Inventors: Kazuma Tsurumoto, Tokyo (JP); Koji Ishii, Tokyo (JP); Syogo Yamazaki, Tokyo (JP); Taemin Kim, Tokyo (JP); Yoshimasa Saito, Tokyo (JP); Yaojen Chang, Tokyo (JP); Tomohiro Nakada, Tokyo (JP); Osamu Ikeda, Tokyo (JP); Shota Hasegawa, Tokyo (JP); Taito Ito, Tokyo (JP); Kuka Lee, Tokyo (JP); Satoshi Higashida, Tokyo (JP); Yasunori Kobayashi, Tokyo (JP); Tomohisa Koike, Tokyo (JP); Taro Murakami, Tokyo (JP); Yumi Kato, Tokyo (JP); Chikako Iizuka, Tokyo (JP); Shuichiro Yoshimura, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 356 days.

(21) Appl. No.: 18/448,645

(22) Filed: Aug. 11, 2023

(65) Prior Publication Data

US 2023/0381659 A1 Nov. 30, 2023

Related U.S. Application Data

(63) Continuation of application No. PCT/JP2021/036479, filed on Oct. 1, 2021.

(30) Foreign Application Priority Data

Mar. 15, 2021 (JP) ................................. 2021-041916

(51) Int. Cl.
| | |
|---|---|
| A63F 13/44 | (2014.01) |
| A63F 13/49 | (2014.01) |
(Continued)

(52) U.S. Cl.
CPC .............. *A63F 13/63* (2014.09); *A63F 13/44* (2014.09); *A63F 13/49* (2014.09); *A63F 13/812* (2014.09)

(58) Field of Classification Search
CPC ........ A63F 13/44; A63F 13/45; A63F 13/812; A63F 13/828
See application file for complete search history.

(56) References Cited

U.S. PATENT DOCUMENTS

| | | | | |
|---|---|---|---|---|
| 3,860,239 A * | 1/1975 | Feuer | .................... | A63F 7/0664 463/3 |
| 6,179,713 B1 * | 1/2001 | James | ................... | A63F 13/352 463/1 |

FOREIGN PATENT DOCUMENTS

| | | | |
|---|---|---|---|
| JP | 2005131310 A | * | 5/2005 |
| JP | 2014-198106 A | | 10/2014 |
| JP | 6632008 B1 | * | 1/2020 |

OTHER PUBLICATIONS

Communication dated Mar. 7, 2025 in Korean Application No. 10-2023-7026151.

(Continued)

*Primary Examiner* — Steven J Hylinski
(74) *Attorney, Agent, or Firm* — Sughrue Mion, PLLC

(57) ABSTRACT

A non-transitory storage medium storing a computer program for causing a computer to calculate an action of each object within a field to cause a match between the user and (Continued)

the opponent to proceed, and for providing the game in which the first turn of an offense and the second turn of a defense are switched between the user and the opponent based on a calculation result of the action, wherein the computer program causes the computer to serve as a selection opportunity provision unit that suspends the action of each object in conjunction with switching of the turns and provides an opportunity of selection regarding the match to the user, and a calculation control unit that controls calculation of the match so that the selection by the user is reflected in the calculation of the match within a target period until switching of the turns occurs next.

11 Claims, 41 Drawing Sheets

(51) Int. Cl.
 *A63F 13/63* (2014.01)
 *A63F 13/812* (2014.01)

(56) References Cited

OTHER PUBLICATIONS

Communication dated Feb. 6, 2025 in Japanese Application No. 2022-094049.
Notice of Reasons for Refusal dated Oct. 30, 2024 in Application No. 2022-094049.
[Mesologia] Simultaneous turn system!? Revealing your hand!? A thorough explanation of such a new card game; Sep. 21, 2019, [Search on Oct. 29, 2024] Internet <URL : https://www.youtube.com/watch?v=XjAVIGednqE> (1 page).
International Search Report issued Dec. 21, 2021 in Application No. PCT/JP2021/036479.
Written Opinion issued Dec. 21, 2021 in Application No. PCT/JP2021/036479.
Office Action issued Dec. 8, 2021 in Japanese Application No. 2021-041916.
Office Action issued Feb. 14, 2023 in Japanese Application No. 2021-041913.
Konami Perfect Capture Series, "J. League Pocket", Authorized Guidebook First Edition, Konami Corporation, May 25, 2001, 1-34 (39 pages).

* cited by examiner

Match

Instruction Part

Operation Part

Selection of Player Cards

Power of Influence

Team Tactics

Figure 6:
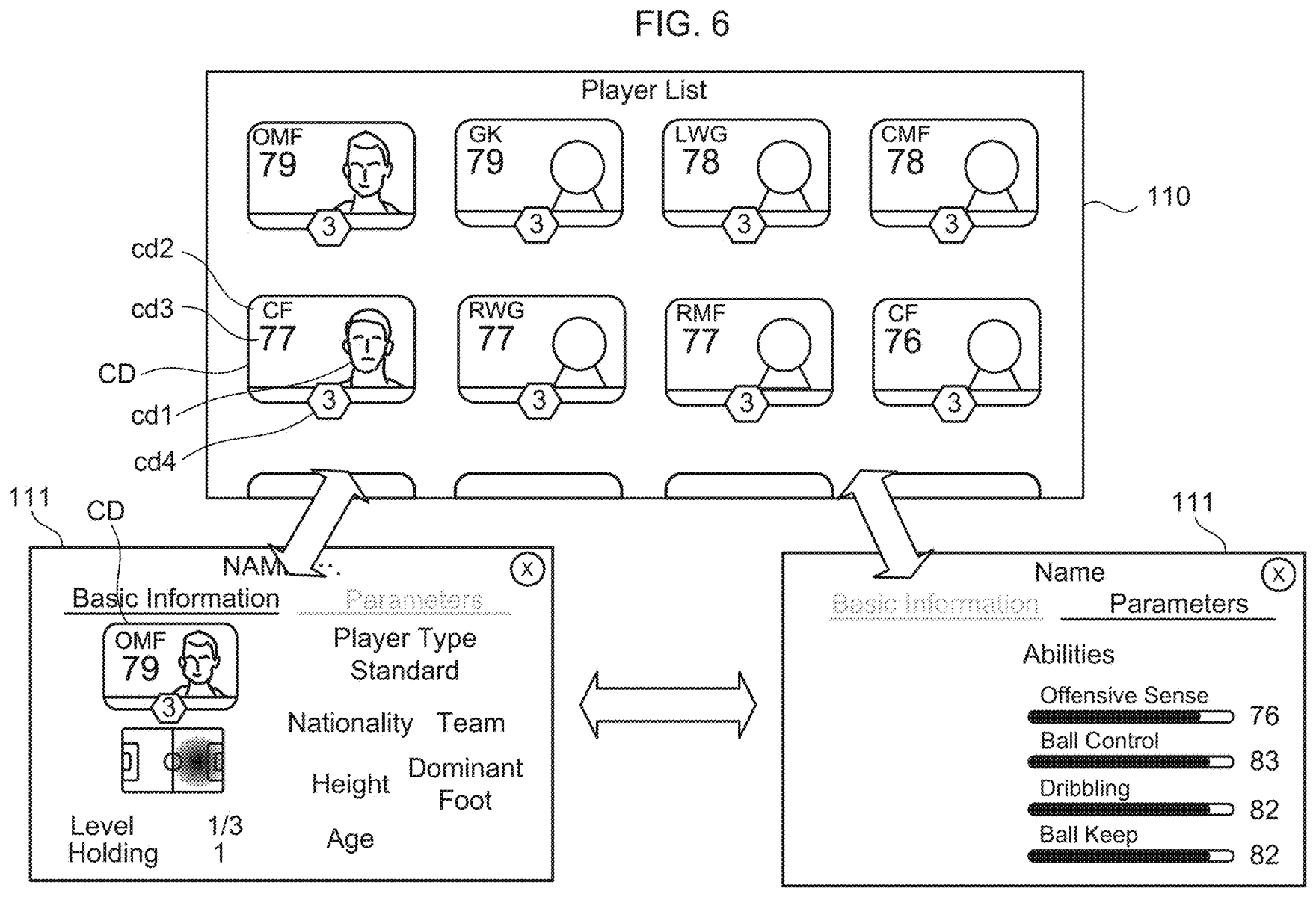

Player List

| | | |
|---|---|---|
| OMF 79 ③ | GK 79 ③ | LWG 78 ③ |
| CF 77 ③ | RWG 77 ③ | RMF 77 ③ |

CMF 78 ③

CF 76 ③ cd2
cd3
CD
cd1
cd4

111

Name Parameters

Basic Information

Abilities

Offensive Sense    76
Ball Control    83
Dribbling    82
Ball Keep    82

CD

111

NAM...

Basic Information    Parameters

OMF 79 ③

Player Type
Standard

Nationality    Team

Height    Dominant Foot

Age

Level    1/3
Holding    1

FIG. 20
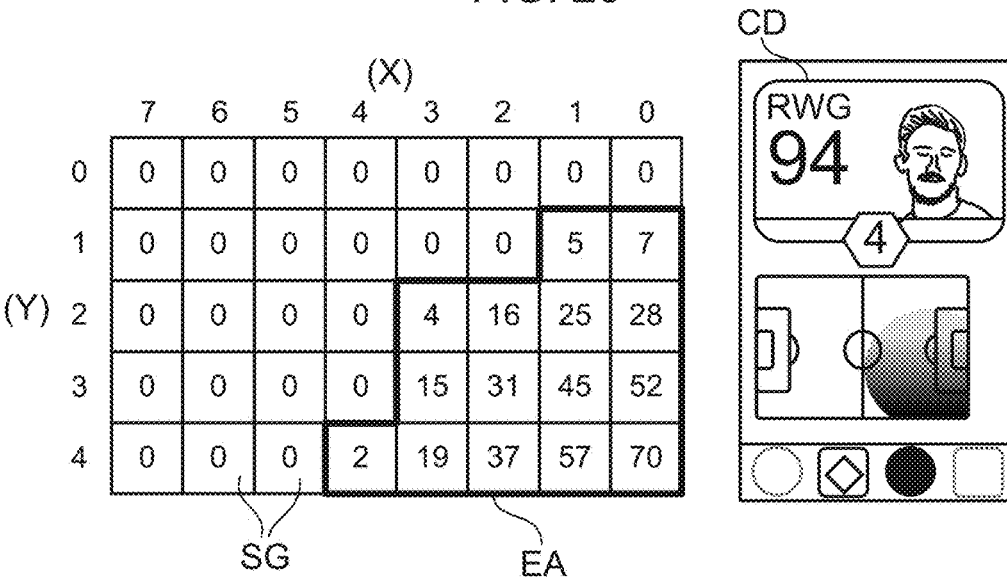
FIG. 21
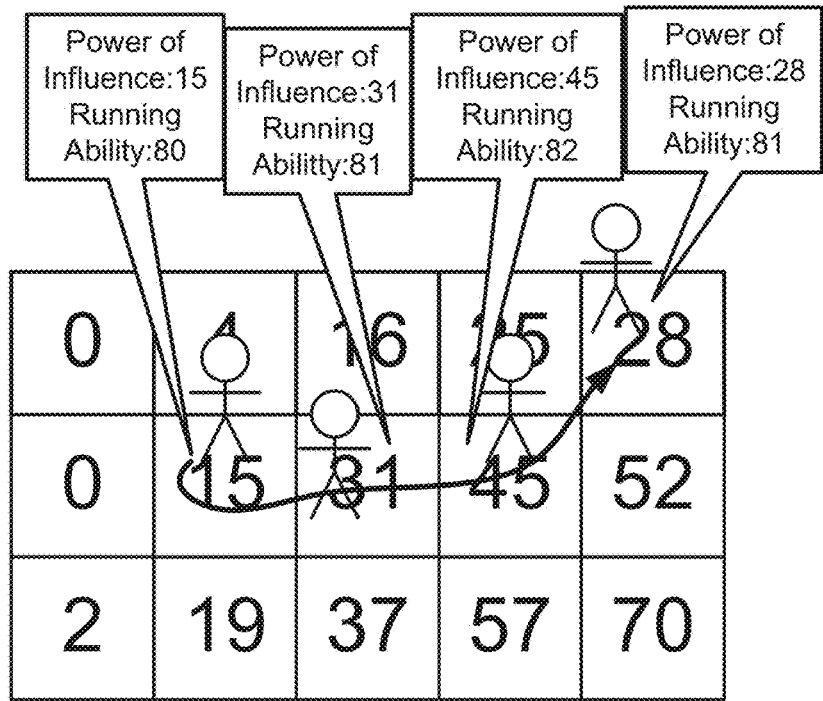
FIG. 22
| Power of Influence | 0-19 | 20-39 | 40-59 | 60-79 | 80-100 |
|---|---|---|---|---|---|
| Increase Number | 0 | +1 | +2 | +3 | +4 |

FIG. 23A

Power of Influence corresponding to Player Card of LCMF (X)

| | 7 | 6 | 5 | 4 | 3 | 2 | 1 | 0 | |
|---|---|---|---|---|---|---|---|---|---|
| 0 | 0 | 5 | 13 | 18 | 16 | 12 | 7 | 2 | |
| 1 | 0 | 7 | 17 | 25 | 21 | 15 | 9 | 3 | |
| (Y) 2 | 0 | 5 | 13 | 18 | 16 | 12 | 7 | 2 | EA |
| 3 | 0 | 0 | 6 | 8 | 8 | 5 | 2 | 0 | |
| 4 | 0 | 0 | 0 | 2 | 0 | 0 | 0 | 0 | SG |

FIG. 23B

Power of Influence corresponding to Player Card of LWG (X)

| | 7 | 6 | 5 | 4 | 3 | 2 | 1 | 0 | |
|---|---|---|---|---|---|---|---|---|---|
| 0 | 0 | 0 | 0 | 0 | 7 | 27 | 50 | 66 | |
| 1 | 0 | 0 | 0 | 0 | 5 | 24 | 43 | 54 | |
| (Y) 2 | 0 | 0 | 0 | 0 | 0 | 15 | 29 | 35 | EA |
| 3 | 0 | 0 | 0 | 0 | 0 | 4 | 14 | 18 | |
| 4 | 0 | 0 | 0 | 0 | 0 | 0 | 0 | 2 | SG |

FIG. 23C

Summed Power of Influence (X)

| | 7 | 6 | 5 | 4 | 3 | 2 | 1 | 0 | |
|---|---|---|---|---|---|---|---|---|---|
| 0 | 0 | 5 | 13 | 18 | 23 | 39 | 57 | 68 | |
| 1 | 0 | 7 | 17 | 25 | 26 | 39 | 52 | 57 | |
| (Y) 2 | 0 | 5 | 13 | 18 | 18 | 27 | 36 | 37 | EA |
| 3 | 0 | 0 | 6 | 8 | 8 | 9 | 16 | 18 | |
| 4 | 0 | 0 | 0 | 0 | 0 | 0 | 0 | 2 | SG |

|  | 7 | 6 | 5 | 4 | 3 | 2 | 1 | 0 |
|---|---|---|---|---|---|---|---|---|
| 0 | 0 | 0 | 0 | 0 | 0 | 0 | 0 | 0 |
| 1 | 0 | 2 | 5 | 8 | 8 | 6 | 0 | 0 |
| (Y) 2 | 2 | 7 | 12 | 16 | 18 | 13 | 5 | 0 |
| 3 | 3 | 9 | 15 | 21 | 25 | 17 | 7 | 0 |
| 4 | 2 | 7 | 12 | 16 | 18 | 13 | 5 | 0 |

|  | 7 | 6 | 5 | 4 | 3 | 2 | 1 | 0 |
|---|---|---|---|---|---|---|---|---|
| 0 | 0 | 5 | 13 | 18 | 23 | 39 | 57 | 68 |
| 1 | 0 | 5 | 12 | 17 | 18 | 33 | 52 | 57 |
| (Y) 2 | -2 | -2 | 1 | 2 | -2 | 14 | 31 | 37 |
| 3 | -3 | -9 | -9 | -13 | -17 | -8 | 9 | 18 |
| 4 | -2 | -7 | -12 | -16 | -18 | -13 | -5 | 2 |

SG

BA

| 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 |
| 0 | 0 | 0 | 0 | 0 | 0 | 6 | 8 | 8 | 5 | 2 | 0 | 0 | 0 | 0 |
| 0 | 0 | 0 | 0 | 0 | 5 | 13 | 18 | 16 | 12 | 7 | 2 | 0 | 0 | 0 |
| 0 | 0 | 0 | 0 | 0 | 7 | 17 | 25 | 21 | 15 | 9 | 3 | 1 | 0 | 0 |
| 0 | 0 | 0 | 0 | 0 | 5 | 13 | 18 | 16 | 12 | 7 | 2 | 0 | 0 | 0 |
| 0 | 0 | 0 | 0 | 0 | 0 | 6 | 8 | 8 | 5 | 2 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |

SG

EA

| (Y) | 7 | 6 | 5 | 4 | 3 | 2 | 1 | 0 |
|---|---|---|---|---|---|---|---|---|
| 0 | 0 | 5 | 13 | 18 | 16 | 12 | 7 | 2 |
| 1 | 0 | 7 | 17 | 25 | 21 | 15 | 9 | 3 |
| 2 | 0 | 5 | 13 | 18 | 16 | 12 | 7 | 2 |
| 3 | 0 | 0 | 6 | 8 | 8 | 5 | 2 | 0 |
| 4 | 0 | 0 | 0 | 0 | 0 | 0 | 0 | 0 |

SG

Previous Turn (X)

| | 7 | 6 | 5 | 4 | 3 | 2 | 1 | 0 |
|---|---|---|---|---|---|---|---|---|
| 0 | 0 | 0 | 0 | 0 | 0 | 0 | 0 | 0 |
| 1 | 0 | 0 | 0 | 0 | 0 | 0 | 5 | 7 |
| 2 | 0 | 0 | 0 | 0 | 4 | 16 | 25 | 28 |
| 3 | 0 | 0 | 0 | 0 | 15 | 31 | 45 | 52 |
| 4 | 0 | 0 | 0 | 2 | 19 | 37 | 57 | 70 |

(Y) — on the left side

SG — pointing to the bottom right cell (70)

Remaining Power of Influence (X)

| | 7 | 6 | 5 | 4 | 3 | 2 | 1 | 0 |
|---|---|---|---|---|---|---|---|---|
| 0 | 0 | 0 | 0 | 0 | 0 | 0 | 0 | 0 |
| 1 | 0 | 0 | 0 | 0 | 0 | 0 | 0 | 0 |
| 2 | 0 | 0 | 0 | 0 | 0 | 0 | 0 | 3 |
| 3 | 0 | 0 | 0 | 0 | 0 | 6 | 20 | 27 |
| 4 | 0 | 0 | 0 | 0 | 0 | 12 | 34 | 45 |

(Y) — on the left side

SG — pointing to the row 1 area

EA — pointing to the row 3 area

FIG. 28

| | Category | Team Tactics | Tendency of Action of Players | Correction Factor | | | |
|---|---|---|---|---|---|---|---|
| | | | | 2cards | 3cards | 4cards | 5cards |
| ◎ | Offensive Type | Possession | Priority is given to ball keeping and teammate players come to support player keeping ball. | 20% | 40% | 60% | 80% |
| | | Counter | Priority is given to challenging forward and teammate players aggressively run out forward. | 20% | 40% | 60% | 80% |
| ◈ | Offensive Area | Central Breakthrough | Building up offense in central field and aiming for goal through dribble breakthrough or through pass. | 20% | 40% | 60% | 80% |
| | | Right Side Attack | Deploying ball to right side and aiming for goal through dribble breakthrough or cross from side. | 20% | 40% | 60% | 80% |
| | | Left Side Attack | Deploying ball to left side and aiming for goal through dribble breakthrough or cross from side. | 20% | 40% | 60% | 80% |
| ● | Defensive Type | Forecheck | Putting pressure aggressively in enemy territory and trying to retake ball at high position. | 20% | 40% | 60% | 80% |
| | | Retreat | Retreating to own territory to strengthen defense. | 20% | 40% | 60% | 80% |
| ◆ | Defensive Area | Central Defense | Forcing enemy player to central field and trying to take ball when enemy player makes pass. | 20% | 40% | 60% | 80% |
| | | Side Defense | Forcing enemy player to field side and trying to take ball by sandwiching enemy player at timing of vertical pass. | 20% | 40% | 60% | 80% |

Possession

Counter

Central Breakthrough

Left Side Attack

Right Side Attack

Forecheck

Retreat

Central Defense

Side Defense

FIG. 33A
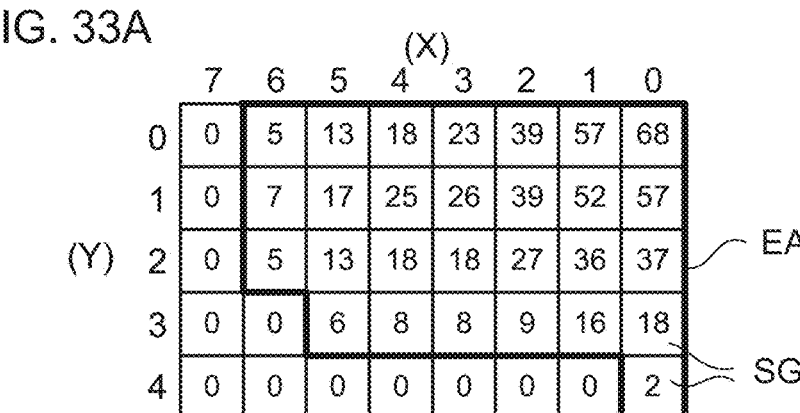
FIG. 33B
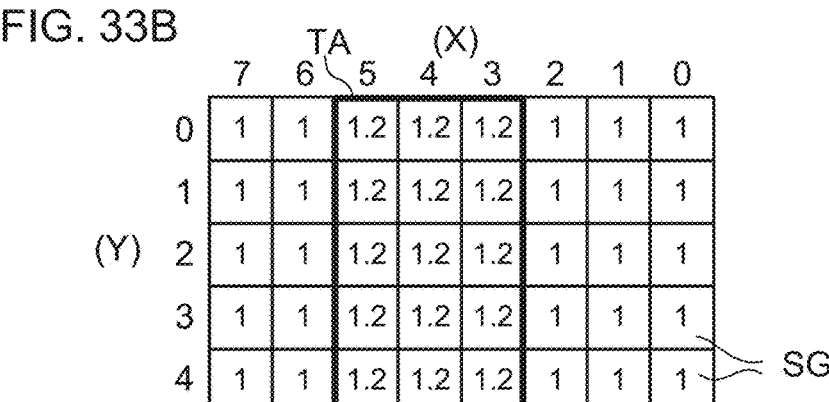
FIG. 33C
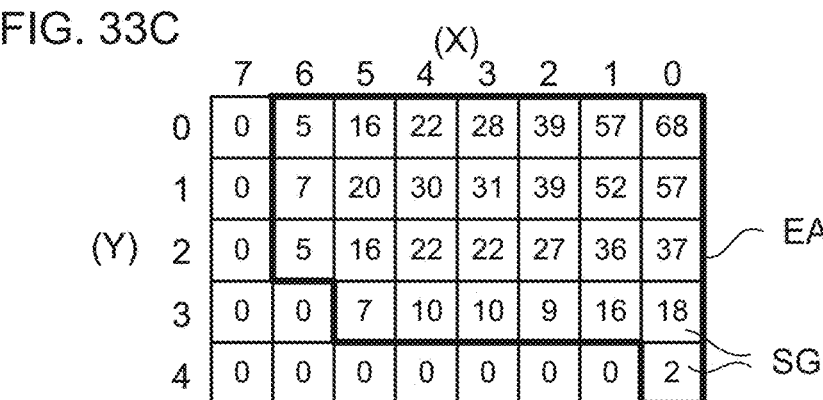
FIG. 33D

FIG. 34A
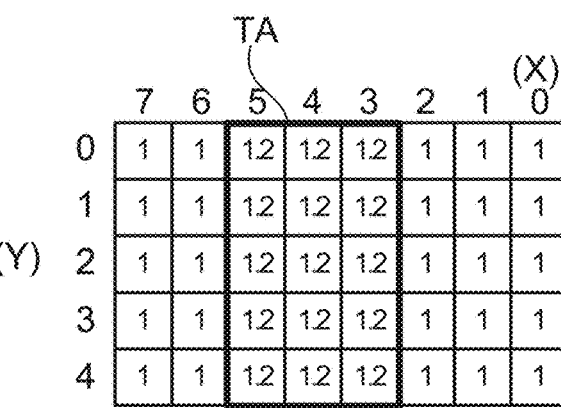
FIG. 34B
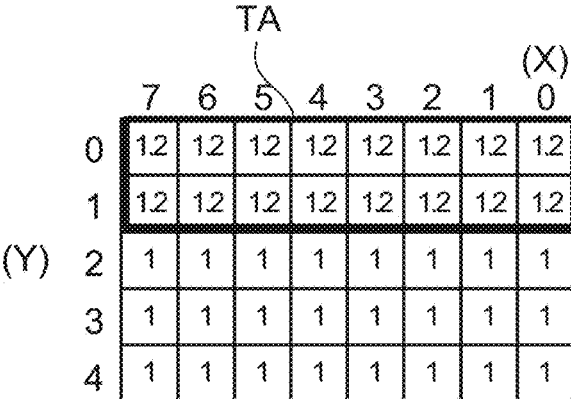
FIG. 34C

FIG. 37A
Possession
FIG. 37B
Counter
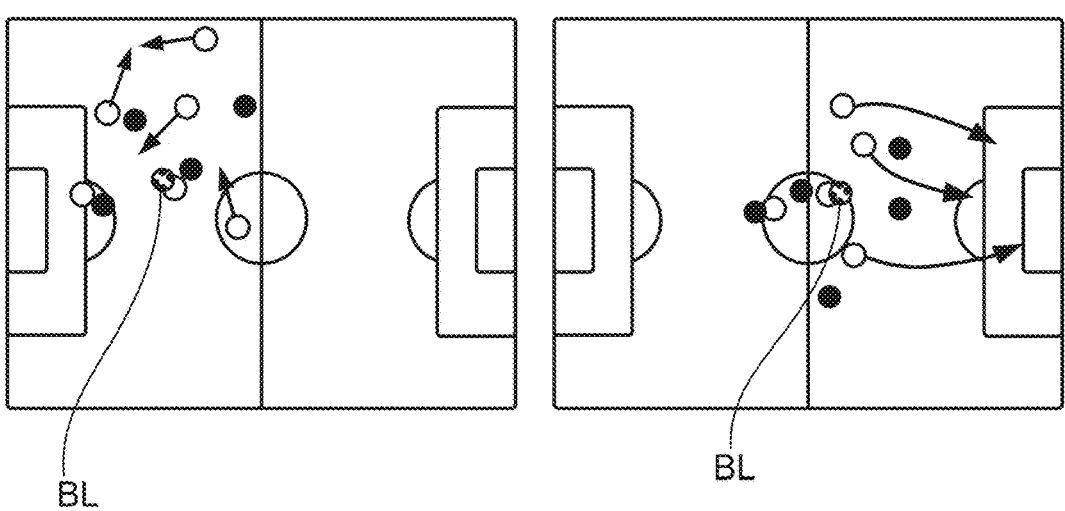
FIG. 37C
Central Breakthrough
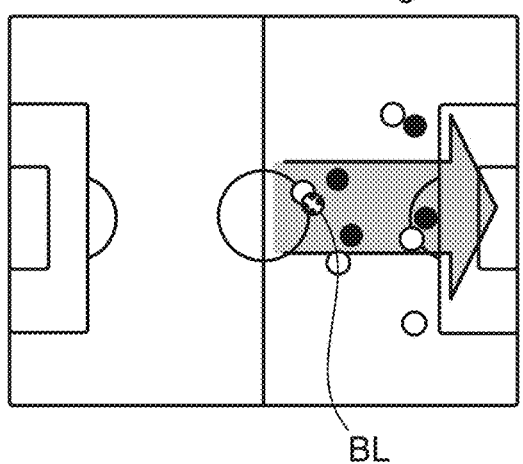
FIG. 37D
Right Side Attack
FIG. 37E
Left Side Attack
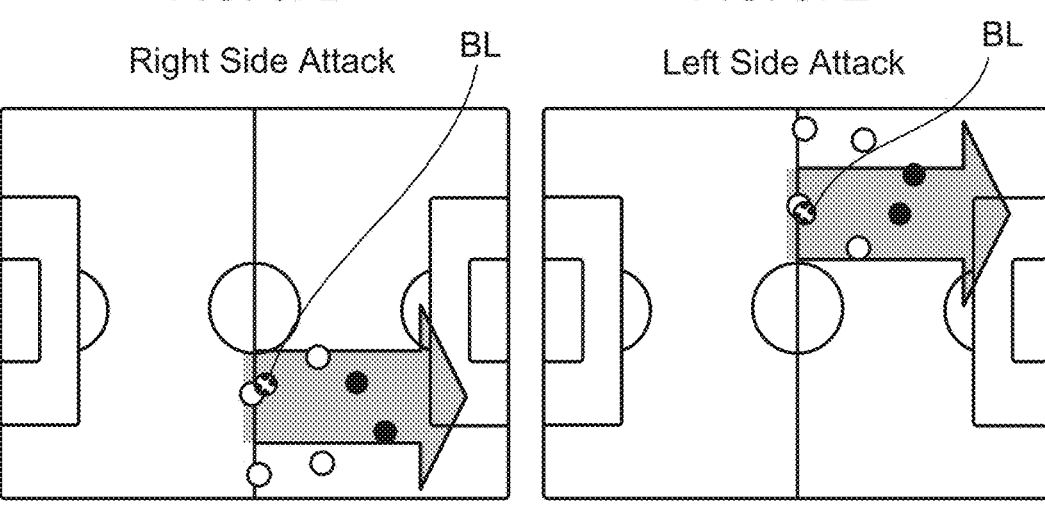

FIG. 38A
Forecheck
FIG. 38B
Retreat
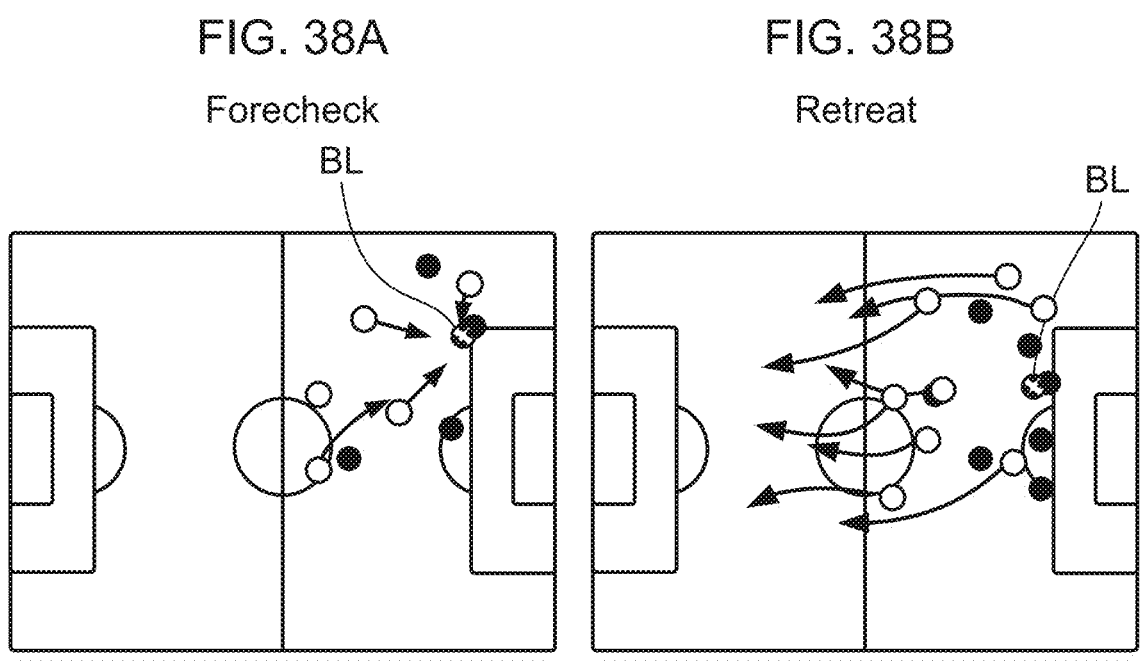
FIG. 38C
Central Defense
FIG. 38D
Side  Defense
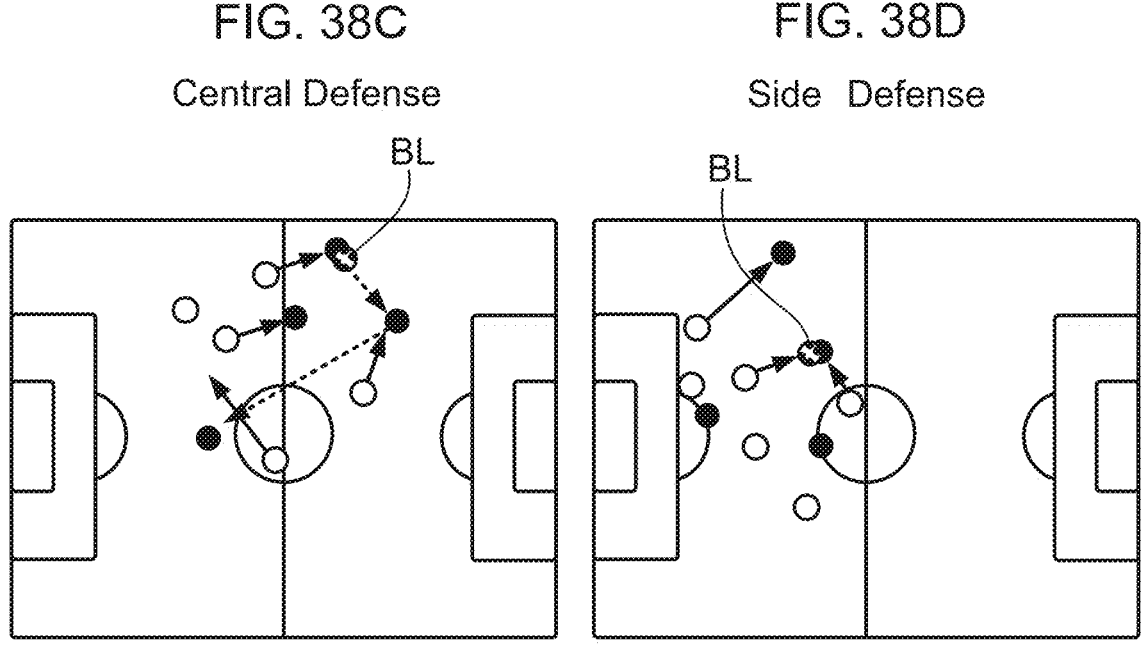

FIG. 44

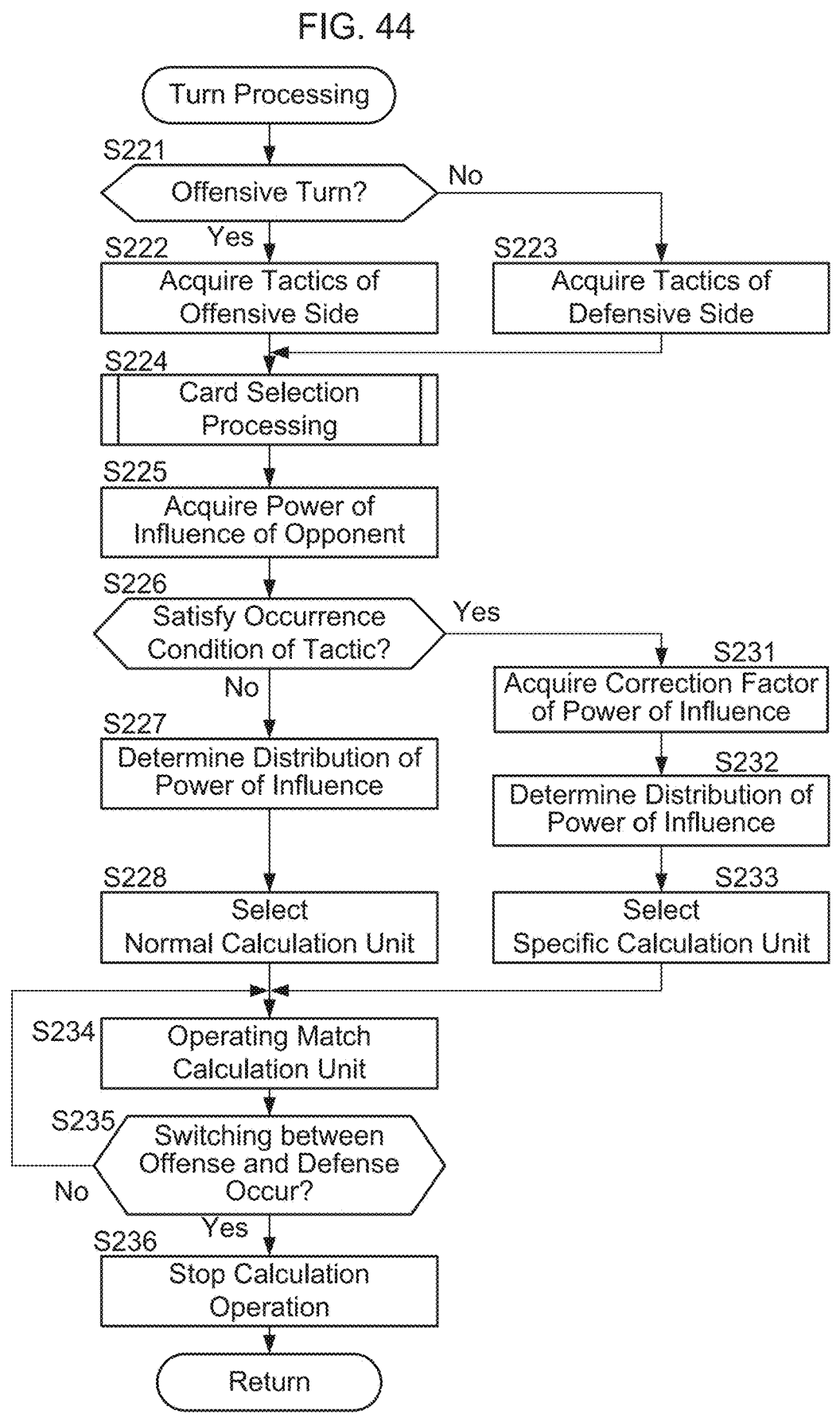

```
            ┌─────────────────────┐
            │   Turn Processing   │
            └─────────────────────┘
                     │
S221                 ▼
         ◁─────────────────────────▷  No
          │   Offensive Turn?    │─────────────┐
          ◁─────────────────────▷             │
                     │ Yes                     │
S222                 ▼              S223        ▼
   ┌─────────────────────┐      ┌─────────────────────┐
   │  Acquire Tactics of │      │  Acquire Tactics of │
   │    Offensive Side   │      │    Defensive Side   │
   └─────────────────────┘      └─────────────────────┘
                     │                   │
S224                 ▼◀──────────────────┘
   ┌─────────────────────┐
   ││   Card Selection   │
   ││     Processing     │
   └─────────────────────┘
                     │
S225                 ▼
   ┌─────────────────────┐
   │  Acquire Power of   │
   │ Influence of Opponent│
   └─────────────────────┘
                     │
S226                 ▼
   ◁─────────────────────────▷  Yes
    │ Satisfy Occurrence  │────────────────────┐
    │  Condition of Tactic?│                   │
   ◁─────────────────────▷                     │
            │ No                     S231       ▼
S227        ▼               ┌─────────────────────┐
   ┌─────────────────────┐  │ Acquire Correction Factor │
   │Determine Distribution of│ │  of Power of Influence   │
   │ Power of Influence  │   └─────────────────────┘
   └─────────────────────┘            │
            │               S232       ▼
            │               ┌─────────────────────┐
            │               │Determine Distribution of│
            │               │ Power of Influence  │
            │               └─────────────────────┘
S228        ▼              S233         ▼
   ┌─────────────────────┐  ┌─────────────────────┐
   │      Select         │  │      Select         │
   │Normal Calculation Unit│ │Specific Calculation Unit│
   └─────────────────────┘  └─────────────────────┘
            │                          │
            └──────────┬───────────────┘
S234                   ▼
   ┌─────────────────────┐
   │  Operating Match    │
   │  Calculation Unit   │
   └─────────────────────┘
            │
S235        ▼
   ◁─────────────────────────▷
    │ Switching between   │
    │ Offense and Defense │
    │      Occur?         │
   ◁─────────────────────▷
   No │               │ Yes
      │    S236       ▼
      │  ┌─────────────────────┐
      │  │  Stop Calculation   │
      │  │     Operation       │
      │  └─────────────────────┘
      │               │
      │               ▼
      │      ┌─────────────────┐
      └─────▶│     Return      │
             └─────────────────┘
```

FIG. 48

| | Category of Tactics | Team Tactics | Tendency of Action of Player |
|---|---|---|---|
| ○ | Offensive Type | Low Hit | Batter acts to make low ball batting and runner, if on base, runs paying attention to infield grounder. |
| | | Hight Hit | Batter acts to make high ball batting and runner, if on base, runs with touch-up in mind. |
| ◇ | Offensive Area | Pull | Batter acts to make pull batting and runner, if on base, runs with pulling batting in mind. |
| | | Opposite | Batter acts to make opposite-field batting and runner, if on base, runs with opposite-field batting in mind. |
| ● | Defensive Type | Forward Defense | Paying attention to bunts or grounders and cooperating on double play. |
| | | Beware of Outfield Fly | Outfielders cooperate to avoid errors. |
| ◆ | Defensive Area | Left Shift Defense | Center fielder and left fielder cooperate with each other. Infielders act to relay throwing from left fielder. |
| | | Right Shift Defense | Center fielder and right fielder cooperate with each other. Infielders act to relay throwing from right fielder. |

NON-TRANSITORY STORAGE MEDIUM STORING COMPUTER PROGRAM FOR GAME, AND GAME SYSTEM AND CONTROL METHOD FOR SAME

BACKGROUND OF THE INVENTION

Field of the Invention

The present invention relates to a non-transitory storage medium storing a computer program, and the like, for providing a type of a game in which a match proceeds by a computer repeatedly calculating actions of objects.

Description of the Related Art

As a game system that provides a type of a game in which a match proceeds by making a computer repeatedly calculate actions of objects within a game space, there is known a game system in which a user plays a role of a supervisor, or the like, and can provide instructions as needed while the match is proceeding to reflect selection by the user in the calculation of the actions of the objects (see, for example, Patent Literature 1). Alternatively, there is also a game system in which selection by the user is interposed when a specific condition that is an important momentum in view of proceeding of the match occurs.

CITATION LIST

Patent Literature

Patent Literature 1
JP 2014-198106 A

SUMMARY OF THE INVENTION

Technical Problem

If a user is allowed to make selection at any time during a match, the user may wonder at which timing an instruction should be provided. On the other hand, when an opportunity for the user to perform the selection is entrusted to assessment of a condition by the computer, there is no regularity in the opportunity of selection, and thus, the user has difficulty in grasping at which timing the opportunity of selection arises. Thus, even if the opportunity of selection arises at a certain timing, the user cannot grasp at which timing the opportunity of selection arises next. Accordingly, there is a possibility that strategic characteristics cannot be sufficiently secured because the selection cannot be made also in view of the opportunity of selection to be provided next time and thereafter.

It is therefore an object of the present invention to provide a non-transitory storage medium storing a computer program for a game, and the like, capable of increasing interest of the game by providing moderate regularity and predictiveness in provision of an opportunity of selection by a user.

Solution to Problem

A non-transitory storage medium according to one aspect of the present invention is the non-transitory storage medium storing a computer program for a game for, by causing a computer of a game system to serve as a match calculation unit that calculates an action of each of objects of a user and an opponent within a predetermined field to cause a match between the user and the opponent to proceed, providing by the computer the game in which a first turn that becomes an offensive side of the match and a second turn that becomes a defensive side of the match occur to switch between the user and the opponent on the basis of a calculation result of the action, wherein the computer program is configured to cause the computer to serve as a selection opportunity provision unit that suspends actions of the objects in conjunction with switching of the first turn and the second turn and provides an opportunity of selection regarding the match to the user, and a calculation control unit that controls calculation of the match calculation unit so that the selection by the user is reflected in the calculation by the match calculation unit within a target period until switching of the first turn and the second turn occurs next.

A game system according to one aspect of the present invention is the game system comprising a computer that serves as a match calculation unit that causes a match between a user and an opponent to proceed by calculating an action of each of objects of the user and the opponent within a predetermined field and provides by the computer a game in which a first turn which becomes an offensive side of the match and a second turn which becomes a defensive side of the match occur to switch between the user and the opponent on the basis of a calculation result of the action, wherein the game system is configured to cause the computer to further serve as a selection opportunity provision unit that suspends actions of the objects in conjunction with switching of the first turn and the second turn and provides an opportunity of selection regarding the match to the user, and a calculation control unit that controls calculation by the match calculation unit so that the selection by the user is reflected in the calculation by the match calculation unit within a target period until switching of the first turn and the second turn occurs next.

A control method for a game system according to one aspect of the present invention is the control method for the game system for, by causing a computer of the game system to serve as a match calculation unit that causes a match between a user and an opponent to proceed by calculating an action of each of objects of the user and the opponent within a predetermined field, providing by the computer a game in which a first turn that becomes an offensive side of the match and a second turn that becomes a defensive side of the match occur to switch between the user and the opponent on the basis of a calculation result of the action, wherein the control method is configured to cause the computer to further serve as a selection opportunity provision unit that suspends actions of the objects in conjunction with switching of the first turn and the second turn and provides an opportunity of selection regarding the match to the user, and a calculation control unit that controls calculation by the match calculation unit so that the selection by the user is reflected in the calculation by the match calculation unit within a target period until switching of the first turn and the second turn occurs next.

BRIEF DESCRIPTION OF THE DRAWINGS

FIG. 3 is a view illustrating an example of a basic configuration of the game.

FIG. 5 is a view illustrating an example of a configuration within one turn.

FIG. 6 is a view illustrating an example of a screen to be displayed when a player list is selected.

FIG. 20 is a view illustrating an example of distribution of power of influence set in the field.

FIG. 21 is a view illustrating an example of influence to be provided on a parameter of a player by the power of influence.

FIG. 22 is a view illustrating an example of a relationship between the power of influence and an increment of a value of the parameter.

FIGS. 23A to 23C are views illustrating an example where the power of influence corresponding to a plurality of player cards is summed to determine the distribution of the power of influence.

FIG. 24 is a view illustrating an example of the distribution of the power of influence occurring in accordance with the player cards of an opponent.

FIG. 25 is a view illustrating an example of the distribution of the power of influence when the power of influence occurring regarding the opponent is superimposed to determine the power of influence on the players of the user.

FIG. 28 is a view illustrating an example of a correspondence relationship among team tactics, tendency of action of players, and correction factor to be provided on the power of influence by the team tactics.

FIGS. 33A to 33D are views illustrating an example of correction of the power of influence in association with occurrence of the tactic.

FIGS. 34A to 34C are views illustrating examples of distributions of the correction factors of the power of influence when a plurality of tactics occur.

FIGS. 37A to 37E are views, each of which illustrates an example of action tendency when change of the calculation tendency corresponding to occurrence of the tactic regarding the offense appears as the actions of the players.

FIGS. 38A to 38D are views, each of which illustrates an example of action tendency when the change of the calculation tendency corresponding to occurrence of the tactic regarding the defense appears as the actions of the players.

FIG. 44 is a flowchart illustrating an example of procedure of turn processing to be executed by the game control unit.

FIG. 48 is a view illustrating an example of a correspondence relationship between team tactics in the modification and tendency of actions of players.

DESCRIPTION OF THE EMBODIMENTS

A game system, and the like, according to one embodiment of the present invention will be described below with reference to the accompanying drawings.

[Overall Configuration]

Figure 1:
FIG. 1 is a view illustrating an example of an overall configuration of a game system according to one embodiment of the present invention.

FIG. 1 illustrates an example of an overall configuration of a game system 1 according to the present embodiment. The game system 1 is configured as a client-server system including a plurality of user devices 3 as clients, and a server 4 to be connected to the user devices 3 via a network NT (as one example, the Internet).

The user device 3 is a device to be provided for routine use by a user and is an information communication terminal device having an information communication function via the network NT. As an example, a smartphone 3a or a tablet terminal 3b having a communication function is used as the user device 3. A personal computer (PC) may be used as the user device 3. The user device 3 serves as a game terminal device that provides a predetermined game to the user by executing a program for the predetermined game. Besides, the user device 3 may be a stationary game machine for personal use or for home use to be provided as so-called consumer game machine or may be a portable game device. A game machine for commercial use to be provided as so-called arcade game machine can be also utilized as the user device 3.

The server 4 may be configured with a plurality of server units in combination as appropriate or may be configured with a single server unit. The server 4 may be configured as a cloud server that utilizes a cloud computing technique. The server 4 provides various kinds of services related to the game, for example, a service of matching players to play a match in the game, a service of relaying information on the game to be shared among the user devices 3, and the like, to the user device 3. Besides, a game machine for commercial use, or the like, may be added as appropriate to the game system 1. For example, the game machine for commercial use may be utilized as a client that provides the game in conjunction with the game to be provided at the user device 3. Of course, as described above, the game machine for commercial use, or the like, may be utilized as the user device 3 for playing the game according to the present embodiment.

[Content of Game]

(1) Outline of Game

The game to be provided via the user device 3 includes an element in which each of the user and an opponent plays the match by utilizing a game medium. The opponent may be a real user who utilizes one of the user devices 3 or may be virtual existence to be controlled by a computer of the user device 3. In either case, the opponent is existence that can be also included in concept of the user. In other words, the opponent means the user that becomes a counterpart in the match, when seen from a person who plays the match and may or may not be the real user. The match does not necessarily have to be a one-to-one match. One user may play the match with a plurality of opponents at the same time, or a group including the user may be able to play the match with another group, which is a so-called group match.

The game medium is a medium to be utilized by the user to communicate user's intention regarding various kinds of selection in the game. The game medium may be expressed as various kinds of aspects including a card, an item, a piece, and the like, as long as the game medium can be recognized as a target to be utilized by the user to convey the user's intention. The game medium may be prepared as a virtual medium to be displayed on a game screen or may be provided to the user as a physical medium. For example, when a physical card is utilized as the game medium, information recorded in the card may be acquired at the user device 3, and a virtual game medium corresponding to the physical card may be made to appear in the game on the basis of the acquired information. The physical medium is not limited to a plate card and may be a figure, or the like, in a three-dimensional shape, and may have a configuration that allows the user device 3 to acquire information recorded in the figure, or the like, or information regarding the virtual game medium based on the information recorded in the figure, or the like. Besides, description will be provided below assuming that the game medium is the virtual medium unless otherwise specified.

The game to be provided at the user device 3 may be configured as a game of an appropriate genre as long as the game includes an element of the match. The game further includes an element in which an object acts in a virtual space of the game and the match proceeds on the basis of selection by the user via utilization of the game medium. The object only requires to be recognized as a target that acts within the game. The game medium and the object do not necessarily have to be visually distinguished from each other. For example, when the card is made to appear on the game screen as one example of the game medium, a stereoscopic character, item, or the like, corresponding to the card may be caused to act within the game as the object, and an aspect of the action of the object may be displayed on the game screen. On the other hand, the user may be able to select an action, or the like, of the object displayed on the game screen by directly operating the object. In this case, the object itself serves as the game medium, and the object and the game medium are not visually distinguished from each other. Thus, there is a case where the game medium and the object can be grasped as different existence or a case where the game medium and the object can be grasped as the same existence on the game screen. When the game medium is selected, the object is selected through the selection of the game medium, and thus, the selection of the game medium is substantially synonymous with the selection of the object.

Figure 2:
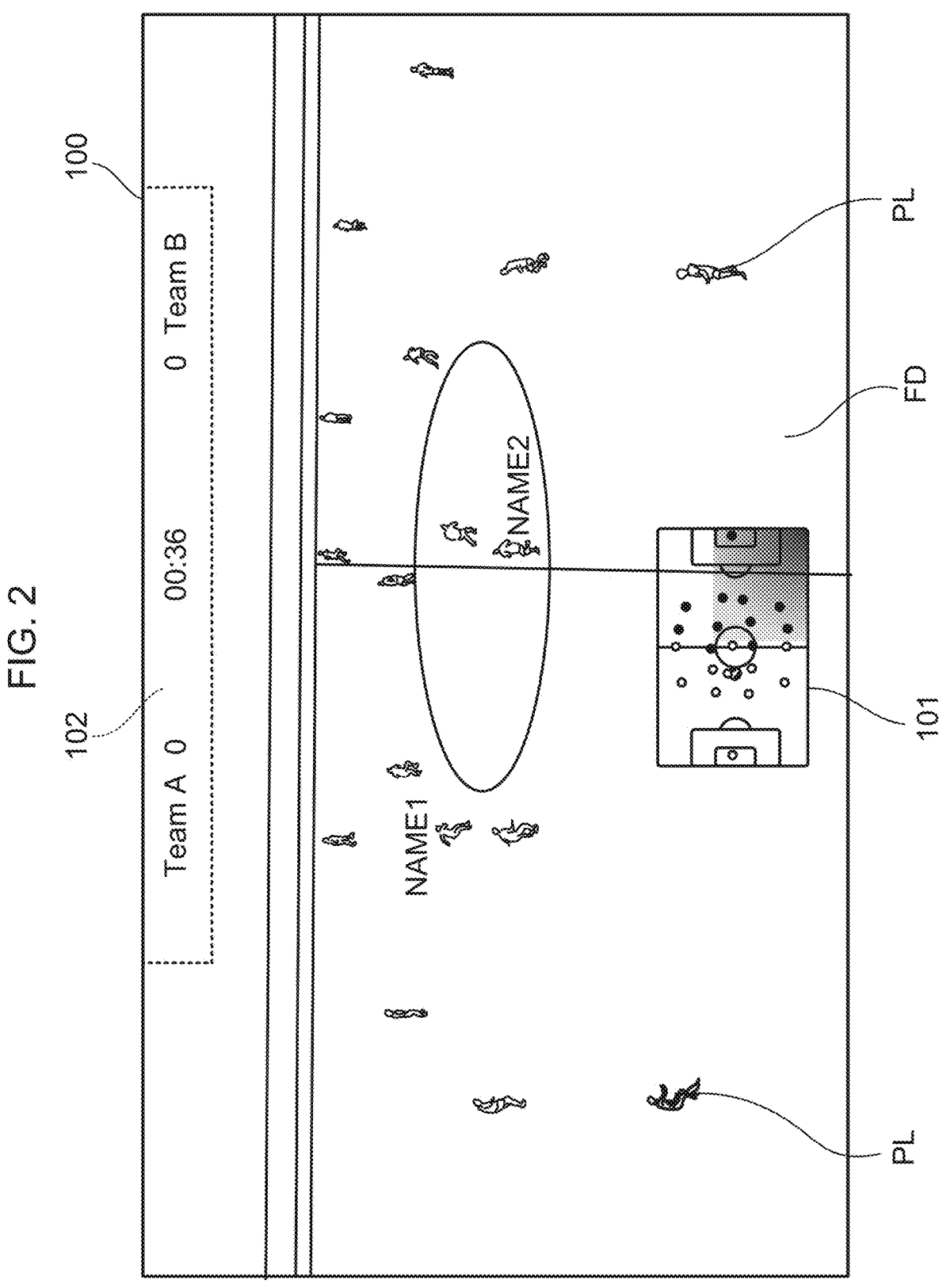
FIG. 2 is a view illustrating an example of a game screen to be displayed during a match in a game to be provided in one embodiment of the present invention.

As described above, while various kinds of match games utilizing the game medium may be provided at the user device 3, in the present embodiment, description will be provided assuming that a soccer game is provided as one example of the various kinds of match games. FIG. 2 illustrates an example of the game screen in the soccer game. As is commonly known, in the soccer game, the match proceeds by making players PL (reference numerals are assigned to only part of the players) of the user and the players PL of the opponent act in a virtual field FD in a similar manner to real soccer. Each of the player PL is an example of the object that operates within the virtual space of the game. The match described here means a match in real soccer, and one match corresponds to one match in soccer. The game screen 100 in FIG. 2 illustrates an aspect where the players PL act in the field FD, observed from a predetermined viewpoint. The viewpoint is automatically switched to an optimal position in accordance with conditions of the match. At the center in a lower portion of the game screen 100, a map 101 indicating positions of the players PL in the whole of the field FD is displayed, and in an upper portion, an information portion 102 indicating team name of the user, team name of the opponent, points, an elapsed period (or may be a remaining period), and the like, is added. Further, attributes such as name regarding at least part of the players PL may be displayed as appropriate.

The action of each player PL is sequentially and repeatedly calculated by the computer of the user device 3.

The match proceeds by making each player PL automatically act in accordance with a series of calculation results. A player card is utilized as one example of the game medium to reflect intention of the user in the actions of the players PL. An opportunity to utilize the player card is provided to the user at an appropriate moment before the match is performed and predetermined moments during the match.

(2) Basic Configuration of Game

Figure 3:
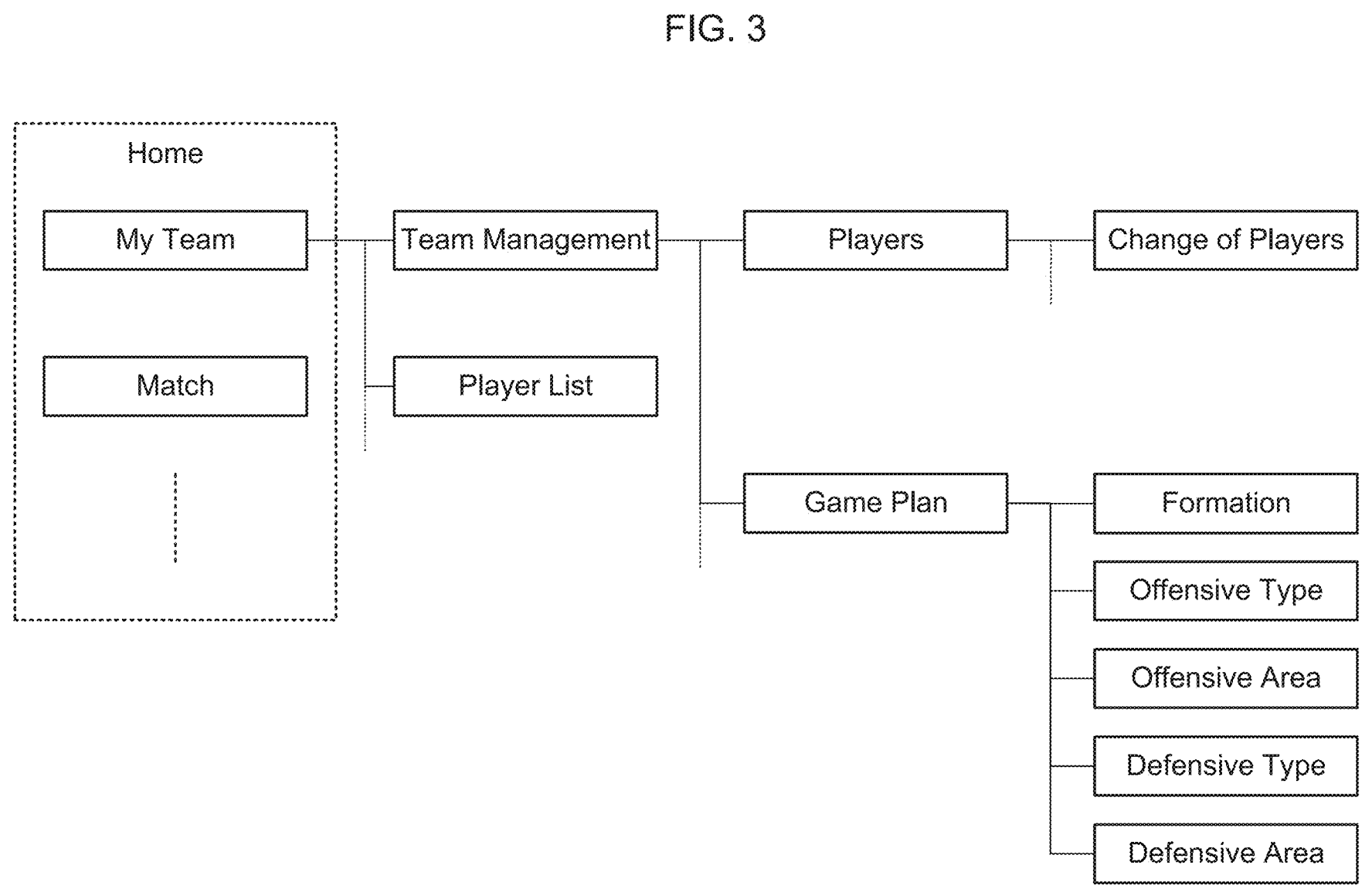

FIG. 3 illustrates a basic configuration of the game. In a similar manner to various games, the game in the present embodiment also has the basic configuration of presenting, to the user, items selectable by the user in a hierarchical manner and executing processing in accordance with selection by the user. When the game program is started at the user device 3, a state becomes a home state in which a predetermined home screen is displayed through login processing and other necessary processing.

In the home, a plurality of selection items including "My Team" and "Match" are presented to the user.

When the "My Team" is selected, a plurality of selection items including "Team Management" and "Player List" are presented to the user. For example, selection items for allowing the user to acquire player cards with a fee or without a fee, selection items for setting various kinds of environments of the game, and the like, may be added as appropriate as items under the "My Team".

The "Player List" is a selection item for the user to confirm details of the player cards possessed by the user. In the player cards, there are set a plurality of types of parameters expressing ability or performance of the player, for example, parameters of running ability, physical strength, kicking ability, dribbling ability and defensive skill. When the "Players" is selected, the user can confirm various kinds of information regarding the player cards possessed by the user.

The "Team Management" is a selection item for the user to perform various kinds of selection regarding utilization of the player cards. When the "Team Management" is selected, "Players" and "Game Plan" are presented to the user as selection items under the "Team Management". When the "Players" is selected, a plurality of selection items including "Change of Players" are further presented to the user. When the "Change of Players" is selected, the user can select arrangement on the field regarding the player cards.

In soccer, there are positions such as forward and midfielder, and in the "Change of Players", the user can select which player card is arranged at which position.

The "Game Plan" is a selection item for selecting tactics in the match. When the "Game Plan" is selected, "Formation", "Offensive Type", "Offensive Area", "Defensive Type" and "Defensive Area" are presented to the user as selection items under the "Game Plan". These items imitate tactics in real soccer. The "Formation" is a selection item for setting a formation (arrangement) of the player cards. For example, the formation of "3-2-3-2" or "4-3-3" can be selected. The "Offensive Type", the "Offensive Area", the "Defensive Type" and the "Defensive Area" indicate types (categories) for allowing the user to select tactics in the match. The "Offensive Type" and the "Offensive Area" are selection items for the user to designate tactics belonging to a category during offense, and the "Defensive Type" and the "Defensive Area" are selection items for the user to designate tactics belonging to a category during defense. Selection in the "Game Plan" affects calculation of actions of the players in the match under a specific condition. Specific examples of the selection items in the "Game Plan" and influence on the calculation of the actions by the selection items will be described later.

(3) Proceeding Procedure of Match

Figure 4:
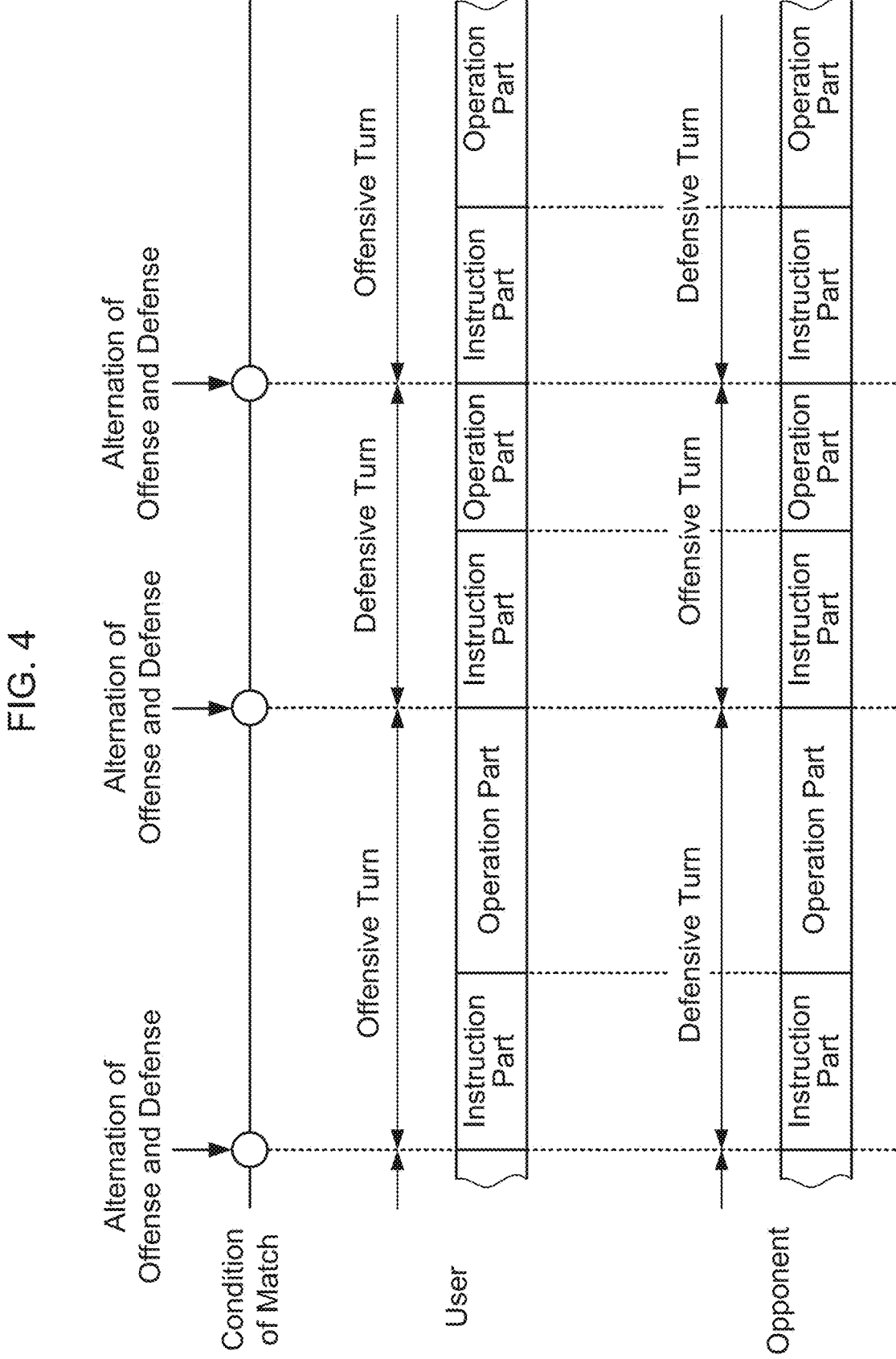
FIG. 4 is a view illustrating an example of a mechanism of a turn in the match.

Next, an example of proceeding procedure of the match when the "Match" is selected in the home in FIG. 3 will be described. When the "Match" is selected, the match of soccer is started on the basis of the selection in the "Team Management". As described above, the actions of the players in the match are calculated by the computer, and by the calculation being repeated, each player automatically acts, and the match proceeds. In contrast, to provide an opportunity of the selection to the user in the middle of the match and reflect the selection result in the calculation, a turn system is introduced in the game of the present embodiment. FIG. 4 illustrates an example of a mechanism of the turn system. In the example in FIG. 4, the match is divided into a plurality of turns at switching of offense and defense between the user and the opponent. Switching between the offense and the defense occurs when control of a ball is switched between the user side and the opponent side as a result of the calculation of the actions of the players. If it cannot clearly be distinguished which of the user and the opponent controls the ball, for example, in a situation where loose ball occurs, it is only necessary to determine that switching between the offense and the defense occurs at a time point at which the control of the ball is clearly switched.

Figure 5:
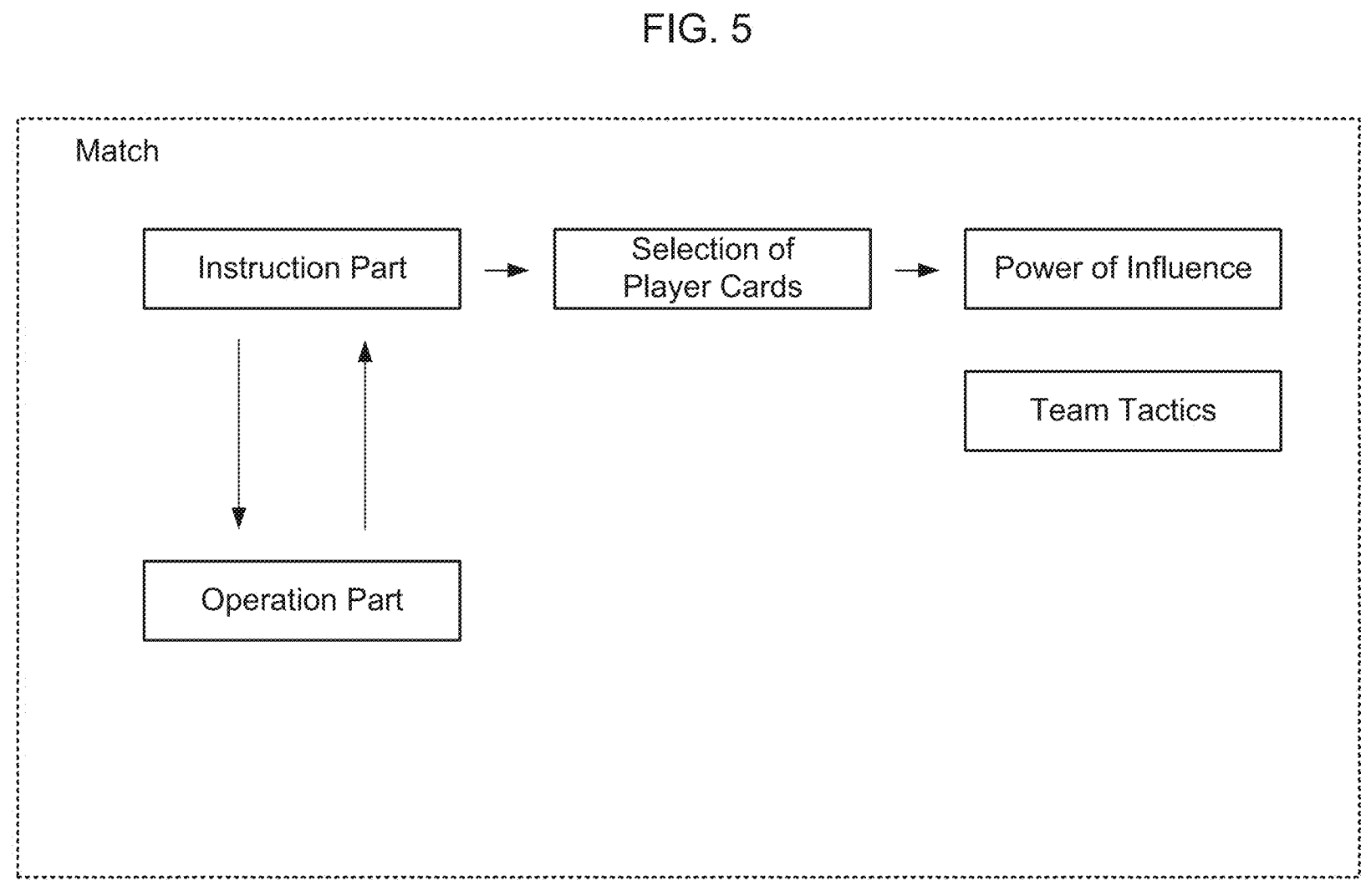

The turn includes an offensive turn as one example of the first turn and a defensive turn as one example of the second turn. These turns occur mutually and concurrently at the user and the opponent. In other words, when the user is in the offensive turn, the opponent is in the defensive turn, and when the opponent is in the offensive turn, the user is in the defensive turn. Each of the offensive turn and the defensive turn is divided into an instruction part and an operation part. As illustrated in FIG. 5, the instruction part is a part in which the user and the opponent select the player cards. The selection of the player cards in the instruction part is associated with application of the "Power of Influence" and application of the "Team Tactics" with respect to the calculation in the operation part. The "power of influence" and "team tactics" affect the calculation in the operation part. The influence is set so that an advantageous state occurs at least for the user. Details will be described later.

Returning to FIG. 4, the instruction part is started in conjunction with the switching of the turns and ends at a time point at which a predetermined time limit has elapsed or when each of the user and the opponent finishes selection even before the time limit has elapsed. In the operation part, the actions of the players are calculated with reference to results of the selection in the instruction part, and the players automatically act in accordance with the calculation result. When the switching between offense and defense occurs on the basis of the calculation result in the operation part, the offensive turn and the defensive turn of one time ends, and the offensive turn and the defensive turn are switched between the user and the opponent. Then, the instruction part of the next turn is started. The match is divided into the first half and the second half, and the turn ends also at a time point at which match time of each of the first half and the second half has elapsed.

(4) Specific Example of Game Content

Next, a specific example of game content will be described with reference to FIG. 6 to FIG. 39.

(4-1) Player Cards

FIG. 6 illustrates an example of a player list screen 110 to be displayed when the "Player List" in FIG. 3 is selected. On the player list screen 110, a list of player cards CD possessed by the user is displayed. The player card CD includes a player image cd1 expressing the player with the face, or the like, a strong position cd2, a parameter overall value cd3 and cost cd4. The strong position cd2 indicates a position on the formation, at which the player corresponding to the player card CD can do best, with alphabetical characters which are abbreviated name of the position. For example, "CF" is displayed as the strong position cd2 in the player card CD corresponding to the player who can do best in center forward. The parameter overall value cd3 is a value obtained by summing up values of various kinds of parameters set in association with the player card CD using a predetermined calculation formula. The parameter overall value cd3 indicates overall ability of the player corresponding to the player card CD. A player with a higher numerical value has higher ability. The cost cd4 indicates cost required when the player card CD is utilized in the match. The cost cd4 may be differentiated in accordance with the player cards CD so that cost becomes higher for higher overall ability.

When one of the player cards CD is selected on the player list screen 110, a detail screen 111 indicating details of the player is displayed, for example, in a pop-up window form. A state of the detail screen 111 can be switched between a state (lower left in FIG. 6) where basic information such as name and a type of the player corresponding to the player card CD is displayed, and a state (lower right in FIG. 6) where values of various kinds of the parameters associated with the player card CD are displayed.

(4-2) Arrangement of Player Cards

Figure 7:
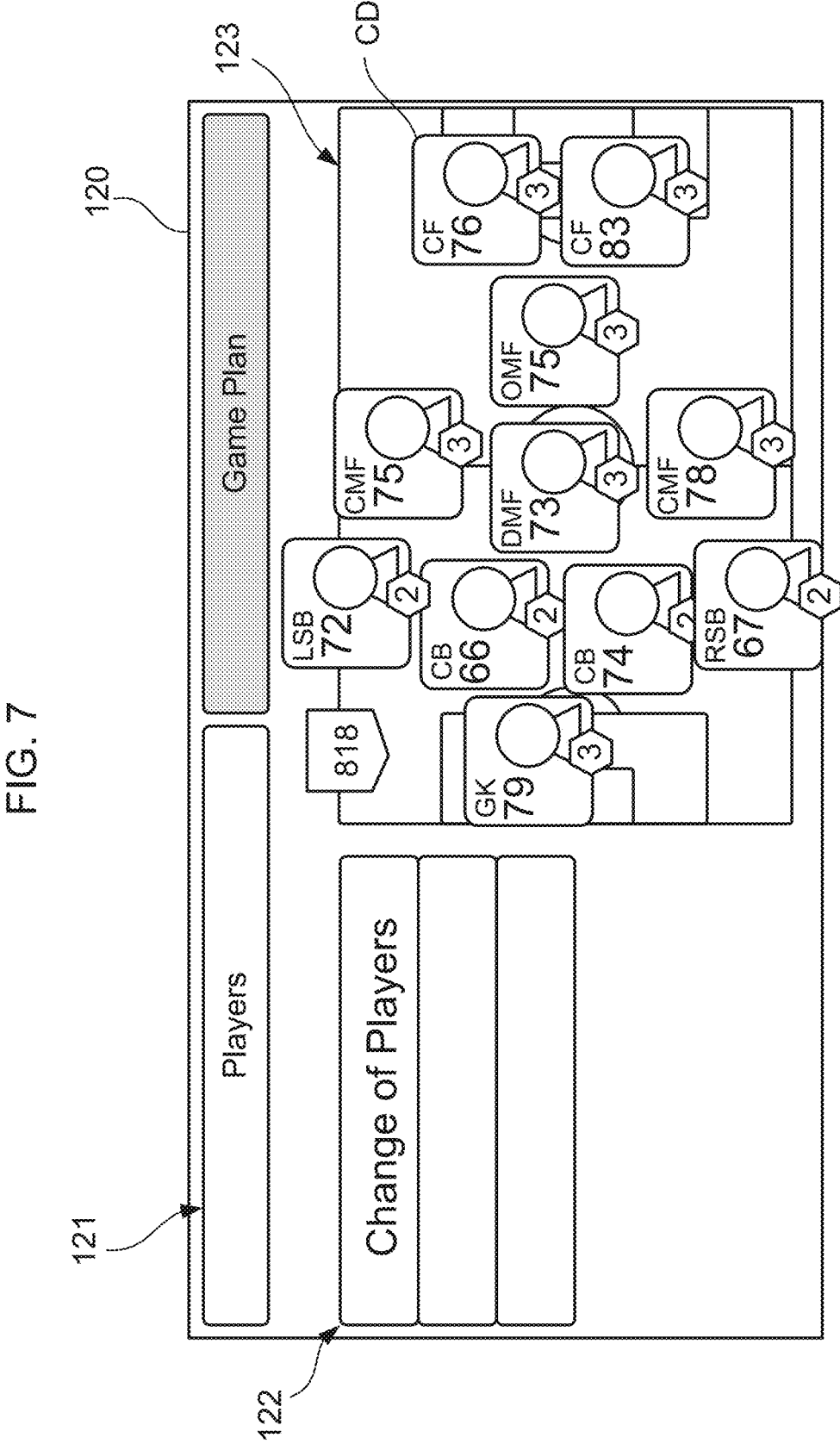
FIG. 7 is a view illustrating an example of a screen to be displayed when display regarding a player is selected.

FIG. 7 illustrates an example of a team management screen 120 to be displayed when the "Team Management" is selected. The team management screen 120 includes selection regions 121 respectively corresponding to the "Players" and the "Game Plan" which are selection items under the "Team Management". Display content of the team management screen 120 changes in accordance with selection of the selection regions 121. FIG. 7 illustrates display the content when the "Players" is selected. The team management screen 120 in FIG. 7 includes a menu 122 indicating items selectable by the user and a map 123 indicating a field of the soccer. On the map 123, there are set positions on the formation at which the player cards CD can be disposed. In FIG. 7, the player cards CD are disposed at the respective positions. Arrangement of the positions in the map 123 in FIG. 7 changes in accordance with the selection of the "Formation" in FIG. 3. Eleven player cards CD which are disposed at eleven positions on the map 123 configure a deck in the match. The players corresponding to the player cards CD included in the deck are the players who participate in the match in the team of the user.

Figure 8A:
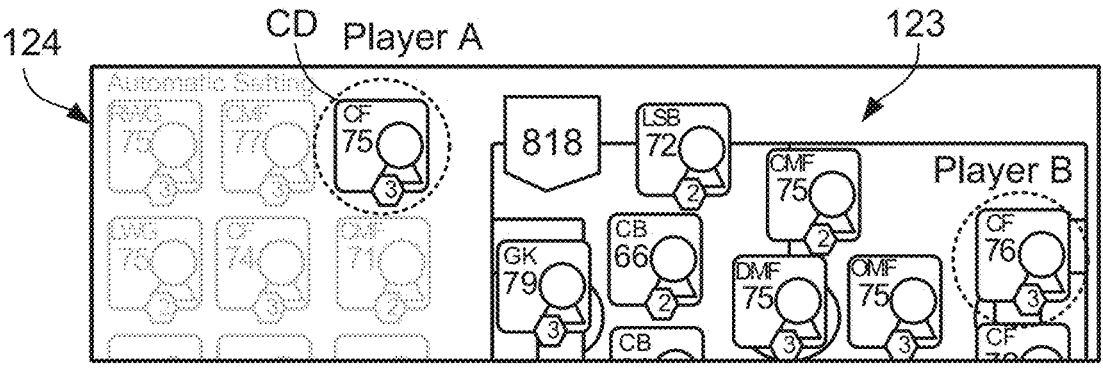
FIGS. 8A to 8C are views illustrating examples of screens to be displayed upon change of arrangement of players.
Figure 8B:
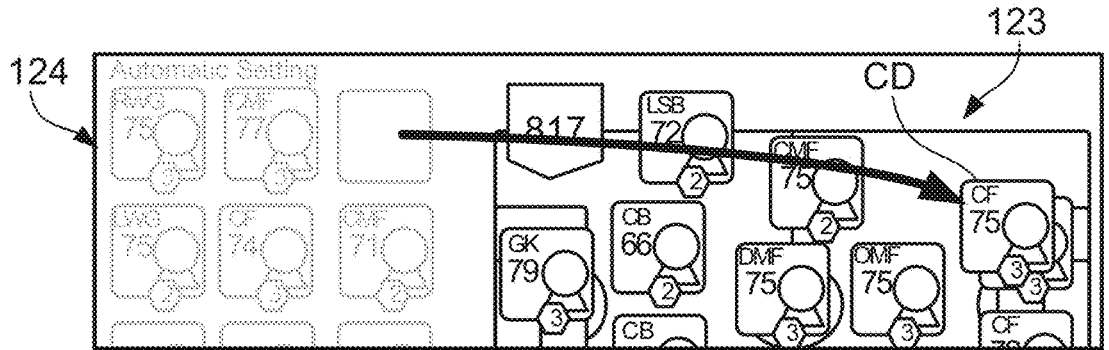

When the "Change of Players" is selected from the menu 122, display content of the team management screen 120 changes to the state in FIGS. 8A to 8B. In the state in FIGS. 8A to 8C, the player cards CD available in the match are lined up and displayed in a candidate list 124 on the left side. The player cards CD in the candidate list 124 are at least part of the player cards possessed by the user. Player cards CD that are not possessed by the user may be added as appropriate to the candidate list 124 by control of the computer. For example, when the user does not possess eleven or more player cards CD necessary for the match, appropriate player cards CD may be added to the candidate list 124.

Figure 8C:
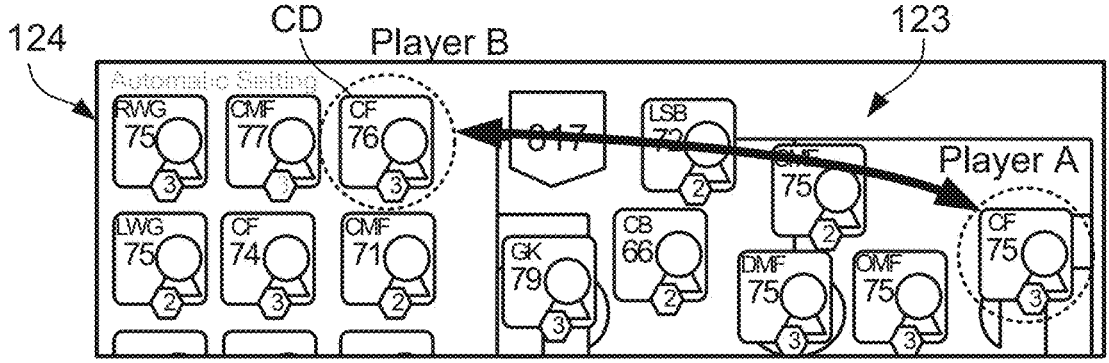

As illustrated in FIG. 8A, the user touches and selects one of the player cards CD (the card of a player A in the illustrated example) from the candidate list 124, and when the user performs drag operation on the selected player card CD to one of the positions on the map 123 as illustrated in FIG. 8B, the player card CD (the card of a player B in the illustrated example) disposed at a position of a destination is replaced with the player card CD subjected to the drag operation as illustrated in FIG. 8C. The user can dispose the player cards CD at respective eleven positions on the formation as appropriate by performing such operation as appropriate. When the player cards CD at the respective positions on the map 123 are determined as described above, positions as roles to be played by the respective players on the field are determined in accordance with the arrangement of the player cards CD.

Figure 9:
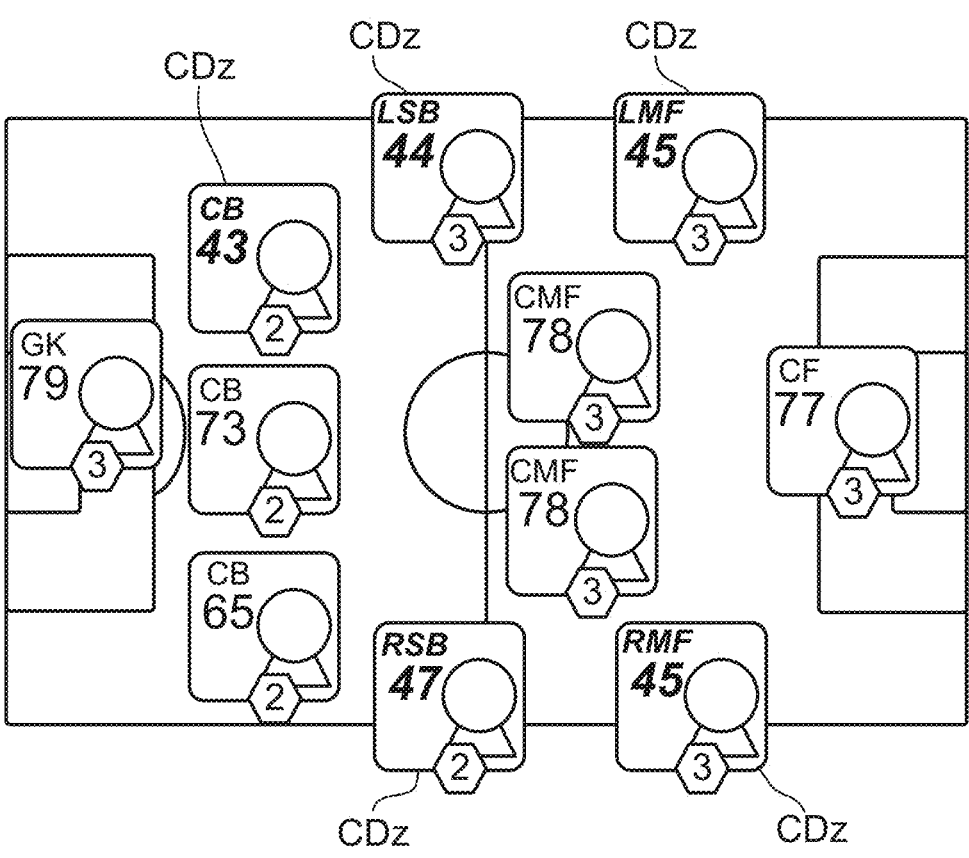
FIG. 9 is a view illustrating an example where a player card is disposed at a position different from a strong position.

With respect to the arrangement of the player cards CD, automatic setting in which the computer automatically determines the arrangement of the player cards CD may be able to be selected. In the automatic setting, as an example, the computer may select the player cards CD from the candidate list 124 and dispose the player cards CD at respective positions while giving priority to match between the positions on the formation and the strong positions of the player cards CD. Further, in the selection in the "Change of Players", the player card CD may be disposed at a position different from the strong position. However, the overall value of the parameters decreases for the player card CD that is disposed at the position other than the strong position. As an example, the player card denoted by a reference numeral CDz in FIG. 9 is disposed at the position other than the strong position, and thus, the parameter overall value of the player card decreases. In this case, a visual element such as display color may be changed concerning the strong position and the parameter overall value to clearly specify mismatch between the position and the strong position and decrease of the parameter overall value.

The decrease in the parameter overall value acts to reduce ability, and the like, of the player and limit the actions of the player compared to a case where the player card CD is disposed at the strong position. Thus, disposing the player cards CD at the strong positions is advantageous in the match. It is therefore preferable for the user to collect player cards CD having the strong positions at respective positions for each of the positions on the formation, and in this point, motivation of collecting various kinds of player cards CD can be provided to the user. Besides, even though the player card CD can be disposed at the position according to the strong position thereof, the user can freely dispose the player card CD at the position other than the strong position. For example, when the user desires to play the match while preferentially utilizing a favorite player card CD, the user can dare to dispose the player card CD at the position other than the strong position.

(4-3) Selection of Game Plan

Figure 10:
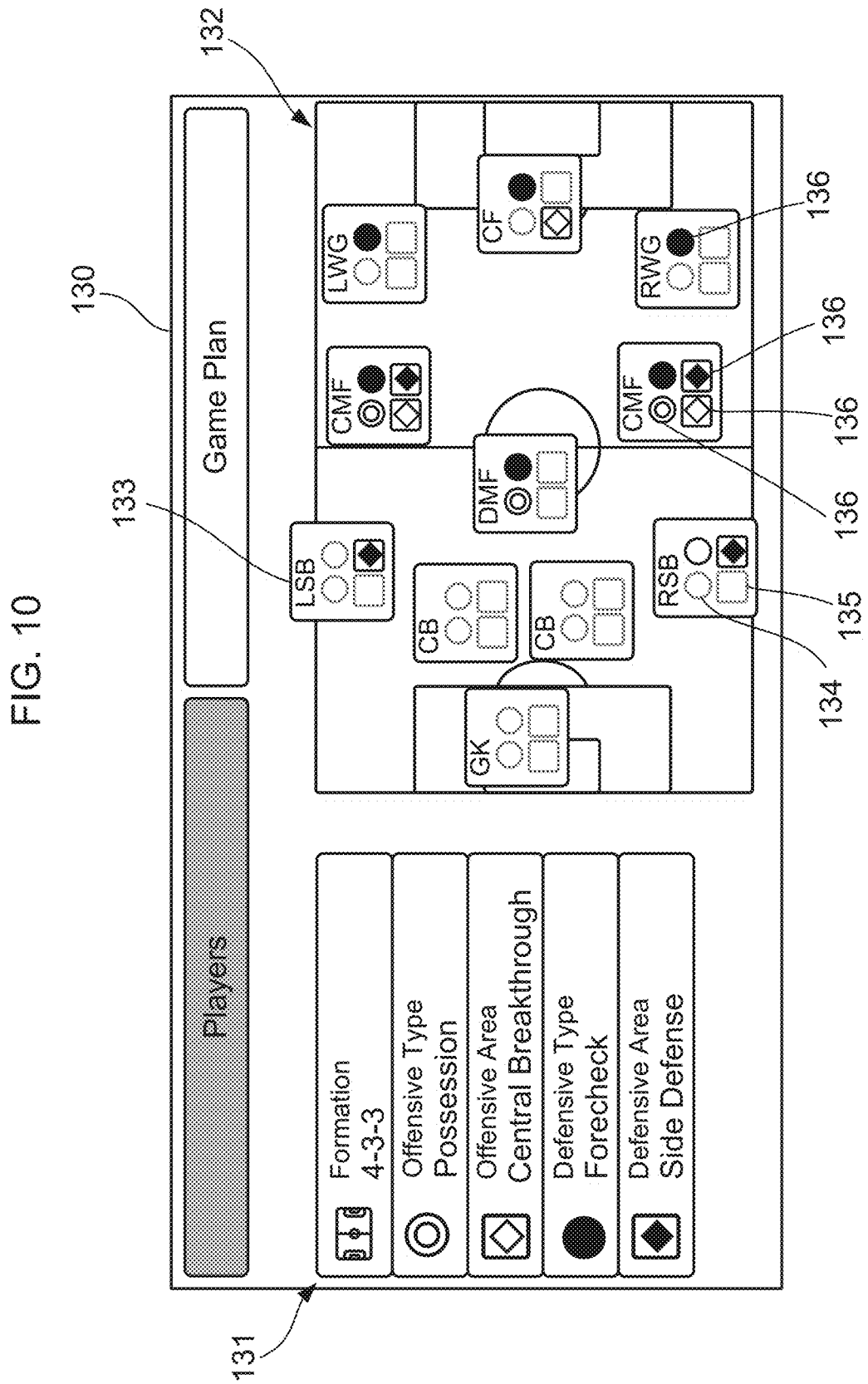
FIG. 10 is a view illustrating an example of a screen to be displayed when a game plan is selected.

FIG. 10 illustrates display content of a game plan setting screen 130 to be displayed when the "Game Plan" is selected in the team management. The game plan setting screen 130 includes a menu 131 including as selection items, the "Formation", the "Offensive Type", the "Offensive Area", the "Defensive Type" and the "Defensive Area", and a map 132 indicating the formation on the field. The selection items of the menu 131 correspond to the selection items under the "Game Plan" in FIG. 3. In the map 132, position indexes 133 are displayed in accordance with the arrangement corresponding to the formation selected in the "Formation". In the position indexes 133, the positions on the formation are displayed using abbreviations of the positions. For example, "CF" is assigned to the position index 133 at the center forward, and "LWG" is assigned to the position index 133 corresponding to left wing.

Two circular blanks 134 and two rectangular blanks 135 are provided at each position index 133. A tactic mark 136 is displayed at part of the blanks 134 and 135. There are four types of tactic marks 136 respectively in association with the "Offensive Type", the "Offensive Area", the "Defensive Type" and the "Defensive Area" which are the selection items of the menu 131. The tactic mark 136 associates team tactics selected by the user with the player cards CD regarding each of the "Offensive Type", the "Offensive Area", the "Defensive Type" and the "Defensive Area". Two blanks 134 and two blanks 135 are provided for one position index 133, and thus, a total of up to four tactic marks 136 including two tactic marks 136 on the offensive side and two tactic marks 136 on the defensive side, can be set for one position. On the other hand, there may be a position at which the tactic marks 136 are not set. In the example in FIG. 10, four tactic marks 136 are set at the position index 133 of "CMF", and the tactic mark 136 is not set at each of the position indexes 133 of "GK" and "CB".

The tactic marks 136 are visually differentiated from each other in accordance with the corresponding team tactics. The tactic marks 136 may have such appearance that enables a correspondence relationship with the selection items such as the "Offensive Type" to be identified as appropriate. Further, the tactic mark 136 may be identifiable as to whether the tactic mark 136 is associated with offense or defense by providing a common element to the tactic marks 136 of the "Offensive Type" and the "Offensive Area" which are tactics regarding offense and providing a common element different from the element of the tactics on the offensive side to the tactic marks 136 of the "Defensive Type" and the "Defensive Area" which are tactics regarding defense. For example, a common element may be provided such that uniform color is used for the tactic marks 136 on the offensive side, and color different from the color of the tactic marks 136 on the offensive side is used for the tactic marks 136 on the defensive side. To indicate correspondence with the tactic marks 136, the tactic marks 136 corresponding to the respective selection items are provided to the "Offensive Type", the "Offensive Area", the "Defensive Type" and the "Defensive Area" of the menu 131. A correspondence relationship between the positions on the formation and the tactic marks 136 is changed as appropriate in accordance with the selection in each of the "Formation", the "Offensive Type", the "Offensive Area", the "Defensive Type" and the "Defensive Area". A specific example of the change in accordance with the selection will be described later.

Figure 11:
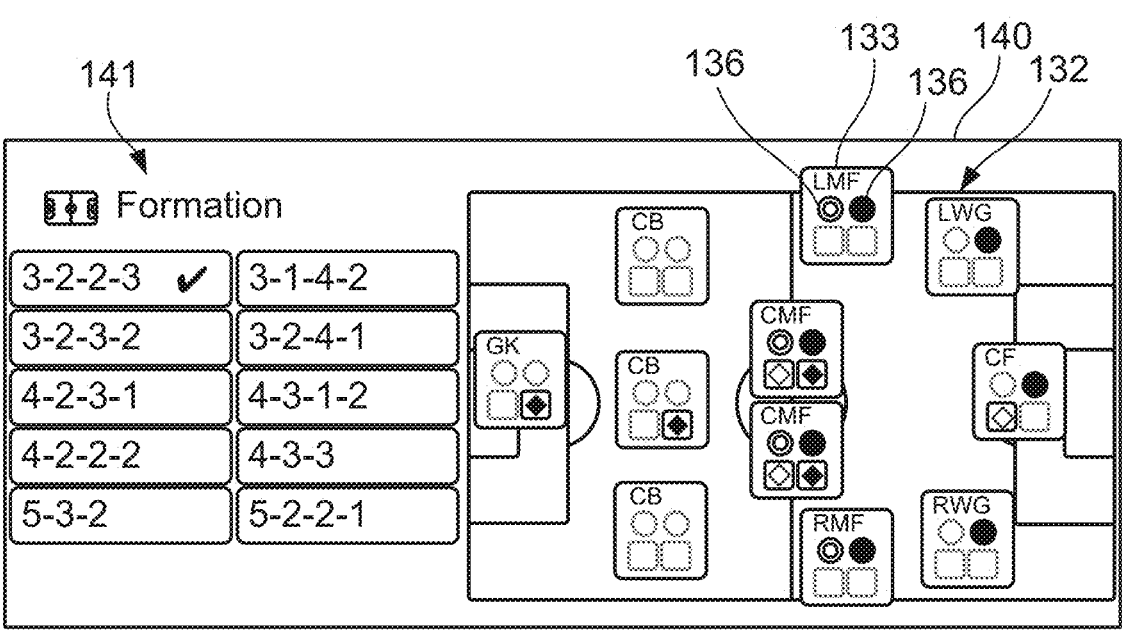
FIG. 11 is a view illustrating an example of a screen to be displayed when a formation is selected.
Figure 12:
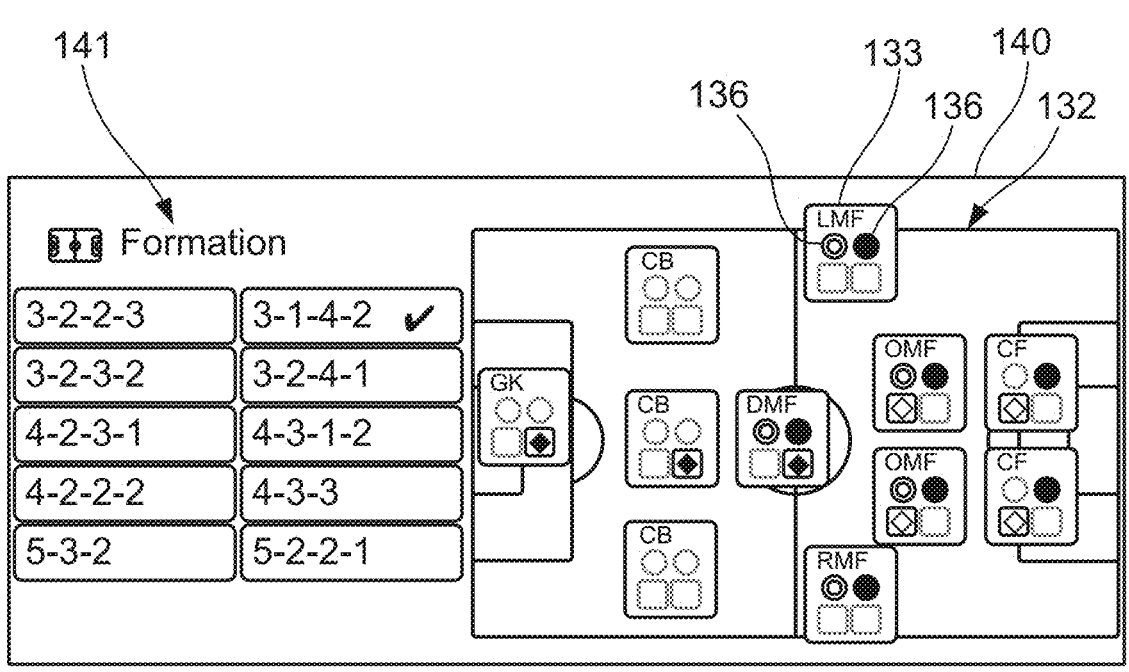
FIG. 12 is a view illustrating another example of the screen to be displayed when the formation is selected.

When the "Formation" is selected from the menu 131 in FIG. 10, a formation selection screen 140 in FIG. 11 is displayed. The formation selection screen 140 includes a menu 141 that indicates candidates for the formation which are selectable by the user, and the map 132. While the map 132 is the same as the map 132 in FIG. 10, arrangement of the position indexes 133 and a correspondence relationship between the position indexes 133 and the tactic marks 136 change in accordance with the formation selectively displayed on the menu 141. For example, FIG. 11 illustrates the map 132 when formation of "3-2-2-3" is selected, and FIG. 12 illustrates the map 132 when formation of "3-1-4-2" is selected.

Figure 13:
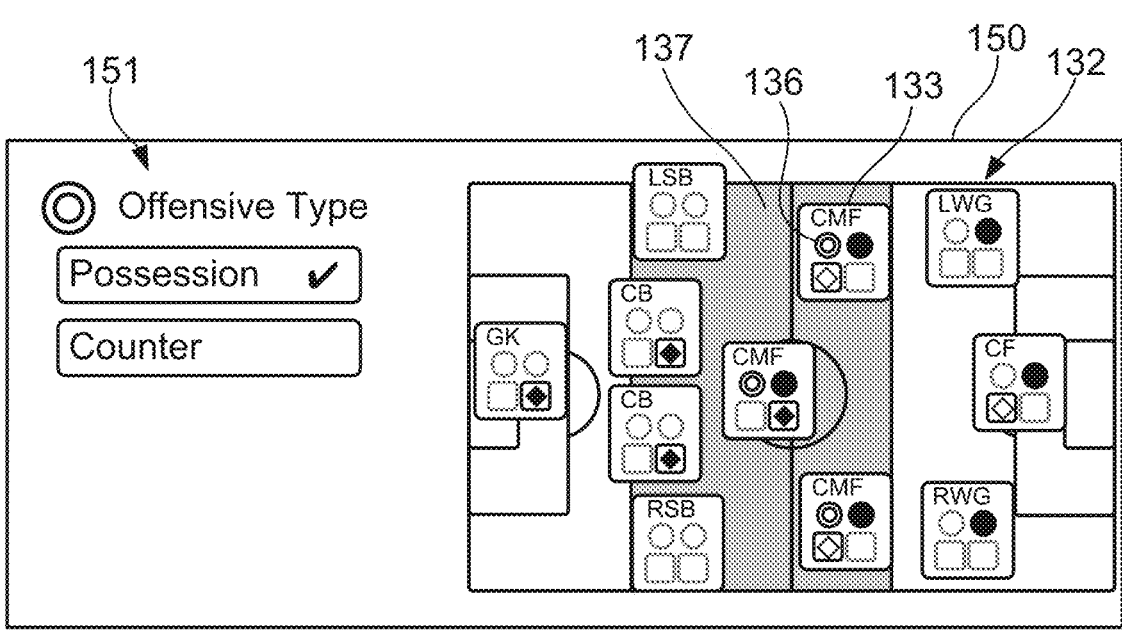
FIG. 13 is a view illustrating an example of a screen to be displayed when selecting tactics of an offensive type.
Figure 14:
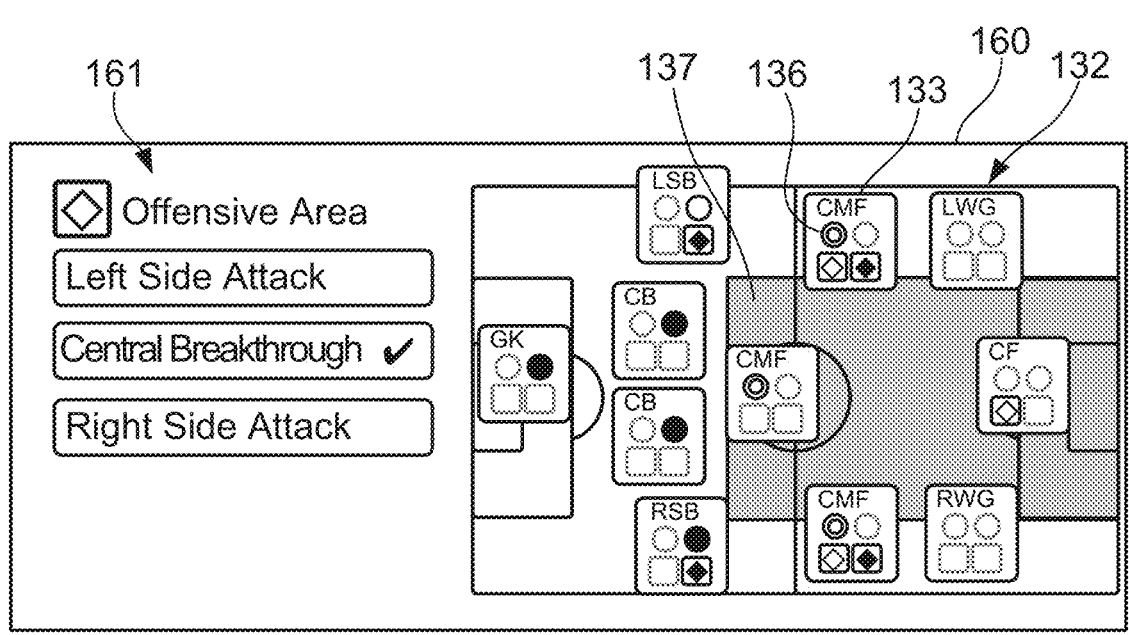
FIG. 14 is a view illustrating an example of a screen to be displayed when selecting tactics of an offensive area.
Figure 15:
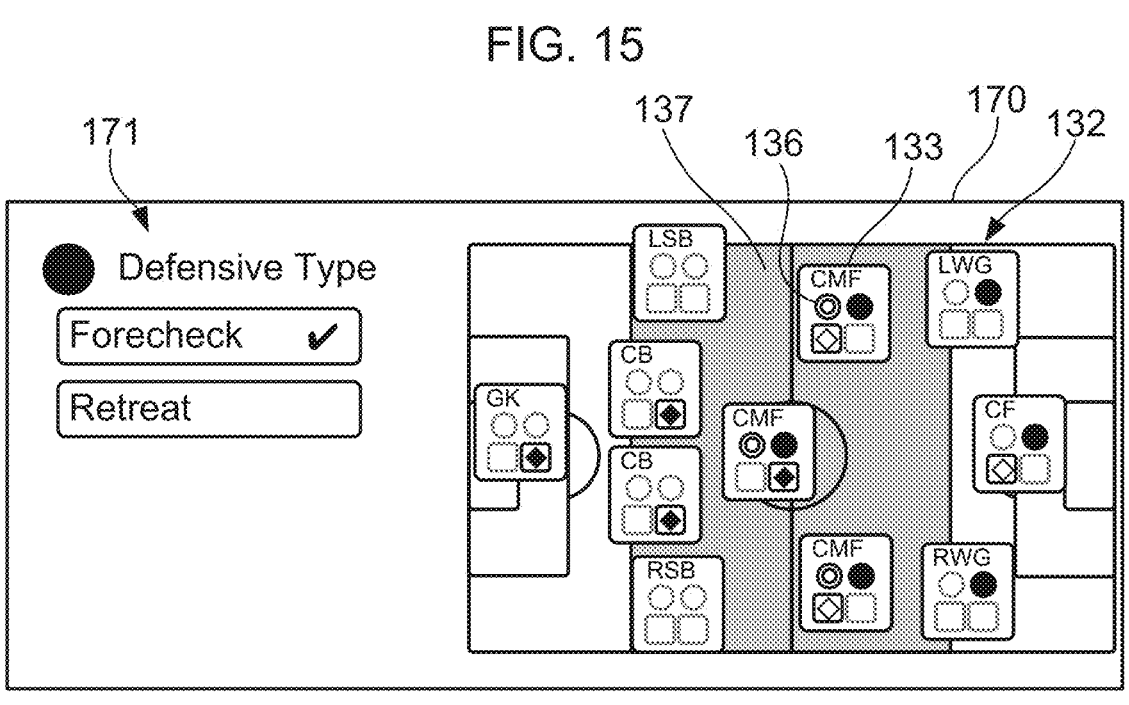
FIG. 15 is a view illustrating an example of a screen to be displayed when selecting tactics of a defensive type.
Figure 16:
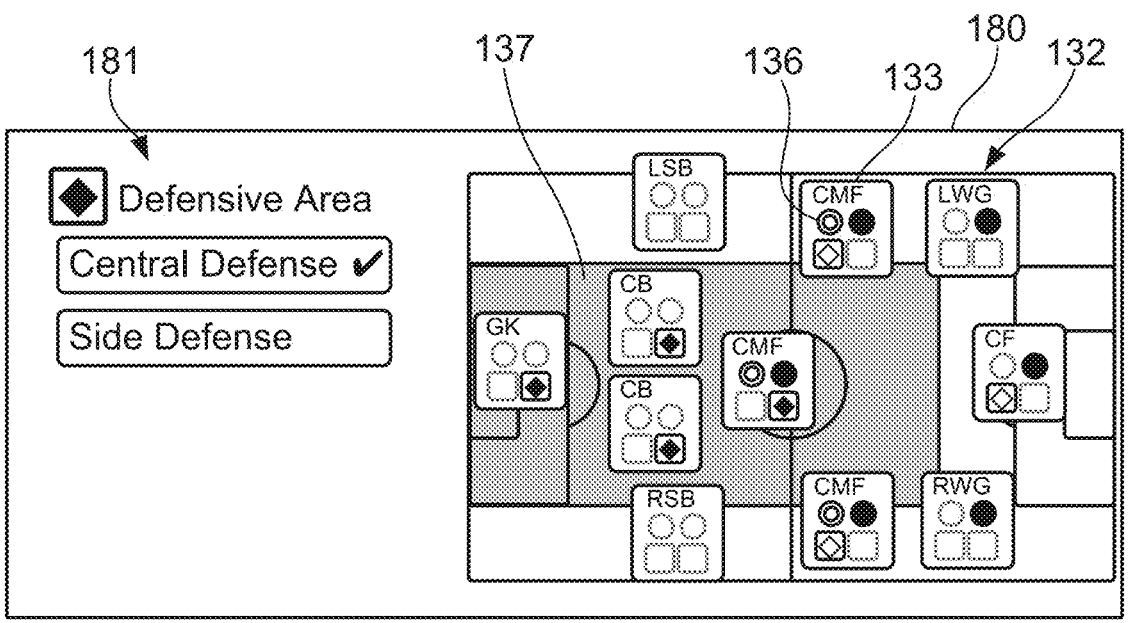
FIG. 16 is a view illustrating an example of a screen to be displayed when selecting tactics of a defensive area.

When the "Offensive Type" is selected from the menu 131 in FIG. 10, an offensive type selection screen 150 in FIG. 13 is displayed, when the "Offensive Area" is selected, an offensive area selection screen 160 in FIG. 14 is displayed, when the "Defensive Type" is selected, a defensive type selection screen 170 in FIG. 15 is displayed, and when the "Defensive Area" is selected, a defensive area selection screen 180 in FIG. 16 is displayed. Each of the screens 150, 160, 170, 180 includes menus 151, 161, 171, 181 indicating selection items which are selectable by the user and the map 132 in common with the formation selection screen 140. As one example of the selection items, "Possession" and "Counter" are prepared on the offensive type selection screen 150 in FIG. 13, "Left Side Attack", "Central Breakthrough" and "Right Side Attack" are prepared on the offensive area selection screen 160 in FIG. 14, "Forecheck" and "Retreat" are prepared on the defensive type selection screen 170 in FIG. 15, and "Central Defense" and "Side defense" are prepared on the defensive area selection screen 180 in FIG. 16. The arrangement of the tactic marks 136 in the map 132 changes as appropriate in accordance with the selection of the selection items. Further, a tactic area index 137 is further displayed at part of the map 132 on the screens 150, 160, 170 and 180 in FIG. 13 to FIG. 16. The tactic area index 137 indicates a target area in which the team tactic is to be applied. The tactic area index 137 may be indicated using, for example, gradation, or the like. The position of the tactic area index 137 changes as appropriate in accordance with the selection of each of the "Offensive Type", the "Offensive Area", the "Defensive Type" and the "Defensive Area". A specific example of a correspondence relationship between the selection items and target areas of the team tactics will be described later.

(4-4) Selection in Instruction Part

Figure 17:
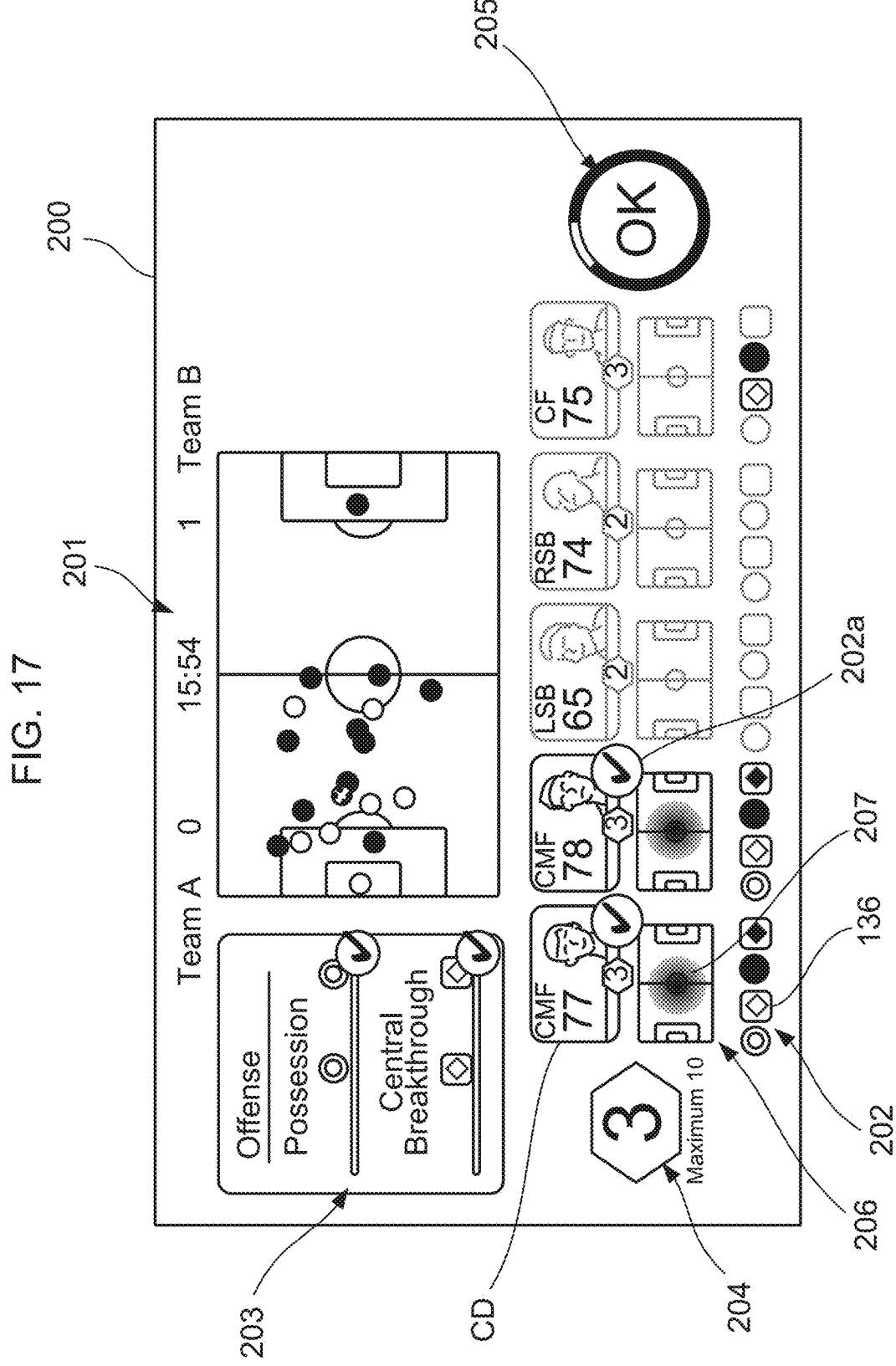
FIG. 17 is a view illustrating an example of an instruction screen to be displayed in an instruction part of each turn.

FIG. 17 illustrates an example of an instruction screen 200 to be displayed in the instruction part of each turn during the match. The instruction screen 200 includes a match condition display portion 201, a hand display portion 202, a tactic display portion 203, a cost display portion 204 and a remaining period display portion 205. In the match condition display portion 201, there are displayed, as conditions of the match at an instruction part start time point, in other words, at an end point of the previous operation part, points of teams of the user and the opponent, an elapsed period of the match, a position of the ball in the field, and the positions of the players of a friend and foe in the field in a distinguishable manner.

In the hand display portion 202, a predetermined number of player cards CD (as an example, five player cards) selectable by the user in the instruction part of this time are displayed as a hand. The hand is selected from eleven player cards CD arranged at a deck of the user, that is, respective positions of the formation using a predetermined method. A specific example of selection will be described later. Selection marks 202a such as check marks are provided to the player cards CD selected in the hand display portion 202.

In the hand display portion 202, influence power maps 206 are displayed to correspond to the player cards CD on a one-to-one basis. The influence power maps 206 of the selected player cards CD are displayed in a distinguishable manner to be more prominently than the influence power maps 206 of the player cards CD which are not selected using a difference in brightness, or the like. To the influence power map 206, area images 207 indicating effect areas in the field set to correspond to the player cards CD are added. The effect area is an area on the field in which power of influence occurs in response to selection of the player card CD. The power of influence is concept of, when the player acts within the effect area, predetermined influence to be provided on the calculation of the actions. Setting positions of the effect areas are differentiated in accordance with the player cards CD.

In the hand display portion 202, tactic marks 136 associated with the player cards CD are also displayed. As described above, the player cards CD and the tactic marks 136 are associated with each other by the player cards CD being disposed at respective positions on the formation illustrated in FIG. 10 to FIG. 16 as an example. For example, when the player card CD is disposed at a position to which the tactic mark 136 corresponding to the offensive type is provided, the player card CD is associated with the tactic mark 136. In other words, the tactic marks 136 are not directly associated with the player cards CD. The tactic marks 136 are associated with the player cards CD by way of the positions on the formation.

In the tactic display portion 203, which of the offensive turn and the defensive turn, the user is in is displayed in a distinguishable manner using a term of "Offense" or "Defense". In the tactic display portion 203, when in the offensive turn, tactics of the "Offensive Type" and the "Offensive Area", and when in the defensive turn, tactics of the "Defensive Type" and the "Defensive Area" are further displayed regarding the tactic selected by the user in the game plan. In the example in FIG. 17, it is indicated that the user is in the offensive turn, "Possession" is selected as the offensive type, and "Central Breakthrough" is selected as the offensive area.

In the tactic display portion 203, the tactic marks 136 corresponding to the tactics on the offensive side or the defensive side are displayed in accordance with the offensive turn or the defensive turn on the basis of the selection of the player cards CD in the instruction part. For example, when in the offensive turn, the tactic marks 136 respectively corresponding to the "Offensive Type" and the "Offensive Area" are displayed on the basis of selection of the player cards CD. When the user selects one player card CD associated with the tactic mark 136 corresponding to the "Offensive Type", in response to the selection, one tactic mark 136 is displayed also regarding the "Offensive Type" in the tactic display portion 203. The number of the tactic marks 136 displayed in the tactic display portion 203 corresponds to a status of achievement of occurrence conditions of the tactics. In other words, an occurrence condition of each tactic is satisfied when a predetermined number of player cards CD associated with the corresponding tactic mark 136 are selected in the instruction part, and an effect corresponding to the tactic is reflected in the calculation in the operation part. In the example in FIG. 17, when two player cards CD associated with the tactic mark 136 of the "Offensive Type" are selected, the occurrence condition regarding the tactic of "Possession" as the "Offensive Type" in the tactic display portion 203 is satisfied. However, it is only necessary to select at least two player cards CD associated with the same tactic to satisfy the occurrence condition of the tactic. Selection of three or more player cards CD associated with the same tactic is not inhibited.

On the selection of the player cards CD, there are imposed restrictions by cost. The Cost (hereinafter, also referred to as upper limit cost) that can be consumed in the instruction part of one time is indicated in the cost display portion 204. When the player card CD is selected, the cost set for the player card CD (the cost cd4 in FIG. 6) is subtracted from the upper limit cost in the cost display portion 204. Thus, the user can select one or more player cards CD in a range not exceeding the upper limit cost. The upper limit cost increases at an appropriate timing. For example, a predetermined value is added to the upper limit cost when the instruction part is started. A maximum value may be set for the upper limit cost. In the example in FIG. 17, it is indicated that the maximum value of the upper limit cost is 10. Further, time limit is provided in the instruction part. In the remaining period display portion 205, a remaining period in the instruction part of one time is displayed in an aspect of, for example, a pie chart.

As can be clear from the above description, the selection of the player cards CD in the instruction part can be reflected in calculation in the operation part in terms of two points of the power of influence and the team tactics. The user needs to select the player cards CD in consideration of the area images 207 corresponding to the player cards CD and the tactic marks 136 within a range of the upper limit cost and within a limited period in either case of the offensive turn and the defensive turn. In other words, the user is required to strategically select the player cards CD in consideration of which position within the field should be made the effect area indicated in the area image 207 or at which position the selected team tactics should be caused to occur. This increases strategic characteristics of the game, which eventually increasing interest of the game.

The player cards CD are not directly associated with the tactics, but the player cards CD are associated with the tactics by way of the user's options of positions on the formation. Thus, the user can set the player cards CD as game media to be used for causing desired tactics to occur by way of the selection of the positions at which the player cards CD are to be arranged without collecting the player cards CD corresponding to various kinds of tactics. This allows the user who does not sufficiently collect the game media to cause various kinds of tactics to occur. This allows many users to enjoy strategic characteristics and amusement characteristics of the game occurring by using the tactics, which improves the interest of the game.

As described above, the positions on the formation may include a position at which a plurality of tactic marks 136 are displayed. For example, in FIG. 10, a total of four tactic marks 136 including two tactic marks on the offensive side and two tactic marks on the defensive side are set at the position index 133 of "CMF". The tactics of all categories are associated with the player card CD disposed at the position. When the player card CD is included as the hand in the hand display portion 202, the user can select the player card CD as a player card CD necessary for causing the tactic to occur regardless of whether the user is in the offensive turn or the defensive turn. Such a player card CD serves as an example of a specific game medium that can be used for exerting an effect in either the offensive turn or the defensive turn.

By causing at least one player card CD to serve as an example of the specific game medium, strategic value of the player card CD can be improved. Further, compared to a case where only player cards CD that can be used for causing tactics to occur only in the offensive turn or the defensive turn are provided, it is possible to provide more opportunities to select the player cards CD for causing the tactics to occur to the user. It is therefore possible to reduce a frequency of occurrence of conditions where there is no room for choice of causing the tactics to occur in the offensive turn or the defensive turn. The offensive turn and the defensive turn occur mutually and concurrently at the user and the opponent, and thus, by providing an opportunity of the selection for causing the tactics to occur to the user in both turns without being limited to one of the turns, it is possible to improve variety of the tactics in the match or flexibility.

This can further improve the interest of the game.

Besides, to generate the player card CD that can be used for causing the tactics to occur in either the offensive turn or the defensive turn, it is only necessary to associate one or more tactic marks 136 on the offensive side and one or more tactic marks 136 on the defensive side with the same position.

It is not necessarily required to associate two or more tactic marks 136 with the same position regarding at least one of the offensive side or the defensive side. In the example in FIG. 17, not only two leftmost player cards CD in the hand display portion 202, but also the rightmost player card CD serves as an example of the specific game medium.

On the other hand, as indicated by the position index 133 of "CMF" in FIG. 10, when the plurality of tactic marks 136 are associated with the same position index 133 for the tactics on at least one side of the offensive side or the defensive side, one player card CD can be used as the player card CD necessary for satisfying occurrence conditions of the plurality of tactics in the same turn. This can also improve the strategic value of the player cards CD. In the example in FIG. 17, each of the two leftmost player cards CD in the hand display portion 202 is associated with two tactic marks 136 on the offensive side and two tactic marks 136 on the defensive side. It is therefore possible to cause the player cards CD to serve as the player cards CD for causing the tactics of the "Offensive Type" and the "Offensive Area" to occur in the offensive turn and to serve as the player cards CD for causing the tactics of the "Defensive Type" and the "Defensive Area" to occur in the defensive turn.

Figure 18:
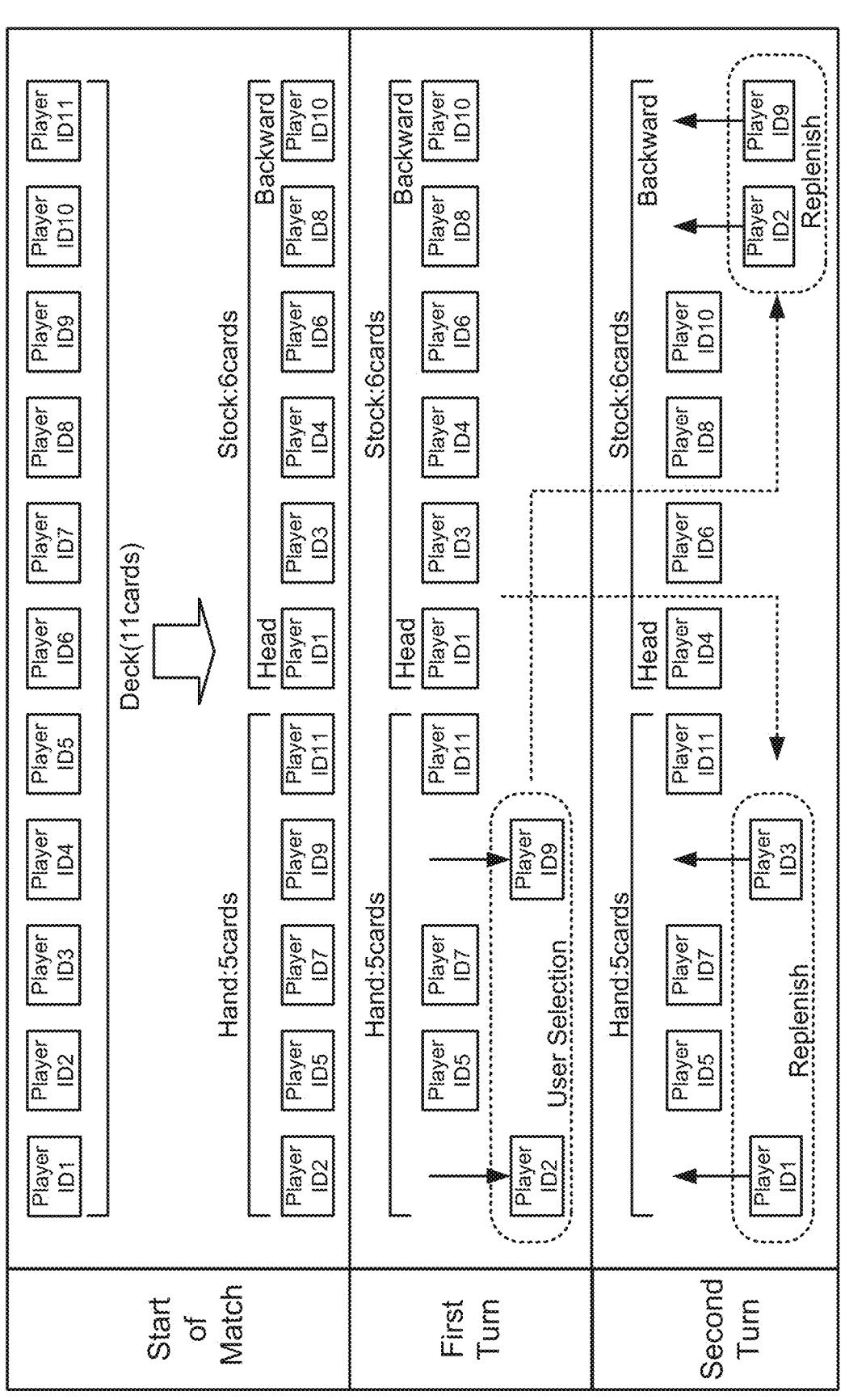
FIG. 18 is a view illustrating an example of change of a hand and stock of cards in each turn.

FIG. 18 illustrates an example of a relationship between the deck and the hand in the instruction part. FIG. 18 illustrates eleven player cards within the deck in a distinguishable manner by player IDs 1 to 11. Upon start of the match, five player cards are randomly selected from the eleven player cards within the deck as the hand. The remaining six player cards are left as stock. Order of the six player cards in the stock is determined as appropriate. In FIG. 18, the leftmost card is the head of the order, and right cards are backward of the order. In the instruction part of the first turn after the match is started (one of the offensive turn or the defensive turn for the user), one to five player cards are selected within a range of the upper limit cost from the hand. The selected player cards are removed from the hand. As a result of this, the number of the player cards CD in the hand decreases by the number of selected cards. In the next turn (the other of the offensive turn or the defensive turn), the player cards of the number equal to the deficient number in the hand are replenished from the stock to the hand. The replenishment is sequentially performed from the head in accordance with the order of the player cards in the stock. Further, the player cards removed from the hand in the previous turn are replenished backward in the stock. By repeating the above, five player cards are collected as the hand in each turn and presented to the user.

(4-5) Power of Influence

Figure 19:
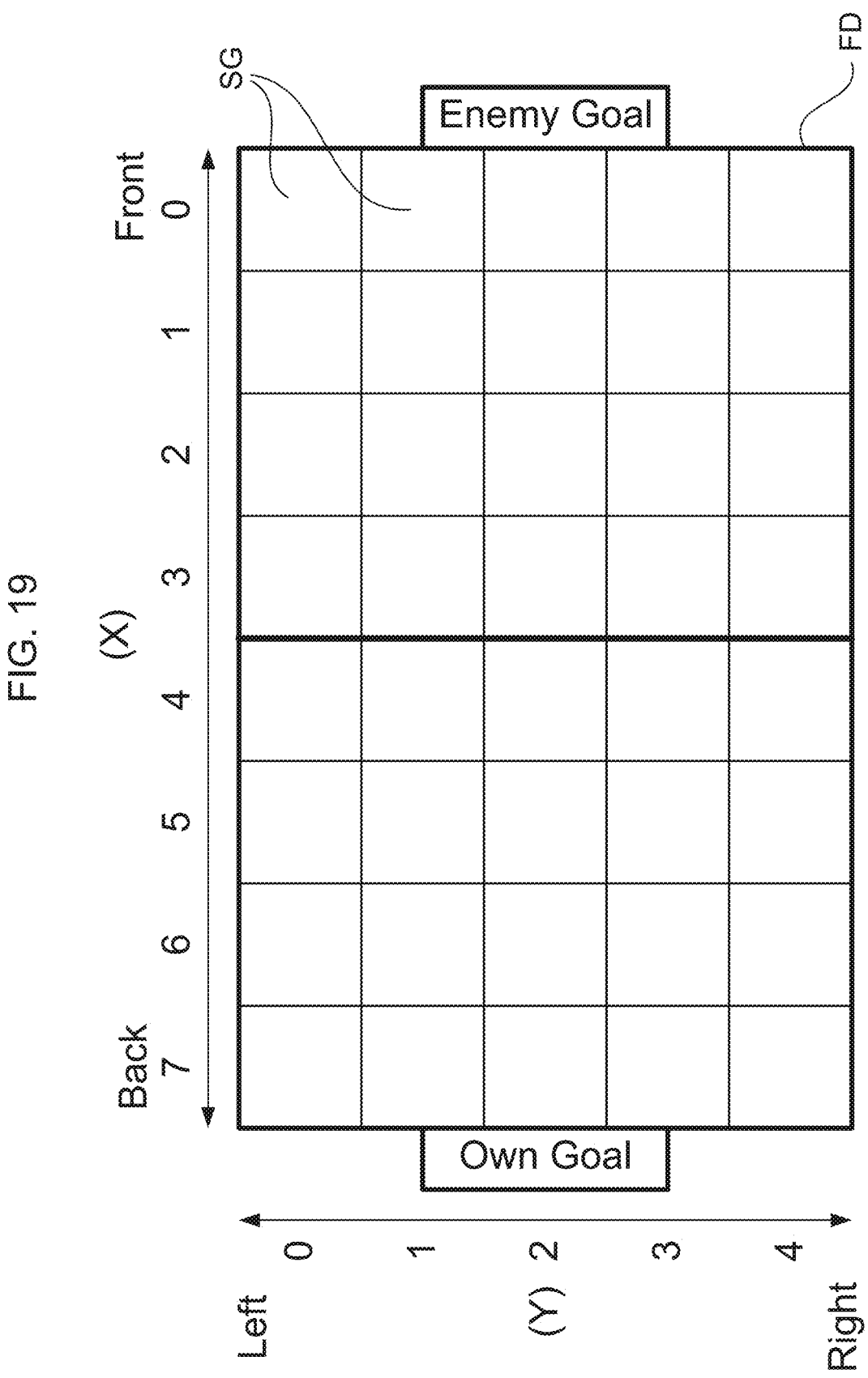
FIG. 19 is a view illustrating an example where a field is divided into segments.

Next, an example of the power of influence will be described with reference to FIG. 19 to FIG. 27. As described above, the power of influence occurs in association with the positions on the formation of the player cards CD selected in the instruction part. As illustrated in FIG. 19, the field FD is vertically and horizontally divided into a plurality of segments SG in a matrix. In FIG. 19, a front-back direction (direction in which goals face each other) of the field FD is indicated with an X axial direction, and a crosswise direction is indicated with a Y axial direction. Further, in the following description, there is a case where the segments SG are specified by combinations of coordinate values 0 to 7 in the X axial direction and coordinate values 0 to 4 in the Y axial direction attached outside the field in the figure. The number of divided segments in the field FD in each direction is one example and may be set as appropriate. In the example in FIG. 19, the number of divided segments is small, and actually, the field FD may be divided into a number of segments SG.

Both the position of the player card CD in the map 123 in FIG. 7 and the position of each position index 133 indicated in the map 132 in FIG. 10 to FIG. 16 are associated with one of the segments SG. Thus, the segment SG corresponding to the player card selected in the instruction part is uniquely determined from the formation selected by the user and the player cards arranged at respective positions on the formation. Besides, abbreviations of the positions included in the position indexes 133 in FIG. 10 to FIG. 16 are not necessarily required to be finely divided in accordance with the number of divided segments SG. For example, concerning each of the segments SG at a coordinate value [0, 1], a coordinate value [0, 2] and a coordinate value [0, 3] in FIG. 19, while the positions of the position indexes 133 are changed to correspond to the segments SG on the map 132, "CF" indicating center forward may be expressed in the position indexes 133. It is not necessarily required to associate the strong position associated with the player cards CD with the segment SG on a one-to-one basis. The plurality of segments SG adjacent to each other may be associated as the strong position.

As illustrated in FIG. 20, it is assumed that the player card CD having the strong position of "RWG" (abbreviation of right wing) is disposed at the position of the RWG also on the formation, and this player card CD is selected from the hand on the instruction screen 200 in FIG. 17. In this case, as illustrated in FIG. 20, using the segment SG at the coordinate [0, 4] corresponding to the position at which the player card CD is disposed as a reference segment SG, the power of influence is set for the respective segments SG so that the power of influence decreases at segments SG away from the reference segment SG. The power of influence is set in a range from a minimum value of 0 to a maximum value of 100. However, the maximum value is one example. The power of influence is not necessarily required to be limited to integers.

The power of influence of the segment SG corresponding to the position of the player card CD is set to be greater as the overall value of the parameters of the player card CD (corresponding to the parameter overall value cd3 in FIG. 6) is greater within a range not exceeding the above-described maximum value. Further, distribution of the power of influence is also determined in association with the player card CD. A range of the segments SG for which power of influence greater than 0 is set corresponds to an effect area EA enclosed with a thick line in FIG. 20. In the influence power map 206 in the instruction screen 200 in FIG. 17, the effect area EA is displayed as the area image 207.

The area image 207 is configured to express the distribution of the power of influence using gradation, color change, or the like, in such a manner that can be distinguished by the user.

The influence to be provided by the power of influence on the calculation in the operation part is generated by changing values of the parameters of the players that act within the effect area EA from basic values (hereinafter, referred to as basic values) determined in association with the player cards as an example. Besides, while the values of the parameters of the players can be regarded as variable values with respect to the basic values of the parameters set for the player cards, the values of the parameters of the player cards can be regarded as changing in accordance with the power of influence. Thus, the values of the parameters of the player cards are substantially synonymous with the values of the parameters of the players. Further, as illustrated in FIG. 9, when the values of the parameters of the player card decrease as a result of the player card being disposed at the position other than the strong position, the values after the decrease may be referred to as the basic values. In other words, the basic values of the parameters when referring to the power of influence are the assumed values before any change due the power of influence, and may be the values that have been changed due to other factors.

FIG. 21 illustrates an example of change to be provided by the power of influence on the values of the parameters. The distribution of the power of influence in FIG. 21 corresponds to the example in FIG. 20. When one of the players acts within the effect area EA, a value of at least one type of parameter of the player increases on the basis of the power of influence. FIG. 21 illustrates an example where the value of the parameter of running ability of the player changes in accordance with the power of influence. The value of running ability changes so that a level of the power of influence is reflected in a magnitude of an increment with respect to the basic value. For example, the running ability increases to 80 when the power of influence is 15, and the running ability increases to 82 when the power of influence is 45.

A correspondence relationship between the level of the power of influence and the increment of the value of the parameter may be proportional or may be such a relationship that the increment is changed in accordance with stages obtained by dividing the power of influence. As one example, when the range of the power of influence is 0 to 100, as illustrated in FIG. 22, the correspondence relationship may be set such that the power of influence is divided into five stages of "0 to 19", "20 to 39", "40 to 59", "60 to 79" and "80 to 100", and the increment (increase number) of the value of the parameter increases by one in accordance with each stage. FIG. 21 is an example in which the increase in accordance with the stages in FIG. 22 is applied.

The increase of the parameters in accordance with the power of influence is not applied only to the players corresponding to the player cards that are caused to exert the power of influence, that is, the players corresponding to the player cards selected in the instruction part. The increase of the parameters in accordance with the power of influence is applied to the players within the user's team as long as the players act within the effect area. However, the players to whom change of the parameters is to be applied may be limited by appropriate conditions being provided. For example, restrictions may be imposed such that the power of influence is applied only to the players corresponding to the player cards disposed at positions within a certain range relative to the position on the formation of the player card selected in the instruction part. As an example, if the player card of center forward is selected in the instruction part, the power of influence is to be applied only to the players in center forward and right and left wings.

There is a case where a plurality of player cards are selected in the instruction part. In this case, the power of influence is exerted for each of the player cards, and in the whole field, the distribution of the power of influence may be determined so that the power of influence corresponding to the respective player cards is summed up. The example is illustrated in FIGS. 23A to 23C. It is assumed in FIGS. 23A to 23C that, for example, the power of influence corresponding to the player card of left center midfielder (LCMF) is distributed as illustrated in FIG. 23A, and the power of influence corresponding to the player card of left wing is distributed as illustrated in FIG. 23B. In this case, the distribution of the power of influence as a whole may be determined as illustrated in FIG. 23C by summing up the power of influence of the both for each segment SG. For example, when attention is focused on the segment SG of the coordinate value of [0, 0] (upper right corner segment SG), the power of influence is 2 in FIG. 23A, and the power of influence is 66 in FIG. 23B, and thus, the power of influence as a whole is 68 as illustrated in FIG. 23C.

In the instruction part, an opportunity to select the player cards is provided not only to the user but to the opponent in parallel. The power of influence may be exerted also regarding the opponent. In this case, the power of influence based on the selection by the user and the power of influence based on the selection by the opponent are exerted on the same field. Thus, the distribution of the power of influence in the whole field may be determined by superimposing the power of influence based on the selection by the user and the power of influence based on the selection by the opponent for each segment SG. The example is illustrated in FIG. 24 and FIG. 25. FIG. 24 illustrates an example of distribution of the power of influence when the opponent selects the player card of left midfielder position. The opponent is on an opposite side of the user, and thus, the front-back direction and the crosswise direction of the opponent are inverted directions of the front-back direction and the crosswise direction of the user. Thus, the distribution of the power of influence is also inverted in the front-back direction and the crosswise direction. FIG. 24 is an example where the distribution in FIG. 23A is inverted. When the power of influence in accordance with the selection of the player cards by the user is exerted in the distribution in FIG. 23C, to superimpose the distribution with the distribution of the power of influence of the opponent, it is only necessary to express the power of influence with negative values by inverting signs of the power of influence in FIG. 24 and add the values to the power of influence in FIG. 23C for each segment. The result is illustrated in FIG. 25. For example, when attention is focused on the segment SG of the coordinate value of [3, 1], the power of influence based on the selection by the user is 26 (FIG. 23C), and the power of influence based on the selection by the opponent is 8 (FIG. 24), and thus, the superimposed power of influence is 18 (=26−8).

There may be a case where a segment for which the power of influence becomes a negative value occurs as a result of the superimposition described above. For example, in FIG. 25, the power of influence at the segment SG of the coordinate value of [3, 4], and the like, becomes the negative value. The power of influence of the negative value is not reflected in the values of the parameters of the players of the user's team. In other words, only positive power of influence that increases the values of the parameters of the players of the user is used, and negative power of influence is not used to decrease the values of the parameters. Further, also for the opponent, only positive power of influence that increases the values of the parameters of the players of the opponent is used, and negative power of influence is not used to decrease the values of the parameters of the players of the opponent. However, the negative value of the power of influence may be used to decrease the values of the parameters. Besides, when the distribution based on the selection by the user and the distribution of the power of influence based on the selection by the opponent are superimposed, signs of the power of influence on the user is inverted to the distribution of the power of influence on the opponent.

Figures 26A, 26B:
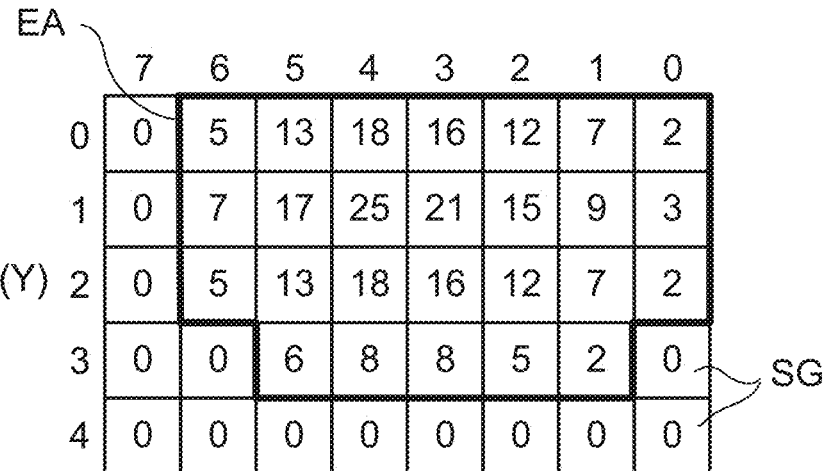
FIGS. 26A and 26B are views illustrating an example of a relationship between distribution of the power of influence specific to player cards and distribution of the power of influence obtained by cutting out part of the power of influence in accordance with a field.

As described above, the distribution of the power of influence is determined in advance for each player card. For example, as illustrated in FIG. 26A, a basic area BA (area enclosed with a thick line in the figure) is set for one player card in a wide range in the front-back direction and crosswise direction to be able to cover any segment SG on the field, and the distribution of the power of influence within the basic area BA is set. When the player card is selected in the instruction part, the reference segment SGc at which the power of influence becomes maximum in the basic area is made to match the segment SG corresponding to the position at which the player card is disposed, and each segment SG in the basic area BA is associated with each segment SG in the field. Then, the segment SG outside the field within the basic area BA is excluded. Thereby, the effect area EA can be specified as illustrated in FIG. 26B, and the power of influence at each segment SG within the effect area EA can be determined.

As described above, the distribution of the power of influence is determined on the basis of the selection of the player cards by the user and by the opponent in the instruction part of each turn, and an aggregate of the segments SG for which positive power of influence is set is determined as the effect area EA. The set power of influence acts to increase the parameters of the player when the player is located within the effect area EA in the operation part subsequent to the instruction part, which results in affecting the calculation of the action of the player. For example, when the value of the parameter of running ability of the player is made greater than the basic value, the influence occurs such that the player runs faster within the effect area EA than outside the effect area EA. When a period from when the operation part in the same turn as the instruction part in which the power of influence is exerted until when the operation part ends, in other words, a period until the offensive turn and the defensive turn are switched next is set as a target period, change of the parameters by the power of influence is applied to at least part of the target period. For example, the parameters may be increased by the power of influence in the whole target period. On the other hand, for example, upper limits may be set to the number of times of the increase of the parameters, a period, the number of players, and the like, and even within the target period, the values of the parameters may be changed in a range not exceeding the upper limits. Alternatively, the power of influence may be changed within the target period such that the power of influence gradually decreases in accordance with elapse of time within one turn.

Figures 27A, 27B:
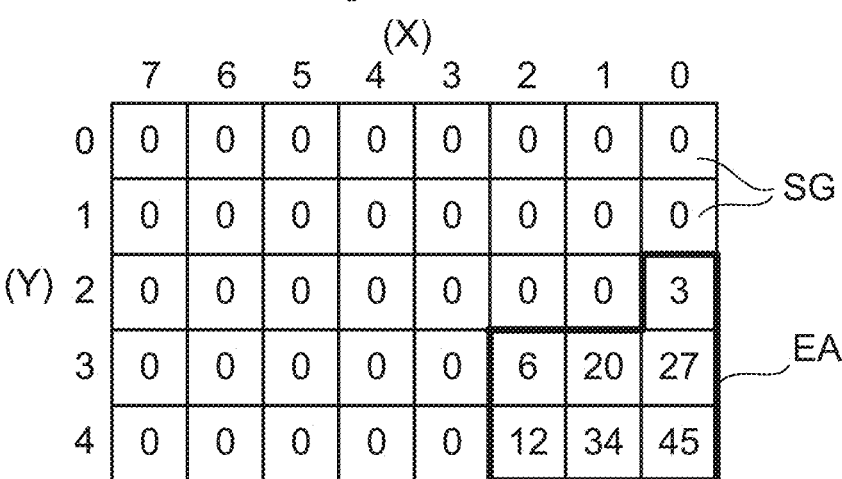
FIGS. 27A and 27B are views illustrating an example of a relationship between the distribution of the power of influence remaining after the previous turn and the distribution of the power of influence determined in the next turn.

On the other hand, at least part of the power of the influence may remain in the next turn beyond the target period. In other words, the power of influence set on the basis of the selection in the instruction part of one time may be applied only within the same turn including the instruction part or may be applied across a plurality of turns. When the power of influence in one turn is applied to the turns in the next and subsequent turns, new distribution of the power of influence may be determined by superimposing the power of influence determined on the basis of the selection of the player cards in a new turn and the power of influence in the previous turn. In this case, the power of influence at each segment SG in the previous turn may be superimposed as is or the power of influence in the previous turn may be decreased and superimposed. An example of the latter case will be illustrated in FIGS. 27A and 27B. When the distribution of the power of influence in the previous turn is set as illustrated in FIG. 27A, the power of influence at each segment SG is decreased by 25 in the next turn to obtain the distribution in FIG. 27B. The distribution is set as, for example, the distribution of remaining power of influence.

Then, in the next turn, it is only necessary to add the remaining power of influence at each segment SG to new power of influence at each segment SG determined on the basis of the selection in the instruction part to determine the obtained value as the power of influence at each segment SG. Besides, a determination method of the remaining power of influence is not limited to an example in which the power of influence is decreased by a uniform value, and the remaining power of influence may be determined using an appropriate method, for example, by multiplying a fixed ratio less than 1.

While in the above-described example, the power of influence is used as a value for increasing the values of the parameters of the players of the user, the power of influence may be used as a value for decreasing the values of the parameters for the players of the opponent. For example, when the players of the opponent are located in the effect area EA, the power of influence may be applied in such an aspect that the values of the parameters of that players are decreased by an amount corresponding to the power of influence. Change of the parameters using the power of influence may be adjusted further in consideration of various kinds of information such as the positions on the formation or strong positions of the player cards corresponding to the players located in the effect area. For example, the adjustment may be performed so that the parameter of the player having the strong position in the effect area is made greater than the parameters of other players.

(4-6) Team Tactics

Next, an example of team tactics will be described with reference to FIG. 28 to FIG. 38D. As described above, in the example in FIG. 17, the user selects two player cards CD associated with the tactic marks 136 in the same category in the instruction part, thereby the occurrence conditions of the tactics in the category are satisfied, and effects in accordance with the tactics are reflected in the calculation in the operation part. The effects when the tactics occur include two types of correction on the power of influence and change of calculation tendency in the operation part. The correction on the power of influence is further increasing the value of the power of influence described above only within the target area set in association with the tactics. On the other hand, the change of the calculation tendency is changing the calculation tendency in the operation part so that the player is more likely to act in the target area. Details will be sequentially described below.

A. Content of Team Tactics

FIG. 28 illustrates an example of a correspondence relationship among tactic marks, options of tactics in each category, tendency of action of players and change to be provided on the power of influence. As the options of the tactics, as illustrated in FIG. 13 to FIG. 16 described above, "Possession" and "Counter" are prepared for the "Offensive Type", "Central Breakthrough", "Left Side Attack" and "Right Side Attack" are prepared for the "Offensive Area", "Forecheck" and "Retreat" are prepared for the "Defensive Type", and "central defense" and "Side Defense" are prepared for the "Defensive Area".

These tactics imitate tactics that can be employed in real soccer. Further, the tendency of action of the players characterizes calculation tendency, and tendency that imitates tendency of action in real soccer is set. For example, in the tactic of "Possession" regarding the "Offensive Type", tendency for teammate players to support a player who keeps the ball while prioritizing keeping the ball is set as the tendency. On the other hand, in a case of "Counter", tendency for teammate players to also aggressively run out forward while prioritizing challenging forward is set.

The tactics regarding the "Offensive Area" are differentiated in terms of an area in which an emphasis is placed in the offense.

In "Central Breakthrough", tendency to build up offense at the center of the field is set, in "Right Side Attack", tendency to challenge to attack by deploying the players on a right side of the field is set, and in "Left Side Attack", tendency to challenge to attack by deploying the players on a left side of the field is set. In the tactic of "Forecheck" regarding the "Defensive Type", tendency to try to retake the ball by putting pressure from a high position (forward position) in an enemy territory is set, and in the tactic of "Retreat", tendency to retreat to an own territory to strengthen the defense is set. The tactics regarding the "Defensive Area" are differentiated in terms of an area in which an emphasis is placed in the defense. In "Central Defense", tendency to force the player of the opponent to the center of the field to take the ball is set, and in "Side Defense", tendency to force the player of the opponent to left or right side to take the ball is set.

The "Correction Factor" in FIG. 28 indicates correction content of the power of influence. In the example in the drawing, the correction content is set for each of two to five player cards CD corresponding to the same category selected in the instruction part, such that the correction factor is increased by 20% each as the number of the player cards CD is larger. As illustrated in FIG. 23, the correction factor is an increase rate with respect to the power of influence set in accordance with the selection by the user. For example, the power of influence after the correction is 24 when the power of influence before the correction is 20 and the correction factor is 20%. A relationship between the correction factor and the number of player cards CD is set equally for all the tactics.

B. Setting of Target Region and Tactic Marks

Next, an example of setting of the target area for each tactic will be described with reference to FIG. 29A to FIG. 32B. The drawings indicate a correspondence relationship between arrangement of the tactic mark on the formation for each tactic and a range of the target area on the field. A left portion of each drawing indicates the map 132 illustrated in FIG. 13 to FIG. 16 for each tactic, and a right portion thereof indicates the field FD divided into the segments SG in a similar manner to FIG. 19 and indicates the tactic marks 136 associated with the tactics and the target area TA. Further, a tactic area image 208 indicating the target area TA is also displayed on the map 132. The tactic area image 208 may be displayed to indicate the target area TA using various kinds of identification method such as gradation and color change.

Figure 29A:
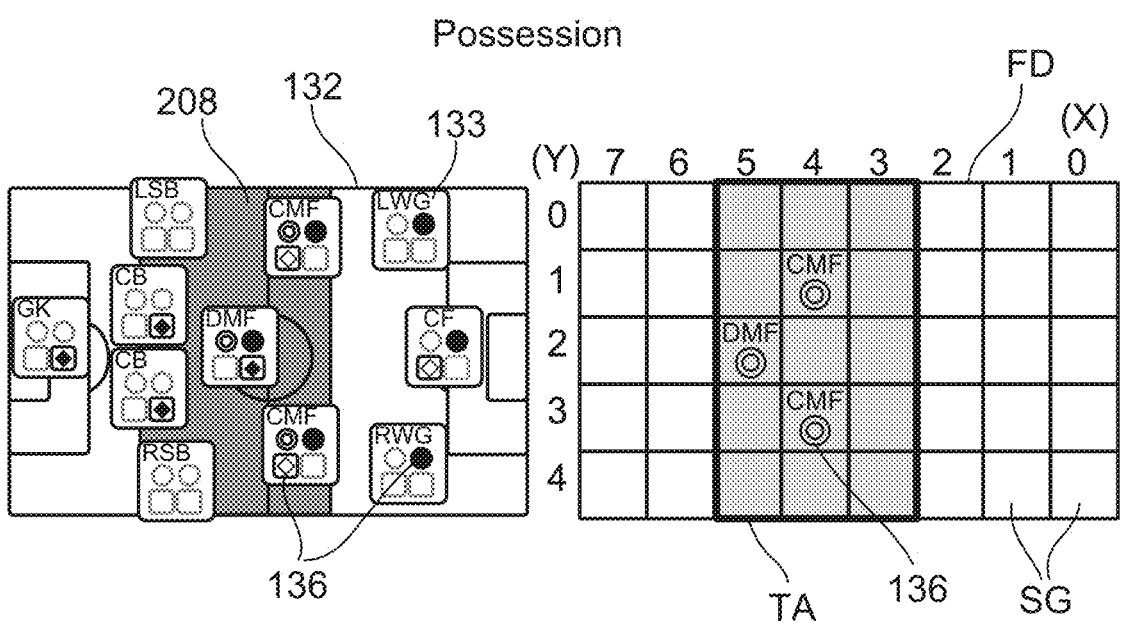
FIGS. 29A and 29B are views, each of which illustrates an example of a relationship among a tactic of an offensive type, arrangement of corresponding tactic marks, and a target area.
Figure 29B:
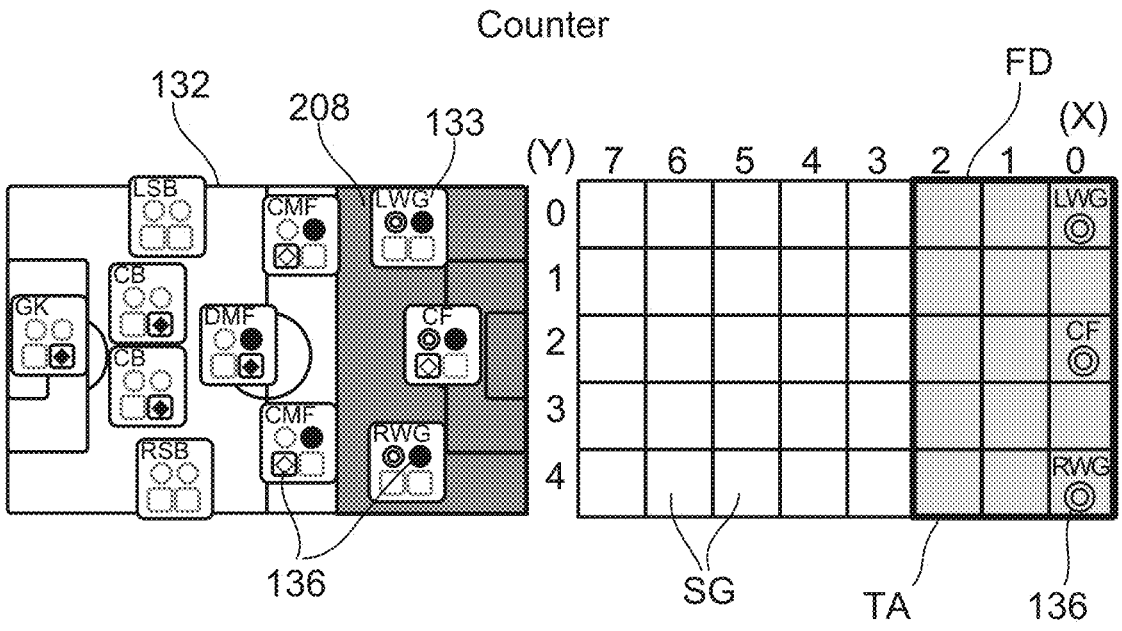
Figure 30A:
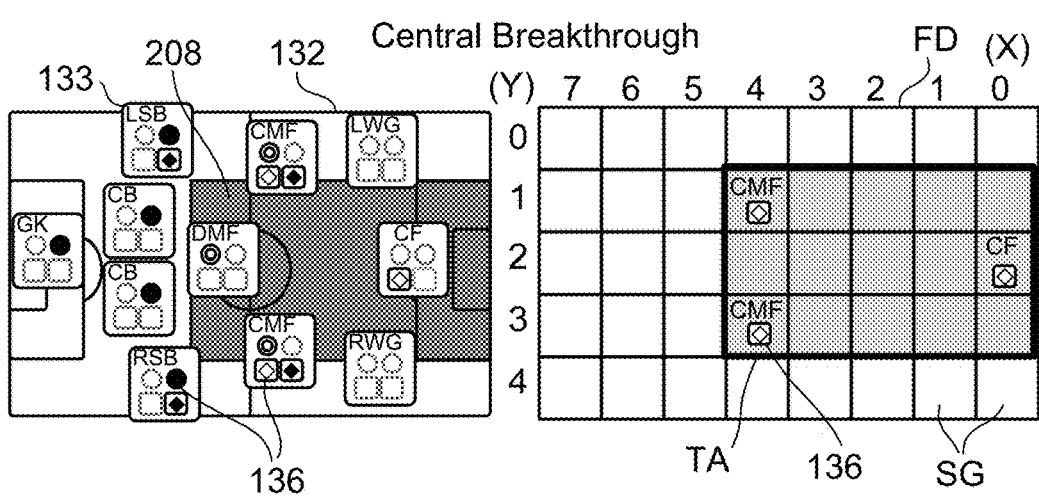
FIGS. 30A to 30C are views, each of which illustrates an example of a relationship among a tactic of an offensive area, arrangement of corresponding tactic marks, and a target area.
Figure 30B:
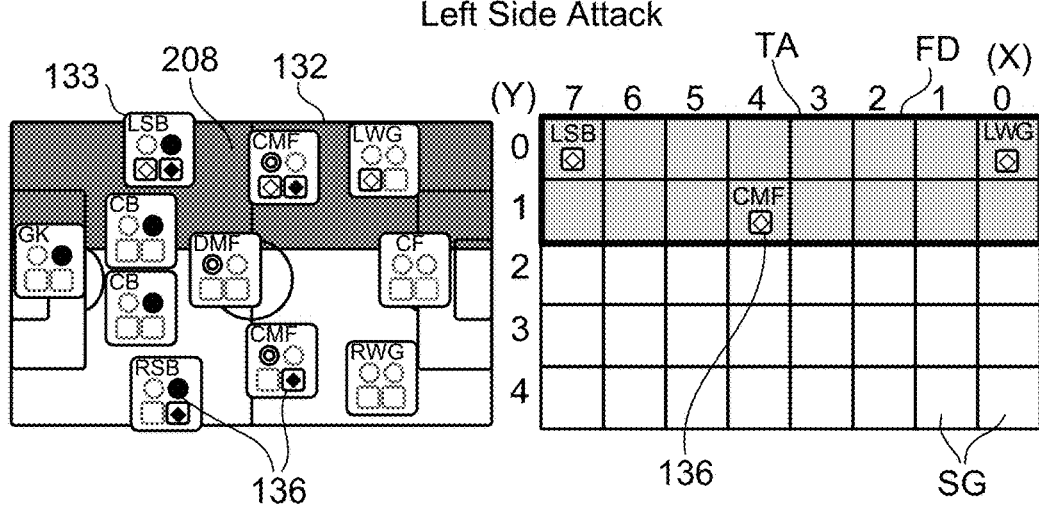
Figure 30C:
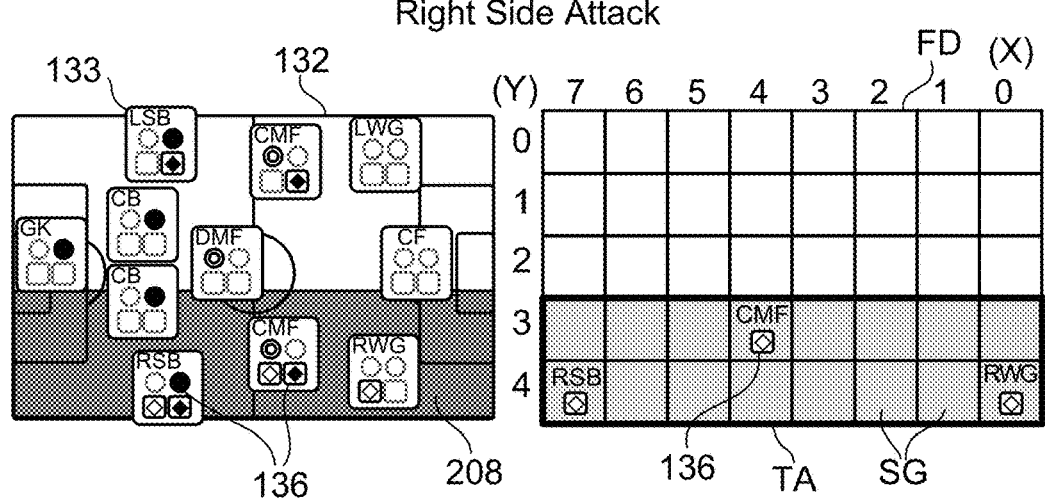
Figure 31A:
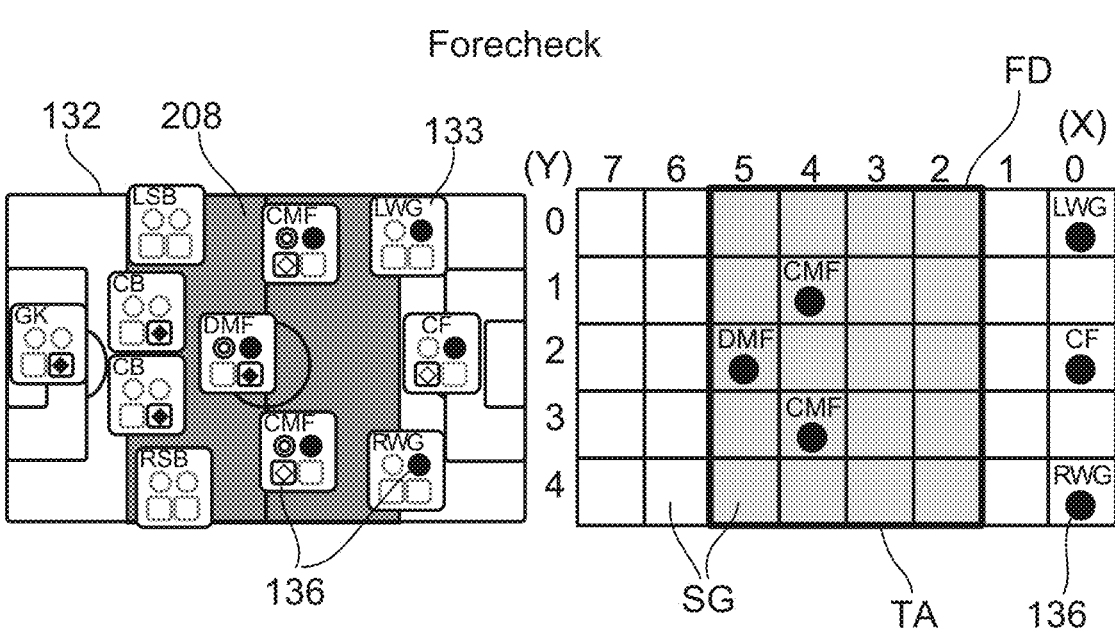
FIGS. 31A and 31B are views, each of which illustrates an example of a relationship among a tactic of a defensive type, arrangement of corresponding tactic marks, and a target area.
Figure 31B:
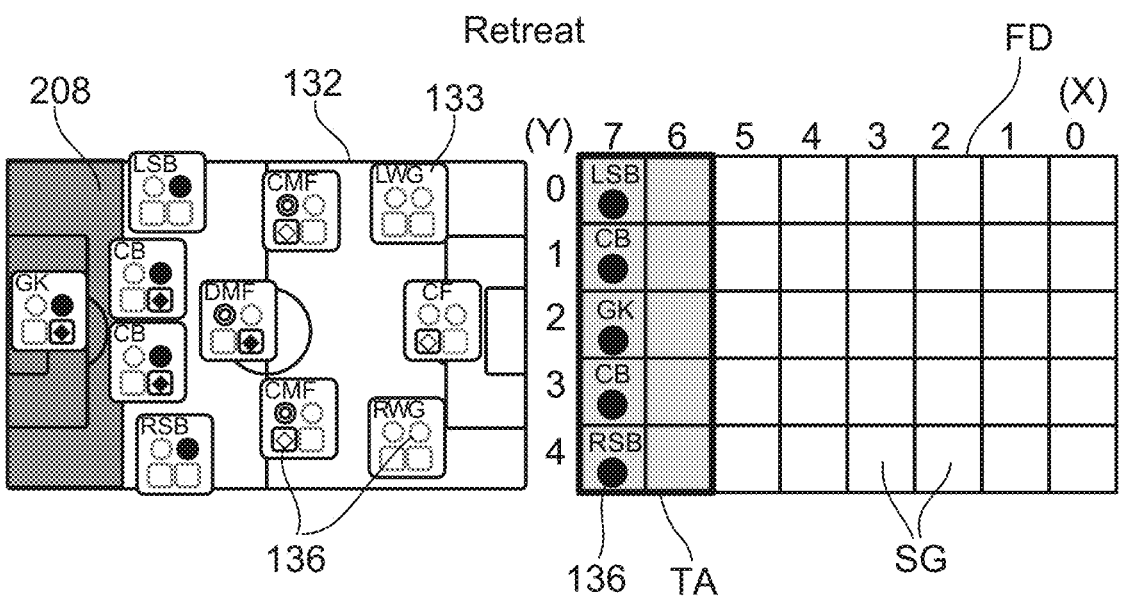
Figures 32A, 32B:
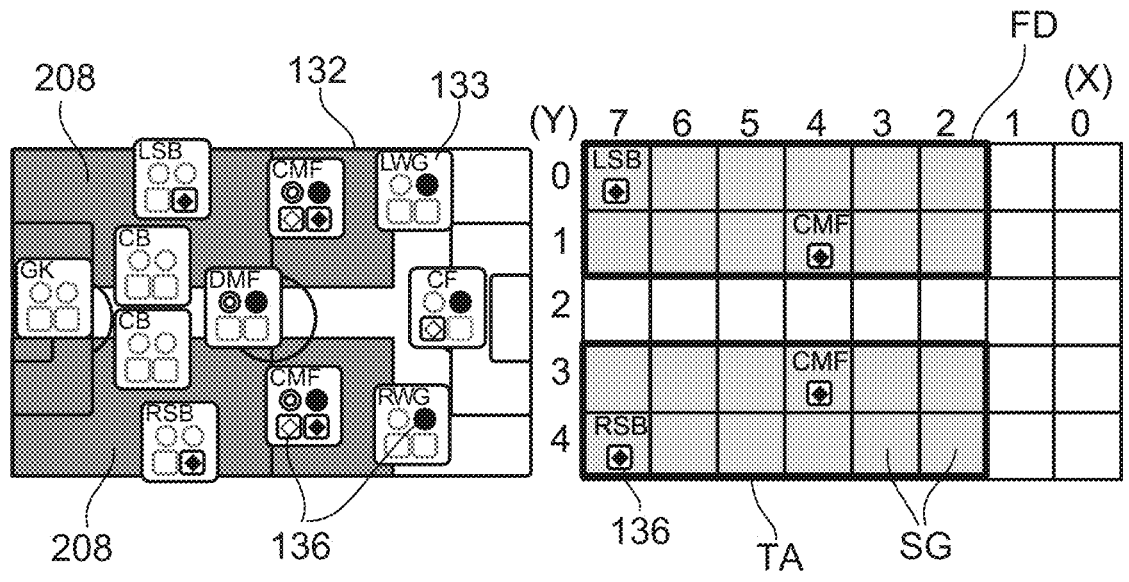
FIGS. 32A and 32B are views, each of which illustrates an example of a relationship among a tactic of a defensive area, arrangement of corresponding tactic marks, and a target area.

FIGS. 29A and 29B correspond to a category of the "Offensive Type", FIG. 29A illustrates a correspondence relationship in a case of "Possession", and FIG. 29B illustrates a correspondence relationship in a case of "Counter". FIGS. 30A to 30C correspond to a category of the "Offensive Area", FIG. 30A illustrates a correspondence relationship in a case of "Central Breakthrough", FIG. 30B illustrates a correspondence relationship in a case of "Left Side Attack", and FIG. 30C illustrates a correspondence relationship in a case of "Right Side Attack". FIGS. 31A and 31B correspond to a category of the "Defensive Type", FIG. 31A illustrates a correspondence relationship in a case of "Forecheck", and FIG. 31B illustrates a correspondence relationship in a case of "Retreat". FIGS. 32A and 32B correspond to a category of the "Defensive Area", FIG. 32A illustrates a correspondence relationship in a case of "Central Defense", and FIG. 32B illustrates a correspondence relationship in a case of "Side Defense".

As can be clear from FIG. 29A to FIG. 32B, the relationship between the position on the formation, of the tactic mark 136 corresponding to each tactic and the target area TA is set such that at least one tactic mark 136 corresponding to each tactic is included within the target area TA corresponding to each tactic. For example, concerning "Possession" in FIG. 29A, the target area TA is set in a range of coordinate values of 3 to 5 in the X axial direction and coordinate values of 0 to 4 in the Y axial direction, and the tactic marks 136 corresponding to the "Offensive Type" which is a category of the "Possession" are arranged at three segments SG of the coordinate values of [4, 1], [5, 2] and [4, 3] included within the target area TA. In other words, the relationship is set such that at least one player card disposed at the position in the target area TA serves as a player card to be selected in the instruction part for causing the tactic associated with the player card to occur. Examples in FIG. 30A to FIG. 32B are similar to the example in FIG. 29A.

However, all the tactic marks 136 corresponding to respective tactics do not necessarily have to be disposed within the target area TA. For example, while in the example of "Forecheck" illustrated in FIG. 31A, the tactic marks 136 of the "Defensive Type" are disposed at three positions within the target area TA, in addition to these, the tactic marks 136 of the "Defensive Type" are disposed at three positions on a right end of the field which are positioned as the positions of forward. Thus, when two or more player cards of forward are selected in the instruction part, the tactic of "Forecheck" occurs.

In conclusion, the above-described relationship is basically set in accordance with intention of setting a range on the field on which emphasis is to be placed in view of content of each tactic as the target area TA and setting positions of players at which the players are expected to perform brilliantly in view of content of each tactic as positions of the player cards to be selected for causing the tactic to occur. For example, a possession tactic in real soccer is understood as a tactic of building up the tactic by passing the ball from the midfield. Thus, in the tactic of "Possession", the target area TA is set in the midfield, and the position of the midfielder is set as the position of the tactic mark 136. The same also applies to intention regarding "Forecheck". A forecheck tactic in real soccer is understood as a tactic of aiming at retaking the ball at a position as high as possible by putting pressure in an enemy territory. Thus, the target area TA is set in a range from near the midfield to the enemy territory, and in addition to the position of the midfielder, the position of forward is set as the position of the tactic mark 136. Thereby, the arrangement of the tactic marks 136 expresses that the forward also becomes a player who aggressively takes part in defense and puts pressure to the players of the opponent in addition to the midfielder.

The examples in FIG. 29A to FIG. 32B described above indicate a correspondence relationship between arrangement of the tactic marks 136 when formation of "4-3-3" is selected and the target area TA on the formation selection screen 140 illustrated in FIG. 11 and FIG. 12 for each tactic. When a different formations is selected, the arrangement of the tactic marks 136 also changes in accordance with the formation. However, when the target area TA is set as the range on the field on which emphasis is to be placed in a similar manner as described above in accordance with content of the tactics, and the tactic marks 136 are disposed at positions on which emphasis is to be placed in accordance with content of the tactics, the target area TA and the tactic marks 136 can be set to fit the tactics in a similar manner to the examples in FIG. 29A to FIG. 32B in any formation.

C. Correction on Power of Influence Corresponding to Team Tactics

Next, an example of correction of the power of influence when a tactic occurs will be described next with reference to FIG. 33A to FIG. 34C. The correction on the power of influence further increases the power of influence to be exerted in accordance with the selection of the player cards CD in the instruction part, in the target area TA. The power of influence in the effect area EA and the correction in the target area TA have an effect of changing and increasing the values of the parameters of the players in common. On the other hand, when the player cards are selected in the instruction part, the power of influence is essentially exerted in the effect area EA based on the positions of the player cards. On the other hand, the correction by the team tactics is made when the occurrence conditions of the team tactics are satisfied on the basis of the selection of the player cards in the instruction part. The correction in the target area TA is differentiated from exertion of the power of influence in the effect area EA in this point.

FIG. 33A illustrates an example of distribution of the power of influence to be exerted in accordance with selection of the player cards. This example is the same as the example of the distribution of the power of influence corresponding to two player cards illustrated in FIG. 23C. For example, when a tactic of "Possession" occurs by the selection of two player cards in this state, as illustrated in FIG. 33B, the target area TA is set near the midfield (see FIG. 29A), and the correction factor of 20% is applied to each segment SG included in the target area TA (see FIG. 28). As a result of this, an increase rate of the power of influence in each segment SG is as illustrated in FIG. 33B. The increase rate is magnification of the power of influence after correction with respect to the power of influence before correction (=power of influence after correction/power of influence before correction). In the example in FIG. 33B, the power of influence of the segment SG within the target area TA is corrected to 1.2 times, and the power of influence in the segment SG outside the target area TA is corrected to one time, that is, not corrected. Thus, the distribution of the power of influence after correction is as illustrated in FIG. 33C. Besides, in the example in FIG. 33C, fractions after the decimal point are processed by rounding off.

As described above, there is a case where the distribution of the power of influence is superimposed on the distribution of the power of influence exerted in accordance with the selection by the opponent. When such superimposition occurs, the distribution of the power of influence is corrected in accordance with occurrence of the team tactic of the user, and the corrected distribution of the power of influence is superimposed on the distribution of the power of influence of the opponent. For example, when the power of influence after correction is distributed as illustrated in FIG. 33C, and the power of influence of the opponent is distributed as illustrated in FIG. 24, distribution in FIG. 33D obtained by superimposing the distribution is finally determined as distribution of the power of influence to be exerted to the players of the user.

There is a case where the occurrence conditions of the tactics in a plurality of categories are satisfied in one turn. In this case, the correction factor may be applied to the target area corresponding to each tactic. Further, when there is a portion where the target areas overlap each other, it is only necessary to sum up the correction factors in the overlapped portion. As an example, the increase rates of respective segments SG when the tactic of "Possession" occurs by the selection of two player cards are distributed as illustrated in FIG. 34A, and the increase rates of respective segments SG when the tactic of "Left Side Attack" occurs by the selection of two player cards are distributed as illustrated in FIG. 34B, the distribution of the increase rates of the respective segments SG after the correction factors are summed up is as illustrated in FIG. 34C. The target areas TA overlap with each other in the segments SG in a range of 3 to 5 on the X coordinate and 0 to 1 on the Y coordinate, and thus, the correction factors of 20% in the respective segments SG are summed up to obtain the correction factor 40%, and the correction factor of 40% is applied, which results in obtaining the increase rate of 1.4 times.

D. Change of Calculation Tendency

Next, an example of change of calculation tendency will be described as another effect when the tactic occurs. The change of the calculation tendency is change of the calculation to increase tendency for the players to act in the target area TA in comparison to a case where the tactic does not occur. The actions of the players are controlled by repeating processing of setting the values of various parameters set for the players, the situation of the game such as the position of the ball and each player, and the like as calculation conditions, calculating the action to be taken by each player in accordance with predetermined algorithm, and performing calculation while reflecting the obtained calculation result in the next calculation conditions. The calculation includes probabilistic elements, and thus, the calculation result includes indeterminate elements. The same calculation result cannot be always obtained even if the calculation conditions are the same. However, there is a case where certain tendency occurs in the calculation result depending on the algorithm of the calculation. For example, the certain tendency may appear in motions of the players regarding the ball such as tendency for the players to prioritize dribbling or tendency to prioritize pass, or in motions of the players regarding movement such as tendency to proceed to the side of the field, tendency to preferentially play in the midfield, tendency to proceeding to the enemy territory side and tendency to retreat to the own territory. It is possible to adjust the calculation tendency of the computer to cause such tendency of action.

Figure 35:
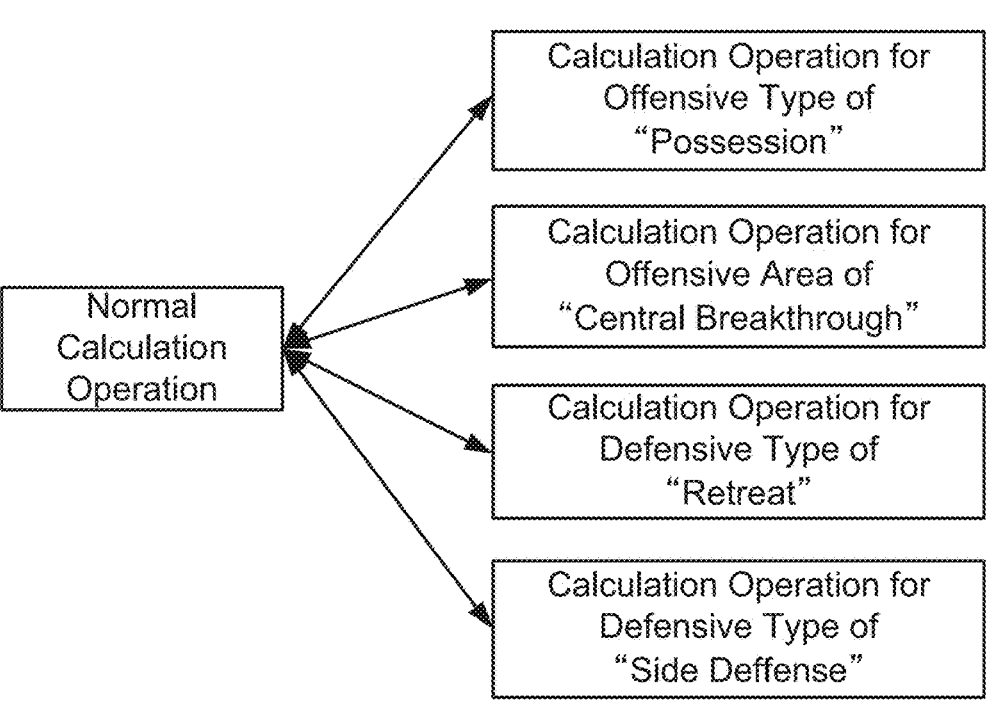
FIG. 35 is a view illustrating an example where calculation tendency is changed in accordance with the tactics.

On the other hand, the effect of the team tactic includes the correction on the values of the parameters in the target area TA. Thus, even if the team tactic occurs, when the players do not act in the target area, the effect is not exerted. In this case, the user cannot enjoy a merit of causing the team tactic to occur. Thus, when the team tactic occurs, the calculation tendency is changed in accordance with the tactic to increase the tendency for at least one player to play in the target area corresponding to the tactic. In other words, as illustrated in FIG. 35, when a team tactic does not occur, the movement is controlled by calculating the action of each player through normal calculation control. On the other hand, when the occurrence condition of anyone of the tactics is satisfied, the calculation control is changed to cause the calculation tendency in accordance with the tactic.

Besides, while FIG. 35 illustrates the calculation tendency corresponding to each of "Possession", "Central Breakthrough", "Retreat" and "Side Defense", the calculation tendency is also differentiated for other tactics.

Figure 36:
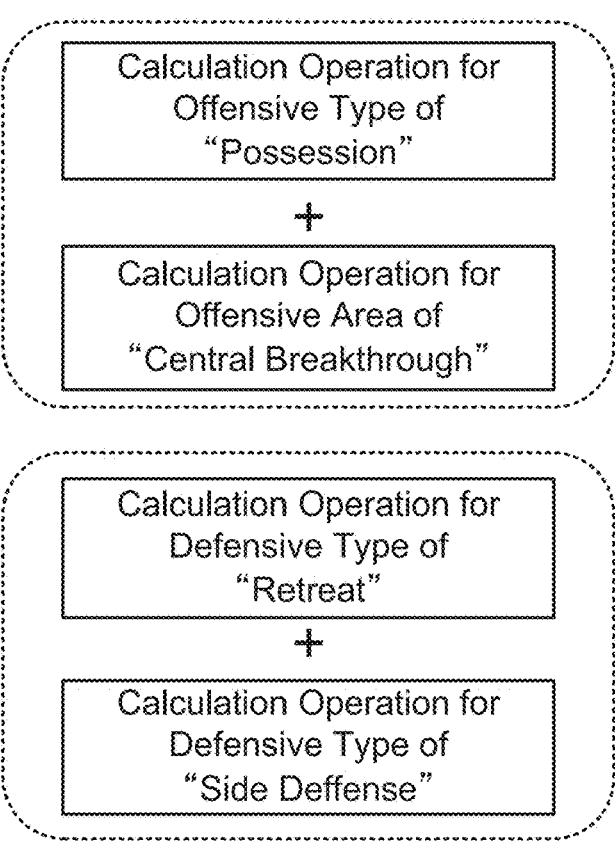
FIG. 36 is a view illustrating an example of combination of the calculation tendencies corresponding to a plurality of tactics.

There is a case where the occurrence conditions of a plurality of tactics are satisfied in one turn. For example, the tactic of the "Offensive Type" and the tactic of the "Offensive Area" are not exclusive and can occur at the same time. In such a case, as illustrated in FIG. 36, the calculation control may be combined so that the calculation tendency corresponding to the respective tactics occur at the same time. Besides, the correction on the power of influence and the change of the calculation tendency described above are applied only to a turn in which the occurrence condition of the tactic is satisfied. However, an effect of the tactic occurring in one turn may moderately remain in the next and subsequent turns. For example, part of the correction on the power of influence can be set to remain to some extent in the next turn. The calculation tendency corresponding to the tactics on the offensive side may be taken over to the next and subsequent offensive turns, and the calculation tendency corresponding to the tactics on the defensive side may be taken over to the next and subsequent defensive turns.

FIGS. 37A to 38D illustrate an example where the change of the calculation tendency in response to the occurrence of the team tactics appears as the actions of the players. FIGS. 37A to 37E illustrate examples of the tactics in the offensive turn, and FIGS. 38A to 38D illustrate examples of the tactics in the defensive turn. In each drawing, the players of the user are indicated with white circles, the players of the opponent are indicated with black circles, the ball is indicated with a reference numeral BL, and the actions of the players are indicated with arrows as appropriate. FIG. 37A is an example when the tactic of "Possession" occurs, and the tendency occurs such that teammate players take action of supporting in a relatively close range with respect to a player who holds the ball BL within the own territory. FIG. 37B is an example when the tactic of "Counter" occurs, and the tendency occurs such that each player including a player who holds the ball BL quickly attacks toward the goal. FIG. 37C to FIG. 37E respectively indicate examples in a case of "Central Breakthrough", "Right Side Attack" and "Left Side Attack". In these examples, the tendency occurs such that the players take action of attacking by preferentially utilizing the target area of the center, the right side or the left side of the field in accordance with each tactic.

FIG. 38A is an example when the tactic of "Forecheck" occurs, and the tendency occurs such that the players of the user take action of aggressively putting pressure to the players of the opponent in the enemy territory to retake the ball BL. FIG. 38B is an example when the tactic of "Retreat" occurs, and tendency occurs such that the players of the user take action of promptly retreating to the own territory to strengthen the defense. FIG. 38C is an example when the tactic of "Central Defense" occurs. In this example, the tendency occurs such that teammate players take action to make it difficult for an enemy player to give a vertical pass in the front-back direction of the field and the enemy player is directed to make a lateral pass toward the center of the field, so that a player at the center of the field can intercept the pass. FIG. 38D is an example when the tactic of "Side Defense" occurs. In this example, the tendency occurs such that the players of the user take action of forcing the enemy players into the side of the field and take action of sandwiching an enemy player who passes forward to intercept the ball BL.

As can be clear from the examples in FIGS. 37A to 38D, the team tactics reproduce various kinds of tactics that can be employed in real soccer, in the game, and the target area corresponding to each tactic is set along with a range on the field on which emphasis is placed in accordance with the tactic in real soccer. When the occurrence condition of the tactic is satisfied, the calculation tendency changes to increase the tendency for players to act in the target area, which increases a possibility that the actions of the players appear to fit the tactic set by the user. Thus, the user can experience a feeling that the players act along with the tactic set by the user, which increases a sense of satisfaction and acceptance of the user. Whether or not each tactic is caused to occur is entrusted to the selection of the player cards by the user in the instruction part. The user can therefore determine a good opportunity of occurring the tactic taking the conditions of the match into consideration and cause the tactic to occur. Further, when the tactic occurs, the power of influence is corrected to increase in the target area, thereby the parameters of the player are reinforced if the action occurs such that the player preferentially utilizes the target area. This results in making the tactic more likely to providing advantageous effects. Therefore, it is possible to make the user feel that the user's command is accurate. It is therefore possible to increase strategic characteristics and amusement characteristics of the game, which eventually increasing the interest of the game.

As is clear from the above description, the formation regarding the team of the user and the team tactics for each category are set in the "Game Plan" separately from the match. Further, at which position on the formation each player card is to be disposed is selected through "Change of Players" separately from the match. An opportunity of selection to be provided to the user after the match is started is an opportunity to select the player cards in the instruction part in each turn, and neither the formation or the tactic nor the positions of the player cards on the formation can be changed. Thus, association between the player cards and the tactics cannot be changed after the match is started. It is therefore necessary for the user to make a strategy, before the start of the match, to set the formation and the team tactics and select positions of the player cards. While such a mechanism imposes a restriction that change cannot be freely made in accordance with the conditions of the match regarding strategy planning and selection for implementing the strategy, the mechanism can provide amusement characteristics of selecting the player cards in each turn to implement the initial strategy, to the game.

On the other hand, in a real soccer game, it is allowed directions such as substitution of players, change of the formation and change of the positions. Such an element of directions may be included in the game content. For example, at least part of the selection items in the "Team Management" in FIG. 2 may be allowed to be selected and changed in the instruction part in the turn during the match.

[Configuration and Processing of Control System of User Device]

(1) Configuration Example of Control System

Figure 39:
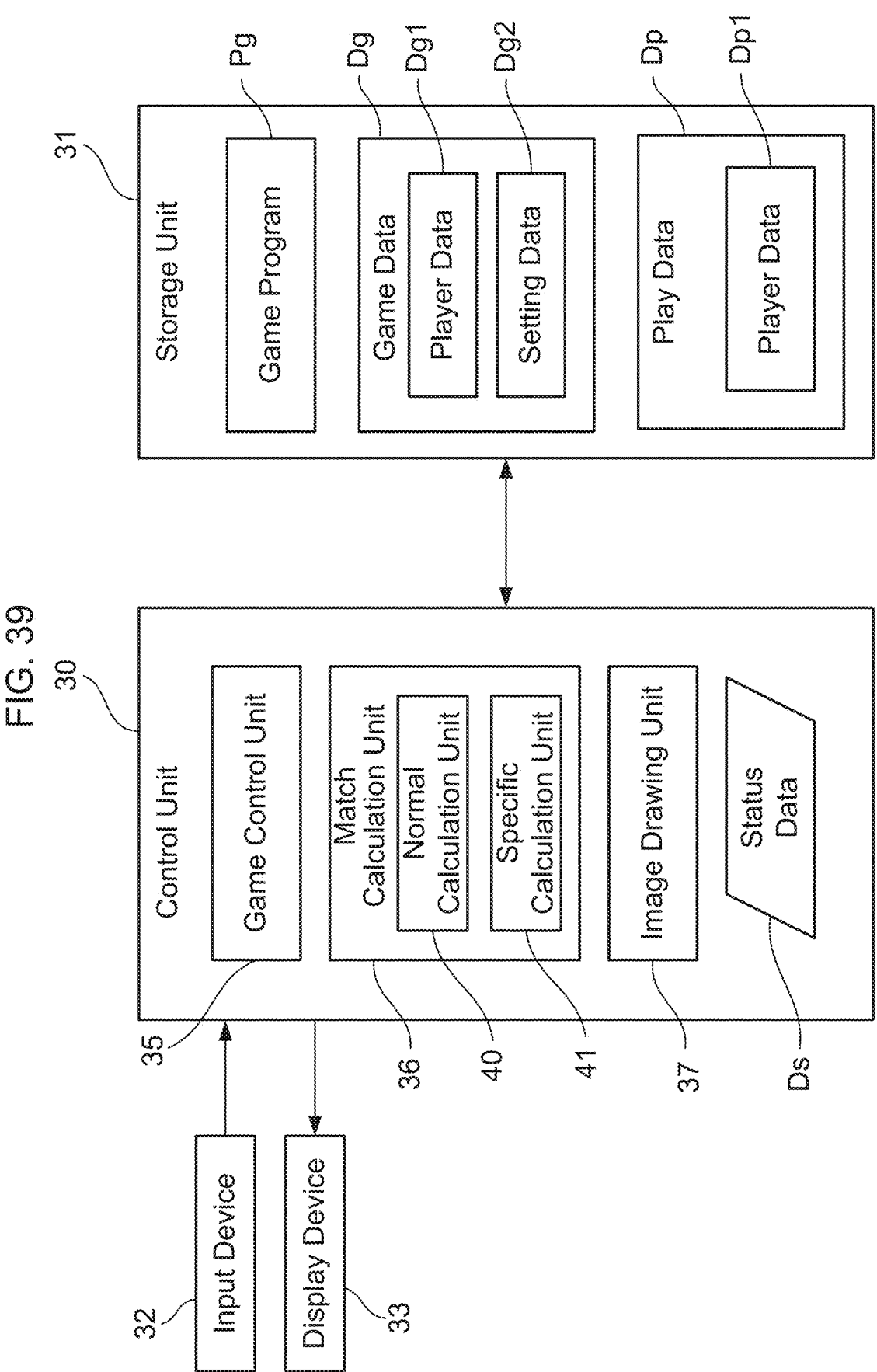
FIG. 39 is a view illustrating an example of a configuration of a control system in a user device.

Next, an example of a control system in a user device for implementing the game described above will be described with reference to FIG. 39 and FIG. 40. As illustrated in FIG. 39, a control unit 30 and a storage unit 31 are provided in the user device 3. The control unit 30 is configured as a computer including a CPU and an internal storage device necessary for operation of the CPU, for example, a cache memory, a RAM, a frame memory, and the like. The storage unit 31 is a storage device that serves as an external storage device with respect to the control unit 30, using a nonvolatile storage medium such as a magnetic storage medium, a flash memory, or the like. To the control unit 30, there are connected an input device 32 that detects operation of the user and outputs an operation signal in accordance with the detection result, and a display device 33 for displaying the game screen, and the like. While, in addition to the above, a speaker unit for outputting sound, a communication control unit for controlling communication with the server 4, and the like, are connected to the control unit 30, illustration of them is omitted.

In the storage unit 31, there are recorded a game program Pg, game data Dg and play data Dp. The game program Pg is an application program for causing the control unit 30 to execute calculation processing and operation control necessary for the game in cooperation with an operating system that controls basic operation of the control unit 30. The game data Dg is data to be referred to as appropriate in control of the game. The game data Dg includes player data Dg1 and setting data Dg2 as an example. The player data Dg1 is data describing various kinds of players appearing in the game or characteristics of player cards corresponding to the players. The player data Dg1 may include, for example, values of various kinds of parameters to be associated with the players or the player cards, information on attributes such as name of the players, image data for expressing appearance of the players, and the like. The player data Dg1 may include data for specifying distribution (FIG. 26*a*) of the power of influence specific to the above-described players. The setting data Dg2 may include various kinds of information regarding items to be set in advance in the game such as arrangement of the position indexes 133 in each formation, arrangement of the tactic marks 136 for each formation and each tactic, a range of the target area corresponding to each tactic.

The play data Dp is data for each user associated with play of the game by the user of the user device 3. For example, in the play data Dp, there is described information such as play history and a status of the user. The play data Dp may include information indicating eleven player cards selected by the user and positions thereof on the field, and selection conditions of the formation and the tactics in the game plan. The play data Dp includes player data Dp1. In the player data Dp1, there is recorded information for discriminating the player cards possessed by the user. When the values of various kinds of parameters associated with the player cards are changed in accordance with play records of the game, information indicating current values of the parameters may be further recorded in the player data Dp1. In this case, the values of the parameters in the player data Dg1 of the game data Dg may be initial values before the play records of the user are reflected.

The program Pg and the game data Dg described above are delivered to the user device 3 from the server 4 as appropriate and stored in the storage unit 31. The play data Dp is updated as appropriate in accordance with play of the game at the user device 3 and stored in the server 4 in association with identification information of the user at an appropriate timing. Further, if the user has been authenticated by the server 4 to play the game, the play data Dp corresponding to the user is provided to the user device 3 from the server 4 and stored in the storage unit 31.

By the control unit 30 executing the game program Pg, there are provided in the control unit 30 with a game control unit 35, a match calculation unit 36 and an image drawing unit 37. Each of the units 35 to 37 is logical device to be implemented by cooperation of computer hardware of the control unit 30 and the game program Pg as software. The game control unit 35 is in charge of various kinds of processing necessary for the game to proceed in accordance with predetermined procedure. The game control unit 35 generates status data Ds for determining conditions of the match, or the like, in the game, stores the status data Ds in an internal storage device of the control unit 30 and updates the status data Ds as appropriate in association with proceeding of the game. The status data Ds may include various kinds of information indicating conditions of the match, such as, for example, a progress status of the match, for example, current positions of the players of the user and the opponent in the field, the position of the ball, an elapsed period of the match, and points.

The match calculation unit 36 is a logical calculation unit that operates in accordance with the control by the game control unit 35 and calculates the action of each player in the match. The game control unit 35 provides arrangement of the player cards before the match is started and various kinds of selection results in each instruction part during the match to the match calculation unit 36 as calculation conditions and controls calculation operation. Thereby, the game control unit 35 serves as an example of a calculation control unit. The match calculation unit 36 repeatedly calculates conditions of the match including the action of each player with a period in accordance with a frame rate of the display device 33 on the basis of the calculation conditions provided from the game control unit 35 and the conditions of the match described in the status data Ds. The match calculation unit 36 thereby serves as an example of a match calculation unit.

Figure 40:
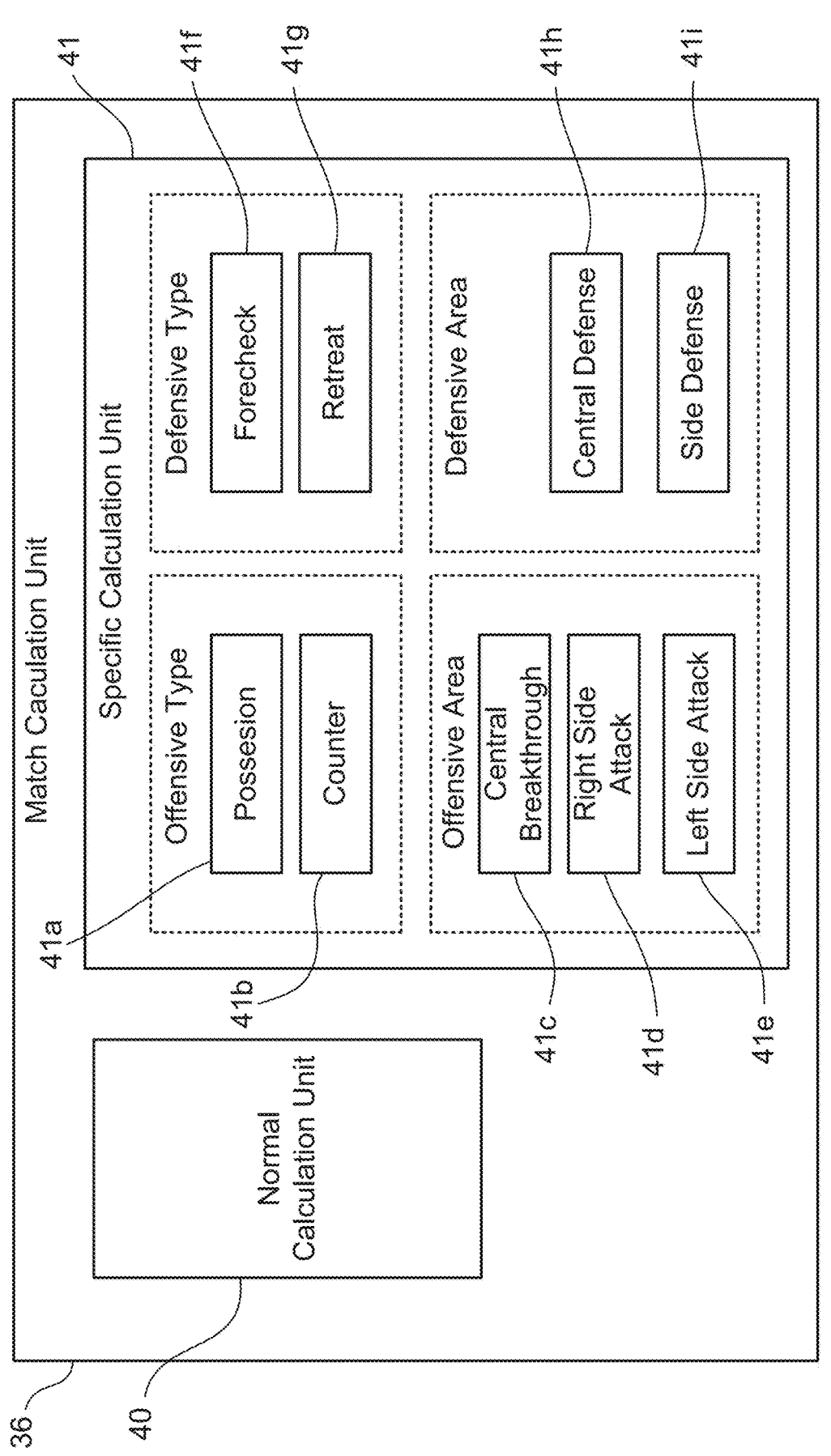
FIG. 40 is a view illustrating an example of a configuration of a match calculation unit.

The match calculation unit 36 is further provided with a normal calculation unit 40 and a specific calculation unit 41 to change the calculation tendency in accordance with occurrence or non-occurrence of the team tactic. The normal calculation unit 40 is a calculation unit to be used for the calculation of the match when the team tactic does not occur. On the other hand, the specific calculation unit 41 is a calculation unit to be used when the occurrence condition of the team tactic is satisfied. As illustrated in FIG. 40, the specific calculation unit 41 further includes a plurality of calculation units 41*a* to 41*i*. The calculation units 41*a* to 41*i* are associated with a plurality of tactics prepared in the match on a one-to-one basis. Operation of the calculation units 41*a* to 41*i* is differentiated to cause the calculation tendency that fits the corresponding tactics. For example, the calculation operation is set to increase the tendency to cause the action intended in "Possession" for the calculation unit 41*a* corresponding to "Possession", and calculation operation is set to increase the tendency to cause the action intended in "Counter" for the calculation unit 41*b* corresponding to "Counter". Such calculation units 41*a* to 41*i* may be configured as logical calculation units utilizing, for example, artificial intelligence (AI). In this case, it is possible to cause the calculation unit 41*a* corresponding to "Possession" to learn a number of cases in which the action intended in possession occurs to obtain the calculation tendency that fits "Possession". The other calculation units 41*b* to 41*i* may be also caused to obtain the calculation tendency that fits the intention of the tactics in a similar manner.

(2) Processing Example of Control System

Next, an example of various kinds of processing to be executed by the control unit 30 for providing the game having content described above will be described with reference to FIG. 41 to FIG. 45. The processing is executed for providing the game in accordance with the procedure described using FIG. 3 to FIG. 5. In the following, description will be provided assuming that the processing from FIG. 41 to FIG. 45 is executed by the control unit 30 of one of the user devices 3. If the opponent is a virtual user, all the processing can be completed by the control unit 30 of the single user device 3 executing processing for the opponent in parallel. On the other hand, when the opponent is the real user, the following processing is executed while the control units 30 of the respective user devices 3 sharing information via the server 4. However, the calculation of the match should be uniquely determined between the user devices 3. Thus, the match calculation unit 36 of the control unit 30 of one of the user devices 3 may execute the calculation of the match as a representative and share the calculation result with the other user devices 3. The control units 30 of the plurality of user devices 3 may process the calculation of the match in a distributed manner. Further, the server 4 may perform at least part of the following processing.

Figure 41:
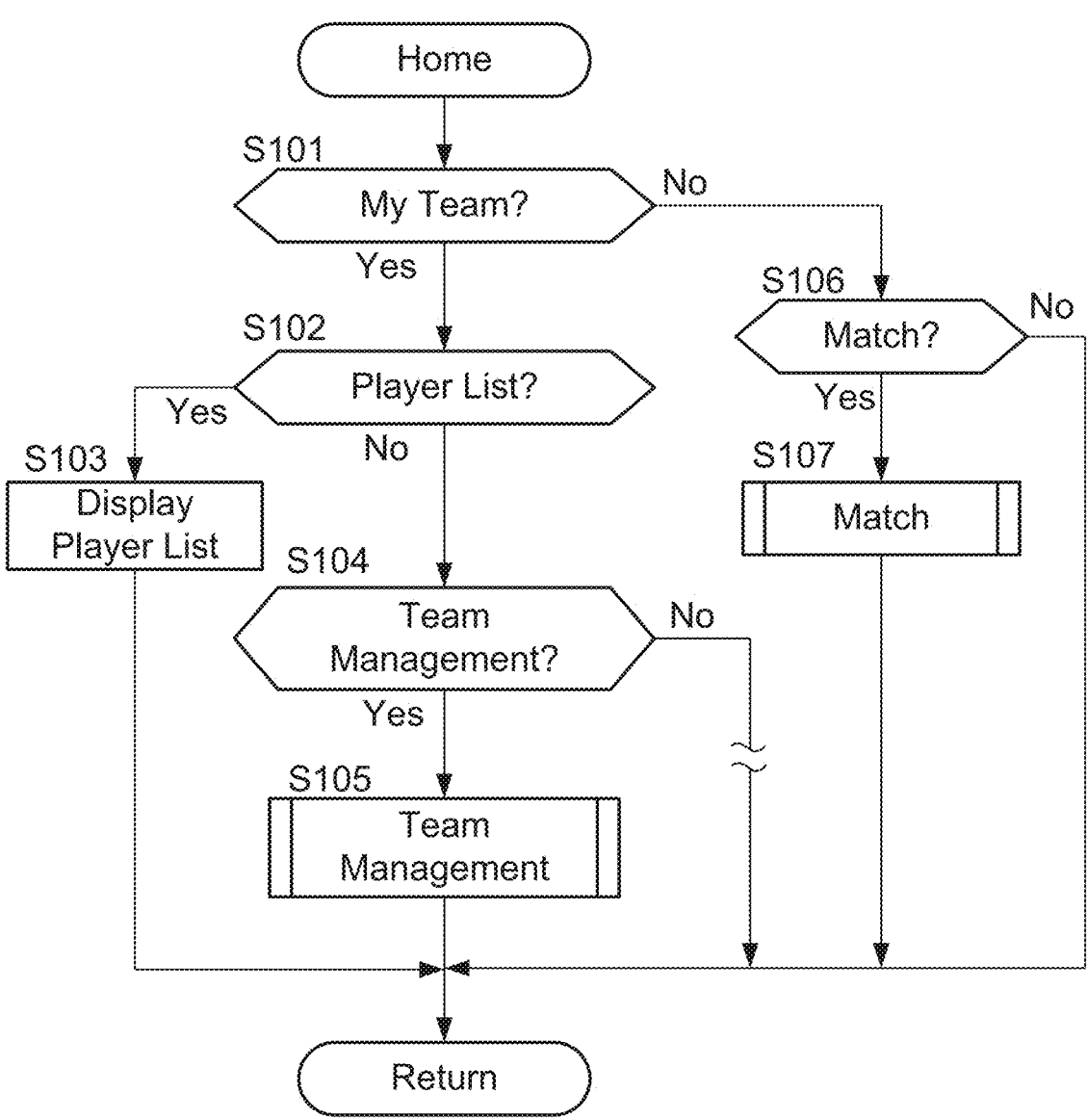
FIG. 41 is a flowchart illustrating an example of procedure of home processing to be executed by a game control unit.

FIG. 41 illustrates an example of procedure of home processing to be executed when some kind of operation by the user is detected in a state where the home screen is displayed. When the home processing in the drawing is started, the game control unit 35 first determines whether or not "My Team" is selected on the home screen (step S101), and when "My Team" is not selected, determines whether or not the "Player List" is selected (step S102). When the "Player List" is selected, the game control unit causes the player list screen 110 illustrated in FIG. 6 to be displayed and controls display content as appropriate in accordance with operation by the user (step S103). On the other hand, when a negative determination result is obtained in step S102, the game control unit 35 determines whether or not the "Team Management" is selected (step S105). When the "Team Management" is selected, the game control unit 35 executes team management processing (step S105). When the "Team Management" is not selected, the game control unit 35 determines whether or not other selection items within the home screen are selected as necessary and executes processing in accordance with the determination result. While, for example, processing for purchasing player cards, or the like, may be executed, details thereof will be omitted.

When a negative determination result is obtained in step S101, the game control unit 35 determines whether or not the "Match" is selected (step S106). When the match is selected, the game control unit 35 executes predetermined match processing (step S107). Besides, it is also possible to cause the user to select whether the user plays the match with the real user as the opponent or plays the match with the virtual user as the opponent in this stage. When the real user is selected as the opponent, it is only necessary to request matching to the server 4 to acquire the opponent. When the processing described above is finished, the game control unit 35 finishes the home processing and stands by for new selection by the user.

Figure 42:
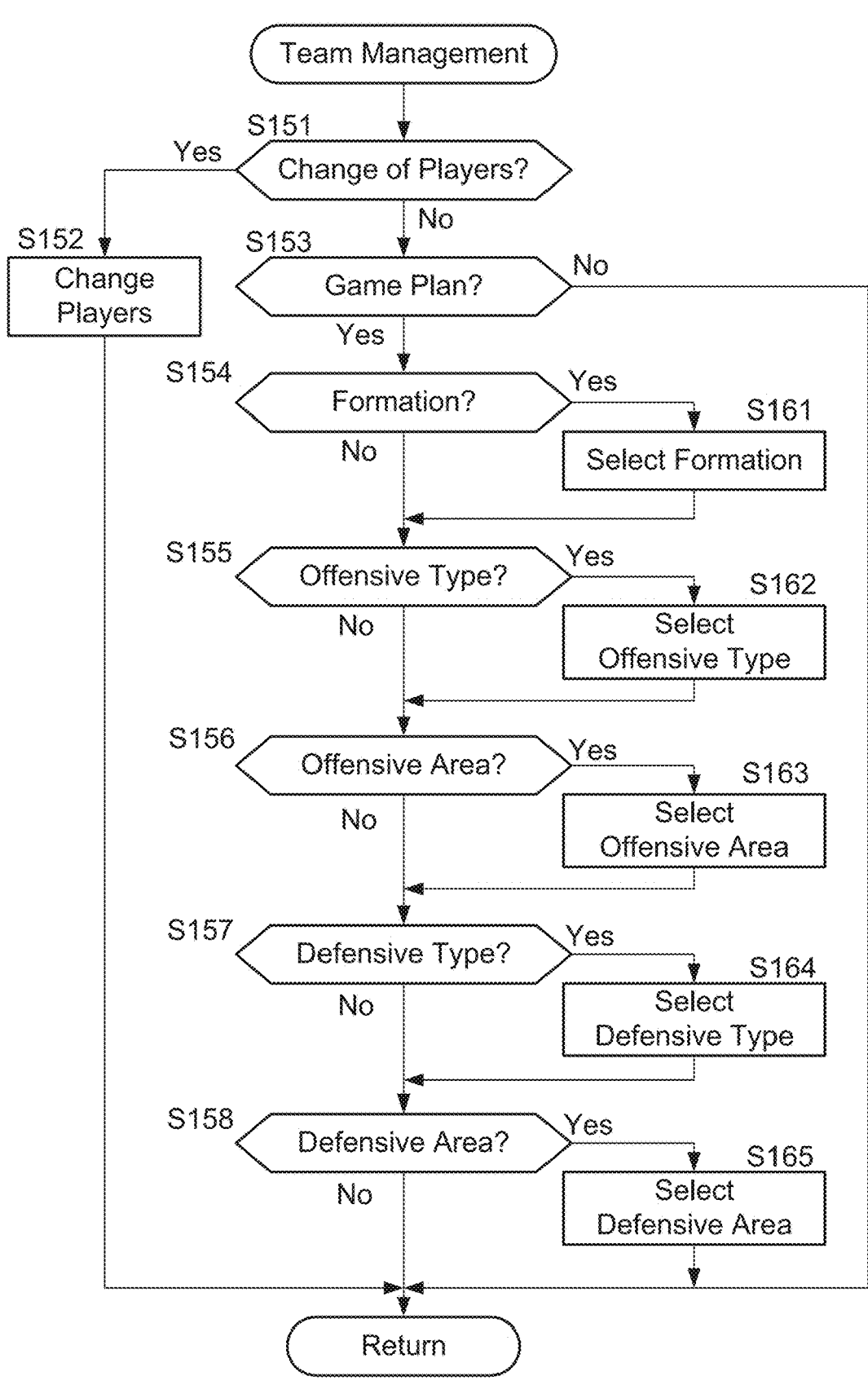
FIG. 42 is a flowchart illustrating an example of procedure of team management processing to be executed by the game control unit.

FIG. 42 illustrates an example of procedure of team management processing to be executed in step S105 in FIG. 41. When the game control unit 35 starts the team manage-ment processing in FIG. 42, the game control unit 35 causes the team management screen 120 in FIG. 7 to be displayed and further determines whether or not the user selects "Change of Players" in a state where the user selects display of the "Players" (step S151). When a positive determination result is obtained in step S151, the game control unit 35 executes processing of setting player cards to be disposed at respective positions on the formation in accordance with the operation by the user in a manner illustrated in FIG. 8 (step S152). Besides, when a selection item other than "Change of Players" is selected from display of the "Players" on the team management screen 120 in FIG. 7, the game control unit 35 executes processing corresponding to the selected item, which will not be described in detail here.

When the negative determination result is obtained in step S151, the game control unit 35 determines whether or not the user selects display of the "Game Plan" on the team management screen 120 (step S153). When a positive deter-mination result is obtained in step S153, the game control unit 35 sequentially determines whether the user selects the "Formation", the "Offensive Type", the "Offensive Area", the "Defensive Type" and the "Defensive Area" as the selection items of the "Game Plan" (step S154 to S157). When one of the items is selected, the game control unit 35 acquires the selection by the user regarding the item selected by the user and holds the selection result as current setting of the game plan (step S161 to S164). In the processing, the screens 140, 150, 160, 170 and 180 illustrated in FIG. 11 to FIG. 16 are selectively displayed in accordance with the selection by the user, and the item desired by the user is selected. The setting of the game plan may be held in the status data Ds illustrated in FIG. 39 or may be recorded in the play data Dp as necessary. When the selection by the user regarding the team management is finished through the processing in FIG. 42, the game control unit 35 finishes the team management processing. The display may be returned to the home screen as a result of this.

Figure 43:
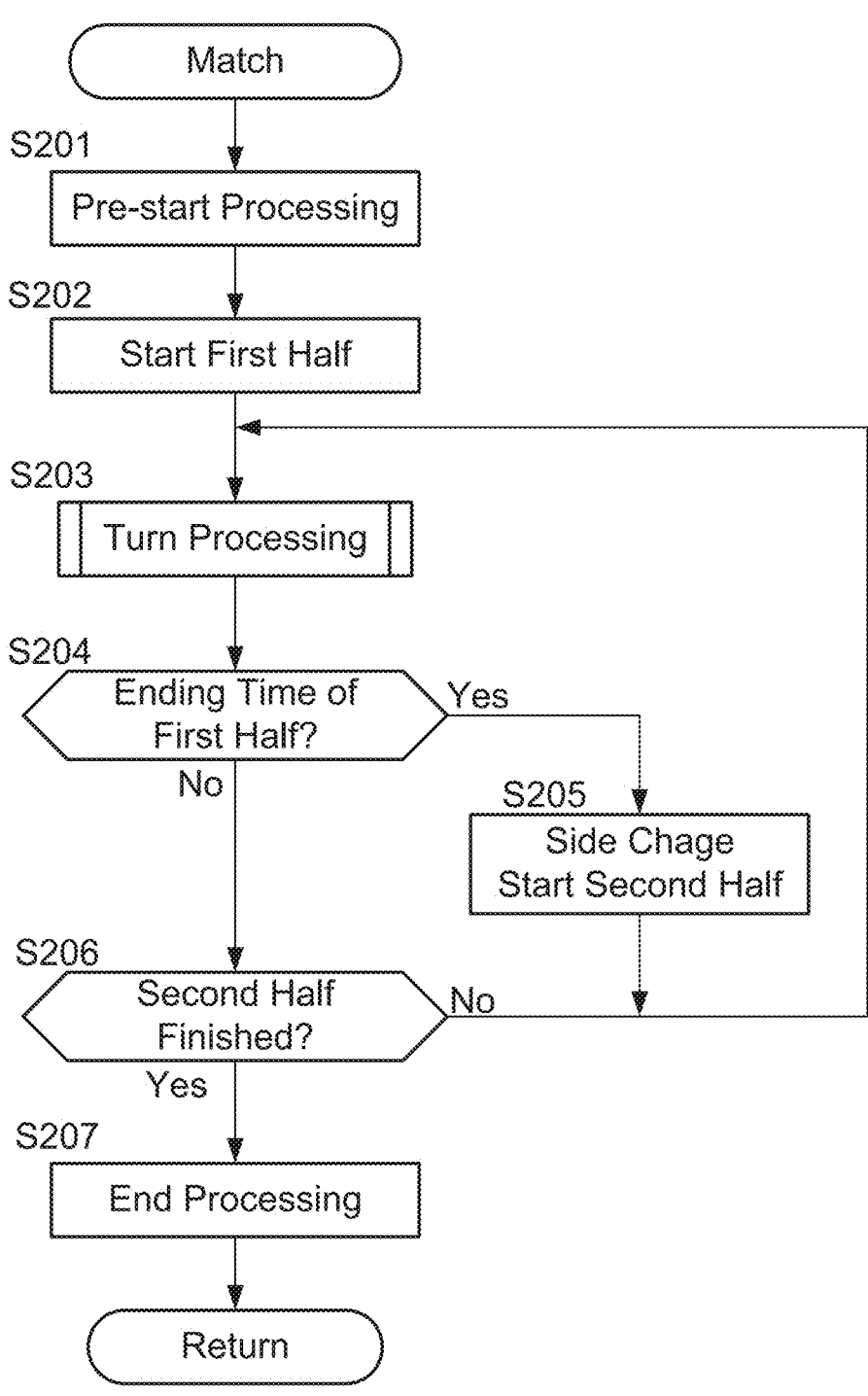
FIG. 43 is a flowchart illustrating an example of procedure of match processing to be executed by the game control unit.

FIG. 43 illustrates an example of procedure of match processing to be executed in step S107 in FIG. 41. When the game control unit 35 starts the match processing in FIG. 43, the game control unit 35 first executes predetermined pre-start processing (step S201). For example, necessary pro-cessing such as determination of the opponent and selection of the offensive side and kickoff is executed before the match. When the pre-start processing is finished, the game control unit 35 starts the first half and starts measurement of the match time (step S202). Then, the game control unit 35 executes predetermined turn processing (step S203). When the turn processing is finished, the game control unit 35 determines whether or not it is ending time of the first half (step S204). When the first half ends by an end of this turn, a positive determination result is obtained in step S204, and if the first half has not been finished yet, or if the match has already entered the second half, a negative determination result is obtained in step S204.

When the positive determination result is obtained in step S204, the game control unit 35 switches the sides between the user and the opponent and starts the second half (step S205), and then, the processing returns to the processing in step S203. On the other hand, when the negative determi-nation result is obtained in step S204, the game control unit 35 determines whether or not the second half has been finished (step S206). If the second half has not been finished yet, the processing of the game control unit 35 returns to the processing in step S203. On the other hand, when it is determined in step S206 that the second half has been finished, the game control unit 35 executes predetermined end processing (step S207) and then finishes the match processing in FIG. 43. In the processing in step S207, processing of displaying, for example, winning or losing, scores and other match results and storing the result in the play data Dp may be performed.

FIG. 44 illustrates an example of procedure of the turn processing to be executed in step S203 in FIG. 43. When the turn processing is started, the game control unit 35 first determines whether or not the user is in the offensive turn (step S221). When it is in the offensive turn, the game control unit 35 acquires tactics in a category on the offensive side selected in the game plan, that is, tactics selected regarding "Offensive Type" and "Offensive Area" as tactics to be determined in this turn (step S222). On the other hand, when it is in the defensive turn, the game control unit 35 acquires tactics in a category on the defensive side selected in the game plan, that is, tactics selected regarding "Defensive Type" and "Defensive Area" as tactics to be determined in this turn (step S223).

After the tactics are acquired in step S222 or S223, the game control unit 35 executes predetermined card selection processing (step S224). This processing is processing of causing the instruction screen 200 illustrated in FIG. 17 to be displayed to acquire the selection by the user. By executing the card selection processing, the instruction part in one turn is implemented. When the card selection processing is finished, the game control unit 35 acquires the distribution of the power of influence of the opponent determined on the basis of the selection by the opponent (step S225). When the opponent is the virtual user, the game control unit 35 is only required to acquire a result of processing executed in parallel regarding the opponent. When the opponent is the real user, the game control unit is only required to acquire the selection by the user from an execution subject that executes processing regarding the opponent. When the opponent causes the tactic to occur, the distribution of the power of influence acquired in step S225 is distribution after the correction on the power of influence corresponding to the tactic is applied.

Subsequently, the game control unit 35 determines whether or not the occurrence condition regarding the tactic to be determined in step S222 or S223 are satisfied on the basis of a selection result by the user acquired through the card selection processing in step S224 (step S226). When two or more player cards associated with the same tactic of a determination target are selected in either case of the offensive turn or the defensive turn, it is determined that the occurrence condition regarding the tactic is satisfied. In each of the offensive turn and the defensive turn, two types of tactics are to be the determination target, and thus, the occurrence condition is determined for each tactic in step S226.

When it is determined in step S226 that the occurrence conditions are not satisfied with respect to either of the two types of tactics, the game control unit determines the distribution of the power of influence corresponding to the player cards selected in the processing in step S224 (step S227). In this case, the correction on the power of influence in association with occurrence of the tactic of the user is not applied, and the distribution obtained by superimposing the distribution of the power of influence acquired in step S225 is determined as the distribution of the power of influence for the players of the user. Then, the game control unit 35 selects the normal calculation unit 40 in FIG. 39 as the calculation unit that should calculate the actions of the players of the user (step S228).

On the other hand, when it is determined in step S226 that occurrence conditions of at least one tactic are satisfied, the game control unit 35 acquires a correction factor of the power of influence corresponding to the tactic for which the occurrence condition is satisfied (step S231). In this case, the correction factor changes in accordance with the number of the selected player cards associated with the tactic for which the occurrence condition is satisfied. Then, the game control unit 35 corrects the distribution of the power of influence determined in accordance with the player cards selected in the card selection processing in step S224 with the obtained correction factor and further superimposes the distribution of the power of influence of the opponent to determine the distribution of the power of influence for the players of the user (step S232). Then, the game control unit 35 selects the calculation unit corresponding to the tactic for which the occurrence condition is satisfied from the calculation units 41a to 41i of the specific calculation unit 41 as the calculation unit that should calculate the actions of the players of the user (step S233). In this case, when the occurrence conditions of two tactics is satisfied, the calculation units corresponding to the respective tactics are selected.

When the calculation unit is selected in step S228 or S233, the game control unit 35 causes the match calculation unit 36 to operate so that the match is calculated by the selected calculation unit (step S234). Thereby, the turn transfers from the instruction part to the operation part. The selection in step S228 or S233 is applied only to the actions of the players of the user, and the actions of the players of the opponent is calculated by the calculation unit selected through the processing in step S228 or S233 regarding the opponent. Further, the conditions of the match are uniquely determined on the basis of the calculation results of the actions of the players of the user and the actions of the players of the opponent.

When the calculation operation by the match calculation unit 36 is started, the game control unit 35 sequentially monitors the calculation result and determines whether or not switching between offense and defense occurs (step S235). A positive determination result is obtained in step S235 when switching between offense and defense occurs in a similar manner to real soccer as a result of the calculation by the match calculation unit 36, when possession of the ball is switched between the user and the opponent, switching between offense and defense occurs as a result of the ball going out of the field, and switching between offense and defense occurs as a result of occurrence of a foul.

When it is determined in step S235 that switching between offense and defense does not occur, the processing of the game control unit 35 returns to the processing in step S234, and the game control unit 35 causes the calculation operation of the match calculation unit 36 to continue. In this case, the operation part continues within one turn, and the match proceeds while the players automatically act. On the other hand, when it is determined in step S235 that switching between offense and defense occurs, the game control unit 35 causes the calculation unit 36 to stop the calculation operation of the match (step S236) and then finishes the turn processing in FIG. 44, and the processing proceeds to the processing in step S204 in FIG. 43. Thereby, the operation part of this turn ends. Then, unless it is determined in step S206 in FIG. 43 that the second half ends, the match transfers to the next turn, the turn is switched between the offensive turn and the defensive turn between the user and the opponent, and the next turn processing is executed.

Figure 45:
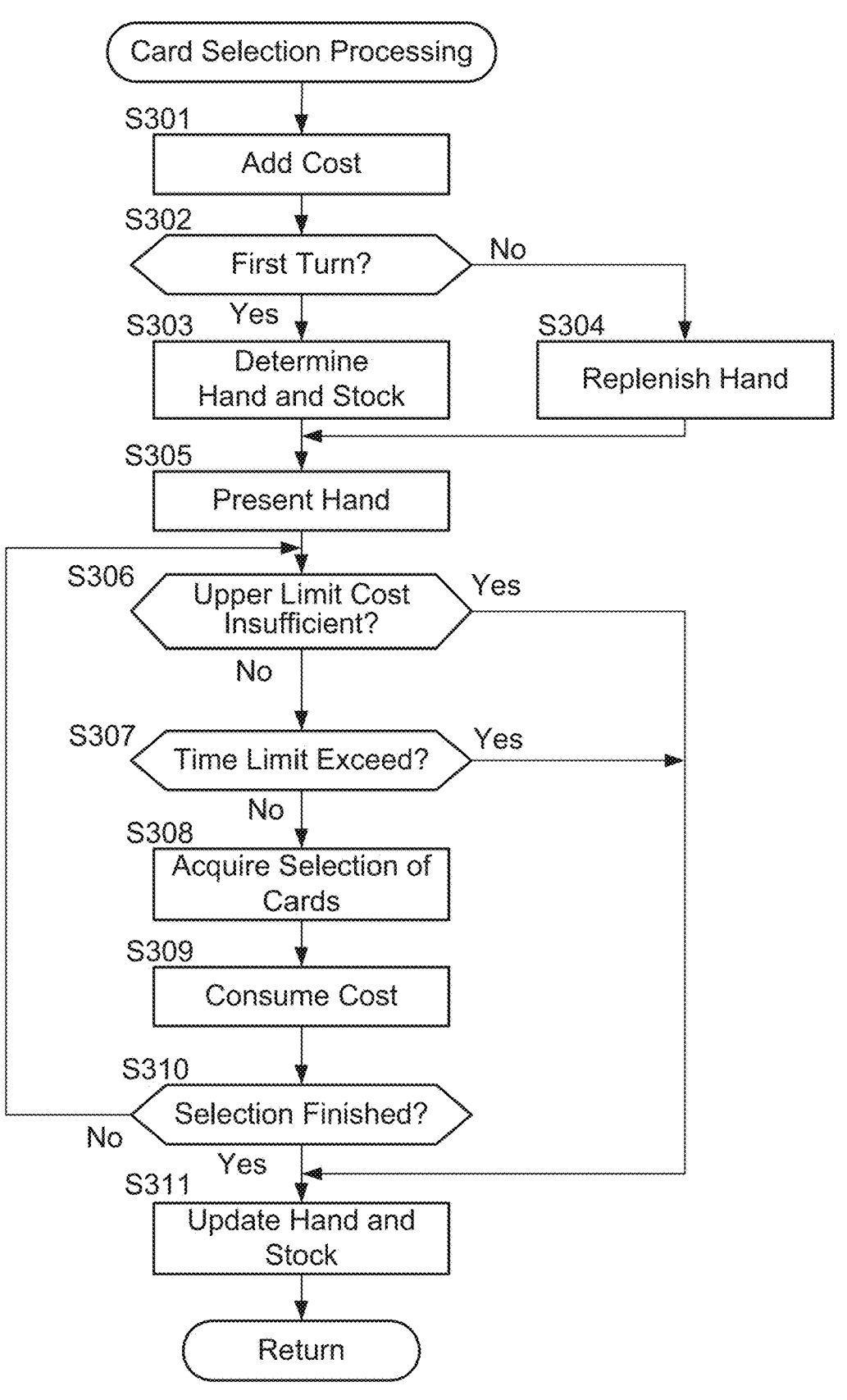
FIG. 45 is a flowchart illustrating an example of procedure of card selection processing to be executed by the game control unit.

FIG. 45 illustrates an example of procedure of card selection processing to be executed in step S224 in FIG. 44. When the card selection processing is started, the game control unit 35 first adds a predetermined value (6 as an example) to the value of the upper limit cost that can be consumed by the user in this turn (step S301). However, an additional value is adjusted so as not to exceed the maximum value when the upper limit cost reaches the maximum value. Then, the game control unit 35 determines whether or not the turn is the first turn after the match is started, that is, the first turn of the first half (step S302). When the turn is the first turn, the game control unit 35 randomly selects five player cards as the hand from eleven player cards as the deck and determines the order of the remaining six player cards and determines the player cards as the stock (step S303). When a negative determination result is obtained in step S302, the game control unit 35 specifies the number of the plyer cards in the hand remaining in the previous turn and replenishes the player cards corresponding to the deficient number of the player cards to the hand from the stock so that there are five player cards in the hand (step S304). Determination and replenishment of the player cards in step S303 and S304 may be performed in a manner illustrated in FIG. 18.

When five player cards in the hand are collected in the processing in step S303 or S304, the game control unit 35 presents the hand to the user (step S305). Further, the game control unit 35 starts measurement of an elapsed period of the instruction part by being triggered by presentation to the user. Then, the game control unit 35 determines whether or not the value of the upper limit cost is insufficient, that is, the value thereof is smaller than a value necessary for selecting one or more player cards (step S306). When there is no shortage of the upper limit cost, the game control unit 35 determines whether or not the elapsed period of the instruction part exceeds time limit (step S307). If the elapsed period has not exceeded the time limit, the game control unit 35 acquires selection content of the player cards by the user (step S308) and consumes the upper limit cost in accordance with the cost of the selected player cards (step S309). However, in the processing in step S308, the selection of the player card to which the cost exceeds a current value of the upper limit cost is made impossible. When the player card is not selected in step S308, it is only necessary to maintain the current value of the upper limit cost while setting a consumption amount of the upper limit cost at 0 in step S309.

Subsequently, the game control unit 35 determines whether or not the selection of the player cards in the instruction part of this time has been finished (step S310). For example, it is determined whether or not the user explicitly gives an instruction to end the selection. If all of five player cards in the hand have been selected, it may be determined that the selection has been finished without the need to give an instruction to end the selection by the user. When it is not determined in step S310 that the selection has been finished, the processing of the game control unit 35 is returned to the processing in step S306. When it is determined in step S310 that the selection has been finished, the game control unit 35 removes the player cards selected in this turn from the hand and updates the hand and the stock by replenishing these player cards to the stock after the sequence of the stock (step S311). The updating may be performed through procedure as illustrated in FIG. 18. When the user does not select the player cards in this turn, it is only necessary to maintain the hand and the stock as is in step S311.

When an affirmative determination result is obtained in step S306 or S307, the game control unit 35 skips the processing from step S308 to S310, and the processing proceeds to step S311. Also in this case, when the user does not select the player cards, the hand and the stock may be maintained as they are. When the processing in step S311 is finished, the game control unit 35 finishes the card selection processing in this turn, and the processing proceeds to processing in step S225 in FIG. 44.

In the above-described embodiment, various kinds of parameters set in association with the player cards CD correspond to one example of at least one type of parameter set at the object, and the match calculation unit 36 serves as one example of a match calculation unit by calculating, in response to step S234 in FIG. 44, the action of the player that corresponds to the player card CD selected by the user with reference to the values of the parameters corresponding to the player.

The offensive turn corresponds to one example of the first turn, the defensive turn corresponds to one example of the second turn, and the opportunity to select player cards CD provided in the instruction part of each turn corresponds to one example of an opportunity of selection regarding the match. The game control unit 35 serves as one example of a selection opportunity provision unit by stopping the calculation operation in step S236 in FIG. 44 and executing the processing from step S301 to S311 in FIG. 45. Further, the game control unit 35 serves as one example of the calculation control unit by executing the processing from step S225 to S235 in FIG. 44 and causing the match calculation unit 36 to execute the calculation in which the selection in the instruction part is reflected. Still further, the game control unit 35 serves as one example of an influence generation unit by obtaining the distribution of the power of influence regarding the effect area EA corresponding to the player card CD selected in the instruction part in step S227 or S232 in FIG. 44.

The effects occurring in accordance with the tactic in each category of the "Offensive Type", the "Offensive Area", the "Defensive Type" and the "Defensive Area" selectable through the team management processing in FIG. 42 corresponds to one example of a predetermined effect regarding the match, the effect corresponding to each of the "Offensive Type" and the "Defensive Type" on the offensive side corresponds to one example of the first specific effect, and the effect corresponding to each of the tactics in each category of the "Defensive Type" and the "Defensive Area" on the defensive side corresponds to one example of the second specific effect. The selection of two player cards CD associated with at least one tactic in the category on the offensive side in the instruction part in the offensive turn, and the selection of at least two player cards CD associated with at least one tactic in the category on the defensive side in the instruction part in the defensive turn correspond to one example of an effect occurrence condition, the effect occurrence condition corresponding to the tactic on the offensive side correspond to one example of the first condition, and the effect occurrence condition corresponding to the tactic on the defensive side correspond to one example of the second condition.

The game control unit 35 serves as one example of an effect occurrence determination unit by determining whether or not the occurrence condition of the team tactic is satisfied in step S226 in FIG. 44 and serves as one example of an effect control unit by selectively executing the processing in step S227 and S228 or the processing from step S231 to S233 in accordance with the determination result in step S226 in FIG. 44 and causing the match calculation unit 36 to operate in step S234 following the processing. Further, the game control unit 35 serves as one example of a correction unit by correcting the distribution of the power of influence within the target area TA to increase the values of the parameters of the player located in the target area TA of the tactic in the processing in step S231 and step S232 in FIG. 44. The action of the player in the target area TA corresponds to one example of specific action of the object. Further, the game control unit 35 serves as one example of a calculation tendency control unit by causing the calculation units 41a to 41i of the specific calculation unit 41 or the normal calculation unit 40 among the match calculation unit 36 to selectively operate in accordance with occurrence or non-occurrence of the team tactic in step S233 or step S228 in FIG. 44.

The present invention is not limited to the above-described embodiment and may be implemented in a form in which various kinds of modifications or changes are made. For example, an opportunity of the selection regarding the match is not limited to an example in which the object within the field is selected via the game medium, and the object may be directly selected. Alternatively, an opportunity of the selection is not limited to selection of the object, and opportunities of various kinds of selection by the user may be provided. Processing for reflecting the selection in each turn in the calculation of the action is not limited to an example where values of parameters are changed via the above-described power of influence, and the processing may include other examples as appropriate as long as the selection by the user can provide influence on the action of the object. For example, the selection by the user may be reflected in the calculation of the action by providing processing of limiting at least part of the action of the object in accordance with the selection by the user or allowing special action of the object.

A timing of reflecting the selection by the user in the calculation of the action of the object may be set in at least part of the target period that is within the same turn as the turn in which the user performs the selection. It is not excluded that the selection by the user in the previous or earlier turn will be reflected in the calculation of the action of the object in the next and subsequent turns. For example, while in the above-described embodiment, the selection by the user in the previous or earlier turn is reflected in the calculation of the action in the next and subsequent turn through residual of the power of influence, the present invention is not limited to such an example, and a range in which the selection by the user is reflected may be set in accordance with various kinds of viewpoints such as the valid number of times and a duration, and a plurality of turns may be included in the range.

Even though the values of the parameters of the object are changed in accordance with the selection by the user, the present invention is not limited to an example where the parameters are set in accordance with viewpoints of capability or performance regarding the action of the object. The parameters corresponding to the object may be set in accordance with appropriate viewpoints as long as the parameters are referred to in the calculation of the action of the object. An application target of change of the values of the parameters is not limited to the object which acts in the effect area or the target area. The appropriate parameters of the object may be set as the target of change in association with the selection by the user. The correction on the parameters in the target area may be applied in an appropriate aspect as long as the correction can cause some kind of change in the calculation of the action. Application of the correction is not limited to an example of providing the influence on the action of the object of the user, and the correction may be applied to provide the influence on the action of the object of the opponent. Processing of reflecting the selection by the user in the calculation of the action of the object is not limited to an example of determining whether or not a predetermined effect occurrence condition is satisfied as a result of the selection by the user. The selection by the user may be reflected regardless of whether or not the condition is satisfied.

While in the above-described embodiment, an example where the effects are divided in accordance with whether the turn is the offensive turn or the defensive turn, an effect common to the respective turns may be set. For example, while in the above-described embodiment, the effect area EA corresponding to the position of the player card CD selected in the instruction part is set regardless of whether or not the condition is satisfied, and the values of the parameters are enhanced in accordance with the distribution of the power of influence in the effect area EA, the present invention is not limited to such processing, and the influence in accordance with the selection by the user may be reflected in the calculation of the action of the object.

Opportunities of the selection in a turn do not necessarily have to be provided to the user and the opponent mutually and concurrently. For example, the opportunity of the selection may be provided only to one of the offensive turn and the defensive turn. Further, an aspect can be allowed where the opportunity of the selection is provided only to the user, and the opponent is not allowed to perform the selection. Switching of the turn only requires to occur in accordance with a result of the calculation of the action of the object. As well as an example of a type in which objects of the user and the opponent are mixed and play the match in the virtual space of the game, also in the match of a type such as, for example, baseball, volleyball and American football, in which the offensive side and the defensive side are clearly separated, as long as switching of the offensive side and the defensive side occurs as a result of the calculation of the action, the turn may be defined in accordance with the switching of the offensive side and the defensive side.

While in the above-described embodiment, a plurality of tactics are set as effects to be occurred in the match, and the user is allowed to select the effect, the selection of the effect is not necessarily required. A fixed effect that cannot be selected by the user may be set. There may be also a case where the effect is selected without being entrusted to the selection by the user, for example, the effect is automatically selected in accordance with conditions of the match.

While in the above-described embodiment, the user plays the game of soccer, the target of the game can be changed as appropriate as long as the game includes the element of the match. For example, the game of baseball may be provided. A modification in this case is illustrated in FIG. 46 to FIG. 48.

Figure 46:
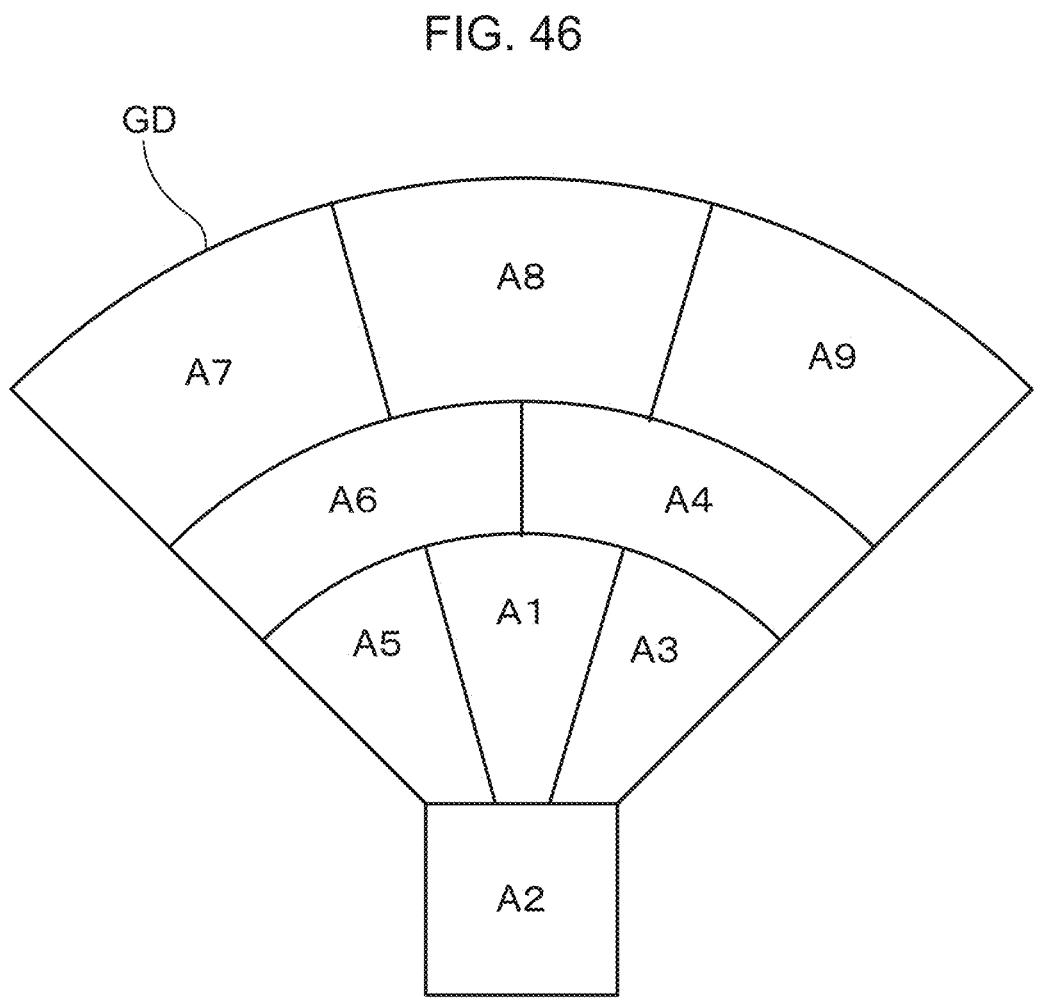
FIG. 46 is a view illustrating an example of region division of a ground in a modification targeted at a baseball game.

When targeting baseball, for example, as illustrated in FIG. 46, a ground GD is divided into a plurality of area A1 to A9 in accordance with defensive positions of a pitcher, a catcher and fielders. A deck of the user includes player cards corresponding to nine players to which first to ninth batting orders are allocated, and players corresponding to the player cards are caused to operate as objects within a game space. One inning is divided into the offensive turn during which the players are on the offensive side, and the defensive turn during which the players are on the defensive side. Further, in the offensive turn, the instruction part is provided when the offense is started with no count and no outs, to provide an opportunity to select the player cards. In the defensive turn, the instruction part is provided when the offense is started with no count and no outs, to provide an opportunity to select the player cards.

The power of influence in the ground GD is set for each of the areas A1 to A9 in FIG. 46 or in units finer than this, and distribution is determined. Further, parameters of the players are changed in accordance with the power of influence. For example, when the user is in the offensive turn, change may be made such that the values of parameters related to defense of the players on the defensive side are decreased in accordance with the power of influence in an area in which the power of influence is set. The values of parameters of, for example, running ability and hitting ability of the player who becomes a batter may be increased on the user side. On the other hand, when the user is in the defensive turn, change may be made such that the values of parameters regarding defense of the team of the user may be increased in accordance with the power of influence.

Figure 47:
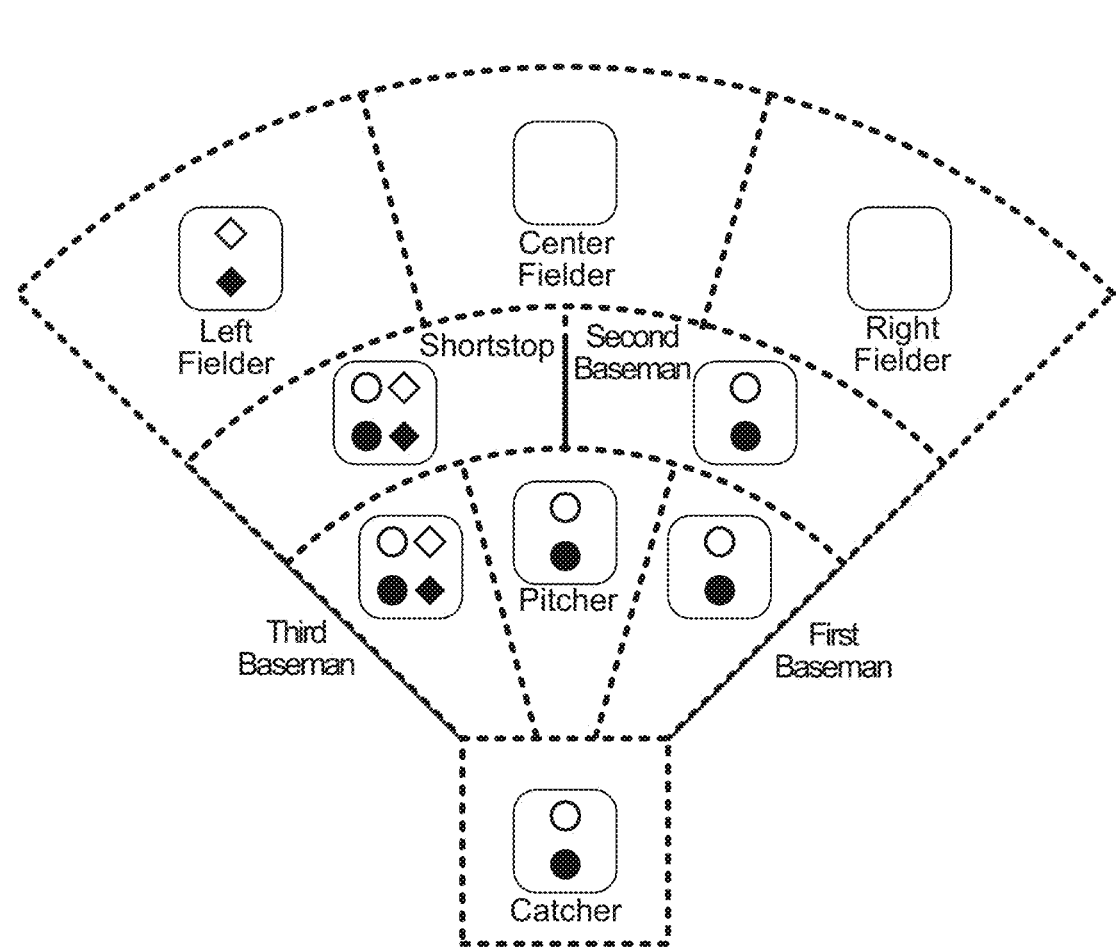
FIG. 47 is a view illustrating an example of association of tactics with each region in FIG. 46.

Team tactics may be able to be associated in accordance with the positions on the ground GD of the respective players, for example, as illustrated in FIG. 47. An example of the team tactics in this case is illustrated in FIG. 48. In the example in FIG. 48, "Low-Ball Hitting" is prepared as a tactic on the offensive side, "Pulling" is prepared as the offensive area, "Draw in" is prepared as a tactic on the defensive side, and "Left Shift Defense" is prepared as the defensive area. The tactics may be associated with the player cards via the positions on the ground GD in a similar manner to the above-described embodiment. FIG. 47 illustrates an example of association between the positions and the tactics. Further, also an occurrence condition of each tactic may be set to be satisfied when the user selects a predetermined number of player cards associated with the tactic in each turn. Still further, when the tactic occurs, it is only necessary to correct the power of influence regarding an area included in the target area set in association with the tactic among the area A1 to A9 and change calculation tendency regarding action of the players of the user to increase a possibility that the tendency in FIG. 48 occurs.

Various kinds of aspects of the present invention derived from each of the above-described embodiment and modification will be described below. Besides, while in the following description, corresponding components illustrated in the accompanying drawings are denoted by brackets to facilitate understanding of each aspect of the present invention, this does not limit the present invention to an illustrated form.

A non-transitory storage medium according to one aspect of the present invention is the non-transitory storage medium storing a computer program (Pg) for a game for, by causing a computer (30) of a game system (1) to serve as a match calculation unit (36, S234) that calculates an action of each of objects (PL) of a user and an opponent within a predetermined field (FD) to cause a match between the user and the opponent to proceed, providing by the computer the game in which a first turn that becomes an offensive side of the match and a second turn that becomes a defensive side of the match occur to switch between the user and the opponent on the basis of a calculation result of the action, wherein the computer program is configured to cause the computer to serve as a selection opportunity provision unit (35, S236, S301 to S311) that suspends actions of the objects in conjunction with switching of the first turn and the second turn and provides an opportunity of selection regarding the match to the user, and a calculation control unit (35, S225 to S235) that controls calculation of the match calculation unit so that the selection by the user is reflected in the calculation by the match calculation unit within a target period until switching of the first turn and the second turn occurs next.

A game system according to one aspect of the present invention is the game system (1) comprising a computer (30) that serves as a match calculation unit (36, S234) that causes a match between a user and an opponent to proceed by calculating an action of each of objects (PL) of the user and the opponent within a predetermined field (FD) and provides by the computer a game in which a first turn which becomes an offensive side of the match and a second turn which becomes a defensive side of the match occur to switch between the user and the opponent on the basis of a calculation result of the action, wherein the game system is configured to cause the computer to further serve as a selection opportunity provision unit (35, S236, S301 to S311) that suspends actions of the objects in conjunction with switching of the first turn and the second turn and provides an opportunity of selection regarding the match to the user, and a calculation control unit (35, S225 to S235) that controls calculation by the match calculation unit so that the selection by the user is reflected in the calculation by the match calculation unit within a target period until switching of the first turn and the second turn occurs next.

A control method for a game system according to one aspect of the present invention is the control method for the game system (1) for, by causing a computer (30) of the game system to serve as a match calculation unit (36, S234) that causes a match between a user and an opponent to proceed by calculating an action of each of objects (PL) of the user and the opponent within a predetermined field (FD), providing by the computer a game in which a first turn that becomes an offensive side of the match and a second turn that becomes a defensive side of the match occur to switch between the user and the opponent on the basis of a calculation result of the action, wherein the control method is configured to cause the computer to further serve as a selection opportunity provision unit (35, S236, S301 to S311) that suspends actions of the objects in conjunction with switching of the first turn and the second turn and provides an opportunity of selection regarding the match to the user, and a calculation control unit (35, S225 to S235) that controls calculation by the match calculation unit so that the selection by the user is reflected in the calculation by the match calculation unit within a target period until switching of the first turn and the second turn occurs next.

According to the above-described aspects, it is possible to separate proceeding of the match into the first turn on the offensive side and the second turn on the defensive side and provide the opportunity of the selection to the user by being triggered by switching of the turns. Thus, even though the game is of a type in which the match automatically proceeds in accordance with the calculation of the actions of the objects, it is possible to allow the user to grasp a timing at which the opportunity of the selection is to be provided and appropriately reflect intention of the user in proceeding of the match by providing moderate regularity and predictiveness to a timing at which the opportunity of the selection occurs. Moreover, the selection by the user is reflected in the calculation of the actions of the objects in the turn in which the selection is performed. This makes it possible for the user to clearly grasp how the selection by the user affects the proceeding of the match. This allows the user to repeat the selection on the basis of conditions of the match in each turn. Thus, strategy and tactics of the user are likely to be reflected in the proceeding of the match through a series of the selection, which can improve interest of the game.

Besides, the computer program according to one aspect of the present invention may be provided in a state where the computer program is stored in a storage medium. Use of this storage medium enables, for example, the computer program according to the present invention to be installed in the computer and executed, which enables the system of the present invention to be implemented by utilizing the computer. The storage medium in which the computer program is stored is the non-transitory storage medium such as a CD-ROM.

In the above-described aspects, the match calculation unit may calculate the action with reference to a value of at least one type of parameter set at each object, and the calculation control unit may reflect the selection by the user in the calculation by changing the value of the parameter regarding at least one object within the field on the basis of the selection by the user. According to this, it is possible to reflect the selection by the user in the action of the object through change of the value of the parameter of the object.

The selection opportunity provision unit may provide an opportunity to set an effect area (EA) within the field to the user as the opportunity of the selection regarding the match, and the calculation control unit may further comprise an influence generation unit (35, S227, S232) that changes the values of the parameter regarding at least one object that acts in the effect area. According to this, when the object acts in the effect area set on the basis of the selection by the user, the value of parameter of the object changes. The user can therefore strategically set an area in which the user desires to change the action of the object in the offensive turn or the defensive turn of one time in accordance with switching between offense and defense of the match.

The selection opportunity provision unit may allow the user to select one of the objects within the field and may set the effect area in accordance with the object selected by the user.

In this case, the effect area can be set through the selection of the object. It is therefore possible to apply such processing of making the selection of the object disposed at a position that plays a specific role in the field to set the effect area.

The selection opportunity provision unit may provide an opportunity of selection necessary for causing a predetermined effect to occur in the match to the user as the opportunity of the selection regarding the match, and the calculation control unit may further comprise an effect occurrence determination unit (35, S226) that determines whether or not an effect occurrence condition for causing the predetermined effect to occur is satisfied on the basis of the selection by the user in the opportunity, and a correction unit (35, S231, S232) that, when the effect occurrence condition is satisfied, causes the predetermined effect to occur in such a manner that the value of the parameter regarding the object taking a specific action associated with the predetermined effect is corrected. In this case, when the effect occurrence condition is satisfied on the basis of the selection by the user, the parameter regarding the object that takes the specific action is corrected. It is therefore possible to reflect the selection by the user in the specific action of the object.

The correction unit may set a target area (TA) in which effect is to be applied on the basis of the selection by the user and, when the effect occurrence condition is satisfied, may correct the value of the parameter regarding the object that acts in the target area to cause the predetermined effect to occur. In this case, it is possible to reflect the selection by the user in the action of the object in the target area within the field.

The calculation control unit may further comprise a calculation tendency control unit (35, S233, S238) that, when the effect occurrence condition is satisfied, causes an effect of changing the calculation by the match calculation unit in the target period to increase tendency for at least one object to take the specific action to occur as the predetermined effect in comparison with a case where the effect occurrence condition is not satisfied. According to this, when the effect occurrence condition is satisfied on the basis of the selection by the user, there is increased a possibility that the object takes the specific action and the value of the parameter is corrected. Thus, it becomes easier to reflect the selection by the user in the action of the object in a turn in which the selection is performed, so that it is possible to increase a sense of satisfaction and acceptance of the user.

The selection opportunity provision unit may provide an opportunity of selection necessary for causing a predetermined effect to occur in the match to the user as the opportunity of the selection regarding the match, and the calculation control unit may further comprise an effect occurrence determination unit (35, S226) that determines whether or not an effect occurrence condition for causing the predetermined effect regarding the match to occur is satisfied on the basis of the selection by the user, and an effect control unit (35, S227, S228, S231 to S234) that controls the calculation by the match calculation unit so that the predetermined effect occurs in the match when the effect occurrence condition is satisfied, and the predetermined effect does not occur in the match when the effect occurrence condition is not satisfied. According to this, the calculation of the match is controlled so that the predetermined effect occurs when the effect occurrence condition is satisfied on the basis of the selection by the user. It is therefore possible to reflect the selection by the user in proceeding of the match in a turn in which the selection is performed. The opportunity of the selection is provided to the user by being triggered by switching of the turns, so that the user can strategically determine a timing at which the effect is caused to occur when the user performs the selection.

The selection opportunity provision unit may provide the opportunity of the selection regarding the match to the user in each of the first turn and the second turn, the effect occurrence determination unit may determine whether or not a first condition for causing a first specific effect that cannot be caused to occur in the second turn, to occur when the first turn and may determine whether or not a second condition for causing a second specific effect that cannot be caused to occur in the first turn, to occur when the second turn as determination as to whether or not the effect occurrence condition is satisfied, the effect control unit may control the calculation by the match calculation unit so that the first specific effect occurs when the first condition is satisfied in the first turn and the second specific effect occurs when the second condition is satisfied in the second turn. According to this, it is possible to set an effect appropriate upon offense and an effect appropriate upon defense and allow the user to select whether or not these effects are caused to occur in accordance with switching between the offense and the defense. Thus, the user can repeat the selection while predicting the proceeding of the match to some extent, so that it is possible to reflect intention of the user in the proceeding of the match and increase interest of the game.

The invention claimed is:

1. A non-transitory storage medium storing a computer program for a game for, by causing a computer of a game system to serve as a match calculation unit that calculates an action of each of objects of a user and an opponent within a predetermined field to cause a match between the user and the opponent to proceed, providing by the computer the game in which a first turn that becomes an offensive side of the match and a second turn that becomes a defensive side of the match occur to switch between the user and the opponent on the basis of a calculation result of the action, wherein the computer program is configured to cause the computer to serve as:

a selection opportunity provision unit that suspends actions of the objects in conjunction with switching of the first turn and the second turn and provides an opportunity of selection regarding the match to the user; and a calculation control unit that controls calculation of the match calculation unit so that the selection by the user is reflected in the calculation by the match calculation unit within a target period until switching of the first turn and the second turn occurs next, wherein the selection opportunity provision unit is configured to provide the user with the opportunity of selection in either the first turn or the second turn, and at the same time provide the opponent with the opportunity of selection in the other of the first turn or the second turn.

2. The non-transitory storage medium according to claim 1, wherein the match calculation unit calculates the action with reference to a value of at least one type of parameter set at each object, and the calculation control unit reflects the selection by the user in the calculation by changing the value of the parameter regarding at least one object within the field on the basis of the selection by the user.

3. The non-transitory storage medium according to claim 2, wherein the selection opportunity provision unit provides an opportunity to set an effect area within the field to the user as the opportunity of the selection regarding the match, and the calculation control unit further comprises an influence generation unit that changes the values of the parameter regarding at least one object that acts in the effect area.

4. The non-transitory storage medium according to claim 3, wherein the selection opportunity provision unit allows the user to select one of the objects within the field and sets the effect area in accordance with the object selected by the user.

5. The non-transitory storage medium according to claim 2, wherein the selection opportunity provision unit provides an opportunity of selection necessary for causing a predetermined effect to occur in the match to the user as the opportunity of the selection regarding the match, and the calculation control unit further comprises:

an effect occurrence determination unit that determines whether or not an effect occurrence condition for causing the predetermined effect to occur is satisfied on the basis of the selection by the user in the opportunity; and a correction unit that, when the effect occurrence condition is satisfied, causes the predetermined effect to occur in such a manner that the value of the parameter regarding the object taking a specific action associated with the predetermined effect is corrected.

6. The non-transitory storage medium according to claim 5, wherein the correction unit sets a target area in which the effect is to be applied on the basis of the selection by the user and, when the effect occurrence condition is satisfied, corrects the value of the parameter regarding the object that acts in the target area to cause the predetermined effect to occur.

7. The non-transitory storage medium according to claim 5, wherein the calculation control unit further comprises a calculation tendency control unit that, when the effect occurrence condition is satisfied, causes an effect of changing the calculation by the match calculation unit in the target period to increase tendency for at least one object to take the specific action to occur as the predetermined effect in comparison with a case where the effect occurrence condition is not satisfied.

8. The non-transitory storage medium according to claim 1, wherein the selection opportunity provision unit provides an opportunity of selection necessary for causing a predetermined effect to occur in the match to the user as the opportunity of the selection regarding the match, and the calculation control unit further comprises:

an effect occurrence determination unit that determines whether or not an effect occurrence condition for causing the predetermined effect regarding the match to occur is satisfied on the basis of the selection by the user; and an effect control unit that controls the calculation by the match calculation unit so that the predetermined effect occurs in the match when the effect occurrence condition is satisfied, and the predetermined effect does not occur in the match when the effect occurrence condition is not satisfied.

9. The non-transitory storage medium according to claim 8, wherein the selection opportunity provision unit provides the opportunity of the selection regarding the match to the user in each of the first turn and the second turn, the effect occurrence determination unit determines whether or not a first condition for causing a first specific effect that cannot be caused to occur in the second turn, to occur when the first turn and determines whether or not a second condition for causing a second specific effect that cannot be caused to occur in the first turn, to occur when the second turn as determination as to whether or not the effect occurrence condition is satisfied, the effect control unit controls the calculation by the match calculation unit so that the first specific effect occurs when the first condition is satisfied in the first turn and the second specific effect occurs when the second condition is satisfied in the second turn.

10. A game system comprising a computer that serves as a match calculation unit that causes a match between a user and an opponent to proceed by calculating an action of each of objects of the user and the opponent within a predetermined field and provides by the computer a game in which a first turn which becomes an offensive side of the match and a second turn which becomes a defensive side of the match occur to switch between the user and the opponent on the basis of a calculation result of the action, wherein the game system is configured to cause the computer to further serve as:

a selection opportunity provision unit that suspends actions of the objects in conjunction with switching of the first turn and the second turn and provides an opportunity of selection regarding the match to the user; and a calculation control unit that controls calculation by the match calculation unit so that the selection by the user is reflected in the calculation by the match calculation unit within a target period until switching of the first turn and the second turn occurs next, wherein the selection opportunity provision unit is configured to provide the user with the opportunity of selection in either the first turn or the second turn, and at the same time provide the opponent with the opportunity of selection in the other of the first turn or the second turn.

11. A control method for a game system for, by causing a computer of the game system to serve as a match calculation unit that causes a match between a user and an opponent to proceed by calculating an action of each of objects of the user and the opponent within a predetermined field, providing by the computer a game in which a first turn that becomes an offensive side of the match and a second turn that becomes a defensive side of the match occur to switch between the user and the opponent on the basis of a calculation result of the action, wherein the control method is configured to cause the computer to further serve as:

a selection opportunity provision unit that suspends actions of the objects in conjunction with switching of the first turn and the second turn and provides an opportunity of selection regarding the match to the user; and a calculation control unit that controls calculation by the match calculation unit so that the selection by the user is reflected in the calculation by the match calculation unit within a target period until switching of the first turn and the second turn occurs next, wherein the selection opportunity provision unit is configured to provide the user with the opportunity of selection in either the first turn or the second turn, and at the same time provide the opponent with the opportunity of selection in the other of the first turn or the second turn.

\* \* \* \* \*